(12) United States Patent
Lemberger et al.

(10) Patent No.: US 10,733,456 B2
(45) Date of Patent: Aug. 4, 2020

(54) SHARING VIDEO FOOTAGE FROM AUDIO/VIDEO RECORDING AND COMMUNICATION DEVICES

(71) Applicant: A9.Com, Inc., Palo Alto, CA (US)

(72) Inventors: Elliott Lemberger, Santa Monica, CA (US); Aaron Harpole, Santa Monica, CA (US); Mark Troughton, Santa Monica, CA (US)

(73) Assignee: A9.Com, Inc., Palo Alto, CA (US)

( * ) Notice: Subject to any disclaimer, the term of this patent is extended or adjusted under 35 U.S.C. 154(b) by 314 days.

(21) Appl. No.: 15/839,269

(22) Filed: Dec. 12, 2017

(65) Prior Publication Data

US 2018/0101734 A1     Apr. 12, 2018

Related U.S. Application Data

(63) Continuation-in-part of application No. 15/387,471, filed on Dec. 21, 2016, which is a
(Continued)

(51) Int. Cl.
*G06K 9/00* (2006.01)
*H04N 7/18* (2006.01)
(Continued)

(52) U.S. Cl.
CPC .......... *G06K 9/00771* (2013.01); *G11B 27/19* (2013.01); *H04L 67/06* (2013.01);
(Continued)

(58) Field of Classification Search
None
See application file for complete search history.

(56) References Cited

U.S. PATENT DOCUMENTS

| 4,764,953 A | 8/1988 | Chern et al. |
| 5,428,388 A | 6/1995 | von Bauer et al. |

(Continued)

FOREIGN PATENT DOCUMENTS

| CN | 2585521 | 11/2003 |
| CN | 2792061 | 6/2006 |

(Continued)

OTHER PUBLICATIONS

Cook, John; Draw your own neighborhood home search on a map with Zillow's updated iPhone app. GeekWire.com, Nov. 28, 2011. (14 pages).
(Continued)

*Primary Examiner* — Reza Aghevli
(74) *Attorney, Agent, or Firm* — Lee & Hayes, P.C.

(57) ABSTRACT

Video footage captured by A/V recording and communication devices may be readily uploaded to the cloud and shared with a requesting party, such as a law enforcement agency. When a request is received from a requesting party for video footage, videos meeting the criteria specified by the requesting party may be determined. Consent requests may then be sent to users associated with each of the A/V recording and communication devices that recorded the videos meeting the criteria specified by the requesting party. When user consents to share the videos, the videos may be provided to the requesting party.

20 Claims, 40 Drawing Sheets

Related U.S. Application Data continuation-in-part of application No. 15/387,444, filed on Dec. 21, 2016, now Pat. No. 10,447,963.

(60) Provisional application No. 62/595,729, filed on Dec. 7, 2017, provisional application No. 62/288,971, filed on Jan. 29, 2016, provisional application No. 62/271,186, filed on Dec. 22, 2015, provisional application No. 62/270,373, filed on Dec. 21, 2015.

(51) Int. Cl.

| | | |
|---|---|---|
| *H04N 21/21* | (2011.01) | |
| *H04N 21/23* | (2011.01) | |
| *H04N 21/27* | (2011.01) | |
| *H04N 21/25* | (2011.01) | |
| *H04N 21/431* | (2011.01) | |
| *H04N 21/472* | (2011.01) | |
| *H04N 21/482* | (2011.01) | |
| *H04N 21/658* | (2011.01) | |
| *H04N 21/845* | (2011.01) | |
| *H04L 29/08* | (2006.01) | |
| *H04N 21/218* | (2011.01) | |
| *H04N 21/2187* | (2011.01) | |
| *H04N 21/235* | (2011.01) | |
| *H04N 21/239* | (2011.01) | |
| *H04N 21/258* | (2011.01) | |
| *H04N 21/2743* | (2011.01) | |
| *H04N 21/6587* | (2011.01) | |
| *H04N 5/77* | (2006.01) | |
| *G11B 27/19* | (2006.01) | |
| *H04N 21/4223* | (2011.01) | |
| *H04N 9/82* | (2006.01) | |

(52) U.S. Cl.
CPC .............. *H04L 67/26* (2013.01); *H04N 5/77* (2013.01); *H04N 5/772* (2013.01); *H04N 7/18* (2013.01); *H04N 7/186* (2013.01); *H04N 9/8205* (2013.01); *H04N 21/2187* (2013.01); *H04N 21/21805* (2013.01); *H04N 21/2353* (2013.01); *H04N 21/2393* (2013.01); *H04N 21/25841* (2013.01); *H04N 21/2743* (2013.01); *H04N 21/4223* (2013.01); *H04N 21/431* (2013.01); *H04N 21/472* (2013.01); *H04N 21/4825* (2013.01); *H04N 21/6587* (2013.01); *H04N 21/8456* (2013.01); *H04N 21/25875* (2013.01)

(56) References Cited

U.S. PATENT DOCUMENTS

| | | | |
|---|---|---|---|
| 5,760,848 A | 6/1998 | Cho | |
| 6,072,402 A | 6/2000 | Kniffin et al. | |
| 6,192,257 B1 | 2/2001 | Ray | |
| 6,271,752 B1 | 8/2001 | Vaios | |
| 6,429,893 B1 | 8/2002 | Xin | |
| 6,456,322 B1 | 9/2002 | Marinacci | |
| 6,476,858 B1 | 11/2002 | Ramirez Diaz et al. | |
| 6,542,078 B2 | 4/2003 | Script et al. | |
| 6,546,322 B2 | 4/2003 | Williams | |
| 6,633,231 B1 | 10/2003 | Okamoto et al. | |
| 6,658,091 B1 | 12/2003 | Naidoo et al. | |
| 6,698,021 B1 | 2/2004 | Amini et al. | |
| 6,753,774 B2 | 6/2004 | Pan et al. | |
| 6,828,909 B2 | 12/2004 | Script et al. | |
| 6,970,183 B1 | 11/2005 | Monroe | |
| 7,062,291 B2 | 6/2006 | Ryley et al. | |
| 7,065,196 B2 | 6/2006 | Lee | |
| 7,085,361 B2 | 8/2006 | Thomas | |
| 7,109,860 B2 | 9/2006 | Wang | |
| 7,193,644 B2 | 3/2007 | Carter | |
| 7,304,572 B2 | 12/2007 | Sheynman et al. | |
| 7,382,249 B2 | 6/2008 | Fancella | |
| 7,450,638 B2 | 11/2008 | Iwamura | |
| 7,529,411 B2 | 5/2009 | Haupt et al. | |
| 7,643,056 B2 | 1/2010 | Silsby | |
| 7,683,924 B2 | 3/2010 | Oh et al. | |
| 7,683,929 B2 | 3/2010 | Elazar et al. | |
| 7,710,452 B1 | 5/2010 | Lindberg | |
| 7,738,917 B2 | 6/2010 | Ryley et al. | |
| 7,856,248 B1* | 12/2010 | Fujisaki | H04M 1/6075 455/556.1 |
| 8,139,098 B2 | 3/2012 | Carter | |
| 8,144,183 B2 | 3/2012 | Carter | |
| 8,154,581 B2* | 4/2012 | Carter | G07C 9/32 348/14.06 |
| 8,312,660 B1* | 11/2012 | Fujisaki | F41A 17/08 42/70.01 |
| 8,494,340 B2 | 7/2013 | Wang et al. | |
| 8,531,522 B2 | 9/2013 | Horovitz et al. | |
| 8,593,511 B2 | 11/2013 | Ikeda et al. | |
| 8,619,136 B2 | 12/2013 | Howarter et al. | |
| 8,676,273 B1* | 3/2014 | Fujisaki | H04M 1/6505 455/567 |
| 8,780,201 B1 | 7/2014 | Scalisi et al. | |
| 8,823,795 B1 | 9/2014 | Scalisi et al. | |
| 8,842,180 B1 | 9/2014 | Kasmir et al. | |
| 8,872,915 B1 | 10/2014 | Scalisi et al. | |
| 8,887,050 B1 | 11/2014 | Siracusano, Jr. | |
| 8,937,659 B1 | 1/2015 | Scalisi et al. | |
| 8,941,736 B1 | 1/2015 | Scalisi | |
| 8,947,530 B1 | 2/2015 | Scalisi | |
| 8,953,040 B1 | 2/2015 | Scalisi et al. | |
| 8,970,349 B2 | 3/2015 | Gutierrez et al. | |
| 9,013,575 B2 | 4/2015 | Scalisi | |
| 9,041,812 B2 | 5/2015 | Billau et al. | |
| 9,049,352 B2 | 6/2015 | Scalisi et al. | |
| 9,053,622 B2 | 6/2015 | Scalisi | |
| 9,055,202 B1 | 6/2015 | Scalisi et al. | |
| 9,058,738 B1 | 6/2015 | Scalisi | |
| 9,060,103 B2 | 6/2015 | Scalisi | |
| 9,060,104 B2 | 6/2015 | Scalisi | |
| 9,065,987 B2 | 6/2015 | Kasmir et al. | |
| 9,087,386 B2 | 7/2015 | Morris et al. | |
| 9,094,584 B2 | 7/2015 | Scalisi et al. | |
| 9,109,378 B2 | 8/2015 | Scalisi | |
| 9,113,051 B1 | 8/2015 | Scalisi | |
| 9,113,052 B1 | 8/2015 | Scalisi et al. | |
| 9,118,819 B1 | 8/2015 | Scalisi et al. | |
| 9,142,214 B2 | 9/2015 | Scalisi | |
| 9,160,987 B1 | 10/2015 | Kasmir et al. | |
| 9,165,444 B2 | 10/2015 | Scalisi | |
| 9,172,920 B1 | 10/2015 | Kasmir et al. | |
| 9,172,921 B1 | 10/2015 | Scalisi et al. | |
| 9,172,922 B1 | 10/2015 | Kasmir et al. | |
| 9,179,107 B1 | 11/2015 | Scalisi et al. | |
| 9,179,108 B1 | 11/2015 | Scalisi et al. | |
| 9,179,109 B1 | 11/2015 | Kasmir et al. | |
| 9,196,133 B2 | 11/2015 | Scalisi et al. | |
| 9,197,867 B1 | 11/2015 | Scalisi et al. | |
| 9,230,424 B1 | 1/2016 | Scalisi et al. | |
| 9,237,318 B2 | 1/2016 | Kasmir et al. | |
| 9,247,219 B2 | 1/2016 | Kasmir et al. | |
| 9,253,455 B1 | 2/2016 | Harrison et al. | |
| 9,342,936 B2 | 5/2016 | Scalisi | |
| 9,391,945 B1 | 7/2016 | Daniel et al. | |
| 9,508,239 B1 | 11/2016 | Harrison et al. | |
| 9,736,284 B2 | 8/2017 | Scalisi et al. | |
| 9,743,049 B2 | 8/2017 | Scalisi et al. | |
| 9,769,435 B2* | 9/2017 | Scalisi | G08B 13/19684 |
| 9,786,133 B2 | 10/2017 | Harrison et al. | |
| 9,799,183 B2 | 10/2017 | Harrison et al. | |
| 9,819,972 B1 | 11/2017 | Vantalon et al. | |
| 9,870,716 B1 | 1/2018 | Rao et al. | |
| 9,910,341 B2* | 3/2018 | Jung | G03B 17/20 |
| 10,033,862 B2* | 7/2018 | Yoakum | H04M 3/42221 |
| 10,447,963 B2* | 10/2019 | Harpole | H04N 5/772 |
| 2002/0094111 A1 | 7/2002 | Puchek et al. | |
| 2002/0131768 A1 | 9/2002 | Gammenthaler | |

(56) References Cited

U.S. PATENT DOCUMENTS

| | | | |
|---|---|---|---|
| 2002/0147982 A1 | 10/2002 | Naidoo et al. | |
| 2003/0043047 A1 | 3/2003 | Braun | |
| 2003/0065805 A1* | 4/2003 | Barnes, Jr. | G06Q 10/02 709/231 |
| 2003/0185296 A1 | 10/2003 | Masten, Jr. | |
| 2003/0220835 A1* | 11/2003 | Barnes, Jr. | H04M 1/72519 705/14.36 |
| 2004/0006425 A1* | 1/2004 | Wood | G01C 21/26 701/532 |
| 2004/0085205 A1 | 5/2004 | Yeh | |
| 2004/0085450 A1 | 5/2004 | Stuart | |
| 2004/0086093 A1 | 5/2004 | Schranz | |
| 2004/0095254 A1 | 5/2004 | Maruszczak | |
| 2004/0135686 A1 | 7/2004 | Parker | |
| 2005/0111660 A1 | 5/2005 | Hosoda | |
| 2006/0010199 A1 | 1/2006 | Brailean et al. | |
| 2006/0022816 A1 | 2/2006 | Yukawa | |
| 2006/0139449 A1 | 6/2006 | Cheng et al. | |
| 2006/0156361 A1 | 7/2006 | Wang et al. | |
| 2006/0190262 A1 | 8/2006 | Roskind | |
| 2006/0279628 A1 | 12/2006 | Fleming | |
| 2007/0008081 A1 | 1/2007 | Tylicki et al. | |
| 2007/0199076 A1 | 8/2007 | Rensin et al. | |
| 2008/0222546 A1 | 9/2008 | Mudd et al. | |
| 2009/0015672 A1* | 1/2009 | Clapp | G06F 16/78 348/143 |
| 2009/0031381 A1 | 1/2009 | Cohen et al. | |
| 2009/0322874 A1* | 12/2009 | Knutson | G08B 13/196 348/143 |
| 2010/0066835 A1* | 3/2010 | Colciago | G08B 13/19602 348/159 |
| 2010/0085431 A1 | 4/2010 | Trapani | |
| 2010/0225455 A1 | 9/2010 | Claiborne et al. | |
| 2011/0058034 A1* | 3/2011 | Grass | G08B 13/19656 348/143 |
| 2011/0154335 A1* | 6/2011 | Tuovinen | G06Q 10/109 718/100 |
| 2011/0288962 A1 | 11/2011 | Rankin, Jr. et al. | |
| 2011/0289010 A1 | 11/2011 | Rankin, Jr. et al. | |
| 2011/0289106 A1 | 11/2011 | Rankin, Jr. et al. | |
| 2011/0289161 A1 | 11/2011 | Rankin, Jr. et al. | |
| 2012/0124203 A1 | 5/2012 | Richards | |
| 2012/0203925 A1 | 8/2012 | Curcio et al. | |
| 2012/0284202 A1 | 11/2012 | Dalby | |
| 2013/0057695 A1 | 3/2013 | Huisking | |
| 2013/0117365 A1 | 5/2013 | Padmanabhan et al. | |
| 2014/0040309 A1* | 2/2014 | Meaney | G06Q 50/18 707/769 |
| 2014/0047074 A1 | 2/2014 | Chung et al. | |
| 2014/0101781 A1 | 4/2014 | Bouknight | |
| 2014/0132772 A1 | 5/2014 | Billau et al. | |
| 2014/0133831 A1 | 5/2014 | Billau et al. | |
| 2014/0160250 A1 | 6/2014 | Pomerantz et al. | |
| 2014/0267716 A1 | 9/2014 | Child et al. | |
| 2015/0163463 A1 | 6/2015 | Hwang et al. | |
| 2015/0242444 A1 | 8/2015 | Campbell et al. | |
| 2015/0290808 A1 | 10/2015 | Renkis | |
| 2015/0319402 A1 | 11/2015 | Abuelsaad et al. | |
| 2016/0014176 A1 | 1/2016 | Ariav et al. | |
| 2016/0105644 A1 | 4/2016 | Smith et al. | |
| 2016/0112461 A1* | 4/2016 | Othmer | G08G 1/20 726/29 |
| 2016/0224837 A1* | 8/2016 | Lipert | G06F 16/5838 |
| 2017/0155737 A1 | 6/2017 | Jannink et al. | |
| 2017/0177176 A1* | 6/2017 | Harpole | G06K 9/00771 |
| 2018/0012462 A1* | 1/2018 | Heitz, III | G08B 13/19606 |
| 2018/0101735 A1* | 4/2018 | Lemberger | H04L 67/06 |
| 2018/0338120 A1* | 11/2018 | Lemberger | H04N 7/186 |

FOREIGN PATENT DOCUMENTS

| | | |
|---|---|---|
| EP | 0944883 | 9/1999 |
| EP | 1480462 | 11/2004 |
| GB | 2286283 | 8/1995 |
| GB | 2354394 | 3/2001 |
| GB | 2357387 | 6/2001 |
| GB | 2400958 | 10/2004 |
| JP | 2001103463 | 4/2001 |
| JP | 2002033839 | 1/2002 |
| JP | 2002125059 | 4/2002 |
| JP | 2002342863 | 11/2002 |
| JP | 2002344640 | 11/2002 |
| JP | 2002354137 | 12/2002 |
| JP | 2002368890 | 12/2002 |
| JP | 2003283696 | 10/2003 |
| JP | 2004128835 | 4/2004 |
| JP | 2005341040 | 12/2005 |
| JP | 2006147650 | 6/2006 |
| JP | 2006262342 | 9/2006 |
| JP | 2009008925 | 1/2009 |
| WO | WO9839894 | 9/1998 |
| WO | WO0113638 | 2/2001 |
| WO | WO0193220 | 12/2001 |
| WO | WO02085019 | 10/2002 |
| WO | WO03028375 | 4/2003 |
| WO | WO03096696 | 11/2003 |
| WO | WO2006038760 | 4/2006 |
| WO | WO2006067782 | 6/2006 |
| WO | WO2007125143 | 11/2007 |
| WO | WO2011043732 | 4/2011 |

OTHER PUBLICATIONS

International Search Report and Written Opinion for PCT Application PCT/US2016/068088. ISR dated Mar. 10, 2017. 11 pages.

Non Final Office Action dated Jan. 3, 2020 for U.S. Appl. No. 15/839,377 "Sharing Video Footage From Audio/Video Recording and Communication Devices" Lemberger, 9 pages.

* cited by examiner

SHARING VIDEO FOOTAGE FROM AUDIO/VIDEO RECORDING AND COMMUNICATION DEVICES

CROSS-REFERENCE TO RELATED APPLICATIONS

This application claims priority to U.S. Provisional Patent Application No. 62/595,729, filed Dec. 7, 2017, this application also is a continuation-in-part of application Ser. No. 15/387,471, filed on Dec. 21, 2016, and a continuation-in-part of application Ser. No. 15/387,444, filed on Dec. 21, 2016, each of which claims priority to provisional application Ser. No. 62/288,971, filed on Jan. 29, 2016, provisional application Ser. No. 62/271,186, filed on Dec. 22, 2015, and provisional application Ser. No. 62/270,373, filed on Dec. 21, 2015. The entire contents of the priority applications are hereby incorporated by reference as if fully set forth.

TECHNICAL FIELD

The present embodiments relate to audio/video (A/V) recording and communication devices, including A/V recording and communication doorbell systems. In particular, the present embodiments improve the functionality of A/V recording and communication devices by facilitating easy sharing of video footage recorded by such devices.

BACKGROUND

Home safety is a concern for many homeowners and renters. Those seeking to protect or monitor their homes often wish to have video and audio communications with visitors, for example, those visiting an external door or entryway. Audio/Video (A/V) recording and communication devices, such as doorbells, provide this functionality, and may also aid in crime detection and prevention. For example, audio and/or video captured by an A/V recording and communication device may be uploaded to the cloud and recorded on a remote server. Subsequent review of the A/V footage may aid law enforcement in capturing perpetrators of home burglaries and other crimes. Further, the presence of one or more A/V recording and communication devices on the exterior of a home, such as a doorbell unit at the entrance to the home, acts as a powerful deterrent against would-be burglars.

SUMMARY

The various embodiments of the present apparatus, systems, and methods for sharing video footage from audio/video recording and communication devices have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

One aspect of the present embodiments includes the realization that audio/video (A/V) recording and communication devices may from time to time record video footage of criminal activity and/or of criminal perpetrators. This video footage may be useful to law enforcement agencies, not only because it may be evidence of the commission of a crime and of the person(s) responsible for the crime (if the crime is caught on video), but also because it may provide information about a location of a criminal perpetrator (if, for example, the crime is not caught on video, but a person wanted for questioning in connection with a crime is recorded by the A/V recording and communication device). It would be advantageous, then, to enhance the functionality of A/V recording and communication devices by facilitating easy sharing of video footage recorded by such devices with law enforcement. The present embodiments, as described in detail below, provide this enhancement. In particular, the present embodiments enable video footage captured by A/V recording and communication devices to be readily uploaded to the cloud and shared with a requesting party, such as a law enforcement agency. The footage from these A/V recording and communication devices, which may contain images of the perpetrator(s) of the crime and/or other valuable information, may then be used in identifying and/or capturing the perpetrator(s), thereby making communities safer.

Another aspect of the present embodiments includes the realization that a service provider that stores and manages video footage for sharing may only have authorization to share with law enforcement the video footage captured by preauthorized A/V recording and communication devices associated with the service provider. For example, the service provider may be communicatively coupled to the preauthorized A/V recording and communication devices such that the service provider may automatically receive, store, and share with law enforcement the video footage generated by the preauthorized A/V recording and communication devices. However, other A/V recording and communication devices, such as third-party A/V recording and communication devices that are not associated with the service provider and/or are not communicatively coupled to the service provider, may not automatically send video footage to the service provider. In many circumstances, it may be useful for law enforcement to, in addition to receiving the video footage from the pre-authorized A/V recording and communication devices, also receive the video footage from the third-party A/V recording and communication devices because the video footage may also contain valuable identifying information of the perpetrator(s) of the crime.

The present embodiments, as described in detail below, may help solve this problem by providing various techniques that allow the service provider to obtain the video footage from the third-party A/V recording and communication devices and share the video footage with law enforcement. For example, the service provider may receive and store registration data for the third-party A/V recording and communication devices, which may indicate respective locations of each third-party A/V recording and communication device. When receiving a request for video footage, the service provider may use the registration data to determine which third-party A/V recording and communication devices are located within an area specified by law enforcement. The service provider may then send requests for respective video footage generated by each of the third-party recording and communication devices that are located within the area and, in response, receive the video footage. After receiving the video footage, the service provider may store and/or send the video footage to law enforcement. The video footage from these third-party A/V recording and communication devices, in addition to the video footage from the pre-authorized A/V recording and communication devices, may then be used by law enforcement in identifying and/or capturing the perpetrator(s), thereby potentially leading to an increase in arrests by law enforcement. As a result of the increase in arrests, the safety of the community (e.g., the street, the neighborhood, the town, the city, etc.) in which the pre-authorized and third-party A/V recording and communication devices are located may be increased, in addition to the safety of the surrounding communities.

In a first aspect, a method for a network device, the network device including a communication module and a processor, the network device communicatively coupled to a preauthorized audio/video (A/V) recording and communication device including a first camera, the method comprising: receiving, by the processor and using the communication module, from the preauthorized A/V recording and communication device, first image data generated by the first camera; storing, by the processor, the first image data in a database; receiving, by the processor and using the communication module, registration data from a third-party client device associated with a third-party A/V recording and communication device that includes a second camera, the registration data indicating at least a location of the third-party A/V recording and communication device; receiving, by the processor and using the communication module, from a public safety client device, a first image data request, the first image data request indicating a specified area and a specified time window; based on the receiving of the first image data request, determining, by the processor and based on the registration data, that the location of the third-party A/V recording and communication device is within the specified area; based on the determining that the location of the third-party A/V recording and communication device is within the specified area, transmitting, by the processor and using the communication module, to the third-party client device, a second image data request for second image data generated by the second camera during the specified time window; based on the transmitting of the second image data request, receiving, by the processor and using the communication module, the second image data; determining, by the processor, that the preauthorized A/V recording and communication device is located within the specified area; and in response to the receiving of the second image data and based on the determining that the preauthorized A/V recording and communication device is located within the specified area, transmitting, by the processor and using the communication module, the first image data and the second image data to the public safety client device.

In an embodiment of the first aspect, the method further comprises: receiving, by the processor and using the communication module, third image data from the public safety client device, the third image data depicting a person of interest; comparing, by the processor, the first image data and the second image data to the third image data; based on the comparing, determining, by the processor, that one of the first image data and the second image data depicts the person of interest; and based on the determining that the one of the first image data and the second image data depicts the person of interest, determining, by the processor, that the one of the first image data and the second image data that depicts the person of interest is to be displayed before the other of the first image data and the second image data in an ordered list of videos, wherein the transmitting of the first image data and the second image data to the public safety client device causes the one of the first image data and the second image data that depicts the person of interest to be displayed before the other of the first image data and the second image data in the ordered list of videos.

In another embodiment of the first aspect, the method further comprises: receiving, by the processor and using the communication module, identification data from the public safety client device, wherein the identification data is associated with at least one of a person and an object; analyzing, by the processor, the first image data and the second image data using the identification data; based on the analyzing, determining, by the processor, that one of the first image data and the second image data depicts the at least one of the person and the object; and based on determining that the one of the first image data and the second image data depicts the at least one of the person and the object, determining, by the processor, that the one of the first image data and the second image data that depicts the at least one of the person and the object is to be displayed before the other of the first image data and the second image data in an ordered list of videos, wherein the transmitting of the first image data and the second image data to the public safety client device causes the one of the first image data and the second image data that depicts the at least one of the person and the object to be displayed before the other of the first image data and the second image data in the ordered list of videos.

In another embodiment of the first aspect, the method further comprises: based on the receiving of the registration data, generating, by the processor, a user account associated with the third-party A/V recording and communication device, the user account including at least the location of the third-party A/V recording and communication device and contact information associated with the third-party client device.

In another embodiment of the first aspect, the method further comprises: transmitting, by the processor and using the communication module, a user interface to the third-party client device, the user interface for registering the third-party A/V recording and communication device with the network device, wherein the receiving of the registration data is based on the transmitting of the user interface.

In another embodiment of the first aspect, the method further comprises: based on the receiving of the registration data, registering, by the processor, the third-party A/V recording and communication device with a public safety service, wherein the preauthorized A/V recording and communication device is also registered with the public safety service.

In another embodiment of the first aspect, the method further comprises, before the storing of the first image data, determining, by the processor, that a consent has been provided for sharing the first image data, wherein the transmitting of the first image data in the database is based on the consent being provided.

In another embodiment of the first aspect, the method further comprises: receiving, by the processor and using the communication module, a consent for sharing the first image data, wherein the transmitting of the first image data is based on the consent being provided.

In another embodiment of the first aspect, wherein the location comprises a first location, and wherein the method further comprises: transmitting, by the processor and using the communication module, at least one of a second location associated with the preauthorized A/V recording and communication device and the first location associated with the third-party A/V recording and communication device.

In another embodiment of the first aspect, wherein the method further comprises: determining, by the processor, a second location associated with the preauthorized A/V recording and communication device; generating, by the processor and based on the first location, a third location associated with the preauthorized A/V recording and communication device; generating, by the processor and based on the first location, a fourth location associated with the third-party A/V recording and communication device; and transmitting, by the processor and using the communication module, at least one of the third location associated with the preauthorized A/V recording and communication device and the fourth location associated with the third-party A/V recording and communication device.

In a second aspect, a method for a network device, the network device including a processor and a communication module, the method comprising: receiving, by the processor and using the communication module, registration data from a client device, the registration data indicating at least a location of a video device that includes a camera; storing, by the processor, the registration data in a database; receiving, by the processor and using the communication module, a first image data request from a public safety client device, the first image data request indicating a specified area; based on the receiving of the first image data request, determining, by the processor and using the registration data, that the location of the video device is within the specified area; in response to the determining that the location of the video device is within the specified area, transmitting, by the processor and using the communication module, a second image data request to the client device, the second image data request for image data generated by the camera of the video device; based on the transmitting of the second image data request, receiving, by the processor and using the communication module, the image data; and transmitting, by the processor and using the communication module, the image data to the public safety client device.

In an embodiment of the second aspect, wherein the first image data request further indicates a specified time window, and wherein the second image data request is for image data generated by the second camera during at least the specified time window.

In another embodiment of the second aspect, wherein the network device is communicatively coupled to an A/V recording and communication device and the image data is first image data, and wherein the method further comprises: receiving, by the processor and using the communication module, second image data generated by a second camera of the A/V recording and communication device; storing, by the processor, the second image data in a database; determining, by the processor, that the A/V recording and communication device is located within the specified area; and based on the first image data request and in response to the determining that the A/V recording and communication device is located within the specified area, transmitting, using the communication module, the second image data to the public safety client device.

In another embodiment of the second aspect, the method further comprises: receiving, by the processor and using the communication module, third image data from the public safety client device, the third image data depicting a person of interest; comparing, by the processor, the first image data and the second image data to the third image data; based on the comparing, determining, by the processor, that one of the first image data and the second image data depicts the person of interest; and determining, by the processor, that the one of the first image data and the second image data that depicts the person of interest is to be displayed before the other of the first image data and the second image data in an ordered list of videos, wherein the transmitting of the first image data and the transmitting of the second image data to the public safety client device causes the one of the first image data and the second image data that depicts the person of interest to be displayed before the other of the first image data and the second image data in the ordered list of videos.

In another embodiment of the second aspect, the method further comprises: receiving, by the processor and using the communication module, identification data from the public safety client device, wherein the identification data is associated with at least one of a person and an object; analyzing, by the processor, the first image data and the second image data using the identification data; based on the analyzing, determining, by the processor, that one of the first image data and the second image data depicts the at least one of the person and the object; and determining, by the processor, that the one of the first image data and the second image data that depicts the at least one of the person and the object is to be displayed before the other of the first image data and the second image data in an ordered list of videos, wherein the transmitting of the first image data and the transmitting of the second image data to the public safety client device causes the one of the first image data and the second image data that depicts the at least one of the person and the object to be displayed before the other of the first image data and the second image data in the ordered list of videos.

In another embodiment of the second aspect, the method further comprises: before the storing of the second image data, determining, by the processor, that a consent has been provided for sharing the second image data, wherein the storing of the second image data in the database is based on the consent being provided.

In another embodiment of the second aspect, the method further comprises: receiving, by the processor and using the communication module, a consent for sharing the second image data, wherein the transmitting of the second image data is further based on the consent being provided.

In another embodiment of the second aspect, wherein the location comprises a first location, and wherein the method further comprises: transmitting, by the processor and using the communication module, at least one of a second location associated with the A/V recording and communication device and the first location associated with the video device.

In another embodiment of the second aspect, the method further comprises: determining, by the processor, a second location associated with the A/V recording and communication device; generating, by the processor and based on the first location, a third location associated with the A/V recording and communication device; generating, by the processor and based on the first location, a fourth location associated with the video device; and transmitting, by the processor and using the communication module, at least one of the third location associated with the A/V recording and communication device and the fourth location associated with the video device.

In another embodiment of the second aspect, the method further comprises: based on the receiving of the registration data, generating, by the processor, a user account associated with the video device, the user account including at least the location of the video device and contact information associated with the client device.

In another embodiment of the second aspect, the method further comprises: transmitting, by the processor and using the communication module, a user interface to the client device, the user interface for registering the video device with the network device, wherein the receiving of the registration data is based on the transmitting of the user interface.

In another embodiment of the second aspect, the method further comprises: based on the receiving of the registration data, registering, by the processor, the video device with a public safety service, wherein the transmitting of the second image data request is further based on the video device being registered with the public safety service.

In a third aspect, a method for a network device communicatively coupled to a first audio/video (A/V) recording and communication device that includes a first camera and is located at a first location and a second A/V recording and communication device that includes a second camera and is located at a second location, the network device including a processor and a communication module, the method comprising: receiving, by the processor and using the communication module, first image data generated by the first camera of the first A/V recording and communication device, the first image data depicting a first field of view of the first camera; determining, by the processor, that a first consent has been provided for sharing the first image data; based on the determining that the first consent has been provided, storing, by the processor, the first image data in a storage database and a public safety database; receiving, by the processor and using the communication module, second image data generated by the second camera of the second A/V recording and communication device, the second image data depicting a second field of view of the second camera; determining, by the processor, that a second consent has yet to be provided for sharing the second image data; based on the determining that the second consent has yet to be provided, storing, by the processor, the second image data in the storage database; receiving, by the processor and using the communication module, an image data request from a public safety client device, the image data request indicating a specified area; determining, by the processor, that the first A/V recording and communication device and the second A/V recording and communication device are located within the specified area; in response to the determining that the second A/V recording and communication device is located within the specified area and based on the determining that the second consent has yet to be provided, transmitting, by the processor and using the communication module, a consent request to a client device associated with the second A/V recording and communication device, the consent request for sharing the second image data; based on the transmitting of the consent request, receiving, by the processor and using the communication module, the second consent from the client device, the second consent for sharing the second image data; in response to the receiving of the second consent, storing, by the processor, the second image data in the public safety database; and based on the image data request, transmitting, by the processor and using the communication module, the first image data and the second image data from the public safety database to the public safety client device.

In an embodiment of the third aspect, wherein the public safety database and the public safety client device are both associated with a public safety service.

In another embodiment of the third aspect, wherein the image data request further indicates a specified time window, and wherein the method further comprises: determining, by the processor, that the second image data was generated by the second camera during the specified time window, wherein the transmitting of the consent request is further based on the determining that the second image data was generated by the second camera during the specified time window.

In another embodiment of the third aspect, wherein the method further comprises: receiving, by the processor and using the communication module, registration data associated with the first A/V recording and communication device, the registration data indicating that image data generated by the first camera of the first A/V recording and communication device may be shared with a public safety service, wherein the determining that the first consent has been provided for sharing the first image data is based on the receiving of the registration data.

In another embodiment of the third aspect, and the method further comprises: generating, by the processor and using the communication module, a list indicating A/V recording and communication devices that have provided consent for sharing image data with a public safety service; and determining, by the processor, that the first A/V recording and communication device is included in the list, wherein the determining that the first consent has been provided for sharing the first image data is based on the determining that the first A/V recording and communication device is included in the list.

In another embodiment of the third aspect, the method further comprises: transmitting, by the processor and using the communication module, at least one of the first location associated with the first A/V recording and communication device and the second location associated with the second A/V recording and communication device.

In another embodiment of the third aspect, the method further comprises: generating, by the processor and based on the first location, a third location associated with the A/V recording and communication device; generating, by the processor and based on the second location, a fourth location associated with the second A/V recording and communication device; and transmitting, by the processor and using the communication module, at least one of the third location associated with the first A/V recording and communication device and the fourth location associated with the second A/V recording and communication device.

In a fourth aspect, a method for a network device communicatively coupled to a first audio/video (A/V) recording and communication device that includes a first camera and a second A/V recording and communication device that includes a second camera, the network device including a processor and a communication module, the method comprising: receiving, by the processor and using the communication module, first image data generated by the first camera of the first A/V recording and communication device; determining, by the processor, that a first consent has been provided for sharing the first image data; based on the determining that the first consent has been provided, storing, by the processor, the first image data in a storage database; receiving, by the processor and using the communication module, second image data generated by the second camera of the second A/V recording and communication device; determining, by the processor, that a second consent has yet to be provided for sharing the second image data; receiving, by the processor and using the communication module, an image data request from a public safety client device, the image data request indicating a specified area; determining, by the processor, that the first A/V recording and communication device and the second A/V recording and communication device are located within the specified area; and based on the first image data being stored in the database, transmitting, by the processor and using the communication module, the first image data from the database to the public safety client device.

In an embodiment of the fourth aspect, wherein the database comprises a public safety database, and wherein the method further comprises: based on the receiving of the first image data, storing, by the processor, the first image data in an image data database; and based on the receiving of the second image data, storing, by the processor, the second image data in the image data database.

In another embodiment of the fourth aspect, the method further comprises: based on the determining that the first consent has been provided, storing, by the processor and in the database, data indicating that the first consent has been provided for sharing the first image data with the public safety client device; and based on the receiving of the second image data, storing, by the processor, the second image data in the database, wherein the transmitting of the first image data from the database to the public safety client device is further based on the data indicating that the first consent has been provided.

In another embodiment of the fourth aspect, the method further comprises: based on the determining that the second consent has yet to be provided, transmitting, by the processor and using the communication module, a consent request to a client device associated with the second A/V recording and communication device, the consent request for sharing the second image data; and based on the transmitting of the consent request, receiving, by the processor and using the communication module, the second consent from the client device, the second consent for sharing the second image data; and based on the receiving of the second consent, transmitting, by the processor and using the communication module, the second image data to the public safety client device.

In another embodiment of the fourth aspect, wherein the database and the public safety client device are both associated with a public safety service.

In another embodiment of the fourth aspect, wherein the image data request further indicates a specified time window, and wherein the method further comprises: determining, by the processor, that the first image data was generated by the first camera during the specified time window, wherein the transmitting of the first image data from the database to the public safety client device is further based on the determining that the first image data was generated by the first camera during the specified time window.

In another embodiment of the fourth aspect, the method further comprises: receiving, by the processor and using the communication module, registration data associated with the first A/V recording and communication device, the registration data indicating that image data generated by the first camera of the first A/V recording and communication device may be shared with a public safety service, wherein the determining that the first consent has been provided for sharing the first image data is based on the receiving of the registration data.

In another embodiment of the fourth aspect, the method further comprises: generating, by the processor and using the communication module, a list indicating A/V recording and communication devices that have provided consent for sharing image data with a public safety service; and determining, by the processor, that the first A/V recording and communication device is included in the list, wherein the determining that the first consent has been provided for sharing the first image data is based on the determining that the first A/V recording and communication device is included in the list.

In another embodiment of the fourth aspect, the method further comprises: transmitting, by the processor and using the communication module, at least one of a first location associated with the first A/V recording and communication device and a second location associated with the second A/V recording and communication device.

In another embodiment of the fourth aspect, the method further comprises: determining, by the processor, a first location associated with the first A/V recording and communication device; generating, by the processor and based on the first location, a second location associated with the A/V recording and communication device; determining, by the processor, a third location associated with the second A/V recording and communication device; generating, by the processor and based on the third location, a fourth location associated with the second A/V recording and communication device; and transmitting, by the processor and using the communication module, at least one of the second location associated with the first A/V recording and communication device and the fourth location associated with the second A/V recording and communication device.

In a fifth aspect, a method implemented by a client device that includes a display, a communication module, and a processor, the method comprising: causing, by the processor, a graphical user interface (GUI) to be displayed on the display, the GUI configured for requesting image data from at least an authorized audio/video (A/V) recording and communication device and a third-party A/V recording and communication device; receiving, by the processor, a first input indicating a first location; based on the receiving of the first input, causing, by the processor, a map of an area that is associated with the first location to be displayed on the GUI; transmitting, by the processor and using the communication module, the first location to a network device; based on the transmitting the first location receiving, by the processor and using the communication module, from the network device, a second location associated with the authorized A/V recording and communication device and a third location associated with the third-party A/V recording and communication device; in response to the receiving of the second location and the third location, causing, by the processor, the second location associated with the authorized A/V recording and communication device and the third location associated with the third-party A/V recording and communication device to be displayed on the map; receiving, by the processor, a second input indicative of an image data request, the image data request including a specified time window and a request for first image data from the authorized A/V recording and communication device and second image data from the third-party A/V recording and communication device; based on the receiving of the second input, transmitting, by the processor and using the communication module, the image data request to the network device; and in response to the transmitting of the image data request, receiving, by the processor and using the communication module, from the network device, the first image data generated by the authorized A/V recording and communication device and the second image data generated by the third-party A/V recording and communication device during the specified time window.

In an embodiment of the fifth aspect, wherein the client device is associated with a public safety service.

In another embodiment of the fifth aspect, the method further comprises: based on the receiving of the first image data and the second image data, causing, by the processor, a first indication associated with the first image data and a second indication associated with the second image data to be displayed on the map.

In another embodiment of the fifth aspect, the method further comprises: receiving, by the processor, a third input selecting the first indication; and based on the receiving of the third input, causing, by the processor, the first image data to be displayed on the GUI.

In another embodiment of the fifth aspect, wherein: the receiving of the first input indicating the first location comprises receiving, by the processor, the first input indicating an address; and the causing the map of the area that is associated with the first location to be displayed on the GUI comprise causing, by the processor, the map of the area that is associated with the address to be displayed on the GUI.

In another embodiment of the fifth aspect, the method further comprises: causing, by the processor, a first icon that indicates the first location to be displayed on the map; causing, by the processor, a second icon that indicates the second location associated with the authorized A/V recording and communication device to be displayed on the map; and causing, by the processor, a third icon that indicates the third location associated with the third-party A/V recording and communication device to be displayed on the map.

In another embodiment of the fifth aspect, wherein, before receiving the second input, the method further comprises: receiving, by the processor and using the communication module, from the network device, a first indication that the network device is storing the first image data and a second indication that the network device is storing the second image data; and causing, by the processor, a first icon that indicates the remote system is storing the first image data to be displayed on the map; and causing, by the processor, a second icon that indicates the remote system is storing the second image data to be displayed on the map.

In another embodiment of the fifth aspect, wherein, before receiving the second input, the method further comprises: causing, by the processor, a first icon that indicates the authorized A/V recording and communication device is authorized to be displayed on the map; and causing, by the processor, a second icon that indicates the unauthorized A/V recording and communication device is unauthorized to be displayed on the map.

In another embodiment of the fifth aspect, the method further comprises: receiving, by the processor, a third input indicative of a specified area for retrieving image data from A/V recording and communication devices; based on the receiving the third input, causing, by the processor, the specified area to be displayed on the map; and transmitting, by the processor and using the communication module, the specified area to the network device, wherein the receiving of the second location and the third location is based on the second location and the third location being within the specified area.

In another embodiment of the fifth aspect, the method further comprises: transmitting, by the processor and using the communication module, third image data to the network device, the third image data depicting a person; and based on the receiving of the first image data and the second image data, causing, by the processor, a first indication associated with the first image data and a second indication associated with the second image data to be displayed on the GUI, wherein one of: the first indication is displayed before the second indication based on the first image data depicting the person; and the second indication is displayed before the second indication based on the first image data depicting the person.

In another embodiment of the fifth aspect, the method further comprises: transmitting, by the processor and using the communication module, identification data to the network device, the identification data being associated with at least one of a person and an object; and based on the receiving of the first image data and the second image data, causing, by the processor, a first indication associated with the first image data and a second indication associated with the second image data to be displayed on the GUI, wherein one of: the first indication is displayed before the second indication based on the first image data depicting the at least one of the person and the object; and the second indication is displayed before the first indication based on the second image data depicting the at least one of the person and the object.

In another embodiment of the fifth aspect, the method further comprises, wherein at least one of the first location does not include an actual location of the authorized A/V recording and communication device and the second location does not include an actual location of the third-party A/V recording and communication device.

In a sixth aspect, a computer program product, embodied in code executable by a processor, which when executed causes the processor to perform operations comprising: causing a graphical user interface (GUI) to be displayed on a display, the GUI configured for requesting image data from at least an authorized audio/video (A/V) recording and communication device and a third-party A/V recording and communication device; receiving a first input indicating a first location; based on the receiving of the first input, causing a map of an area that is associated with the first location to be displayed on the GUI; transmitting, using the communication module, the first location to a network device; based on the transmitting the first location receiving, using the communication module and from the network device, a second location associated with the authorized A/V recording and communication device and a third location associated with the third-party A/V recording and communication device; in response to the receiving of the second location and the third location, causing the second location associated with the authorized A/V recording and communication device and the third location associated with the third-party A/V recording and communication device to be displayed on the map; receiving a second input indicative of an image data request, the image data request including a specified time window and a request for first image data from the authorized A/V recording and communication device and second image data from the third-party A/V recording and communication device; based on the receiving of the second input, transmitting, using the communication module, the image data request to the network device; and in response to the transmitting of the image data request, receiving, using the communication module and from the network device, the first image data generated by the authorized A/V recording and communication device and the second image data generated by the third-party A/V recording and communication device during the specified time window.

In an embodiment of the sixth aspect, the operations further comprising: based on the receiving of the first image data and the second image data, causing a first indication associated with the first image data and a second indication associated with the second image data to be displayed on the map.

In another embodiment of the sixth aspect, the operations further comprising: receiving a third input selecting the first indication; and based on the receiving of the third input, causing the first image data to be displayed on the GUI.

In another embodiment of the sixth aspect, wherein: the receiving of the first input indicating the first location comprises receiving the first input indicating an address; and the causing of the map of the area that is associated with the first location to be displayed on the GUI comprise causing the map of the area that is associated with the address to be displayed on the GUI.

In another embodiment of the sixth aspect, the operations further comprising: causing a first icon that indicates the first location to be displayed on the map; causing a second icon that indicates the second location associated with the authorized A/V recording and communication device to be displayed on the map; and causing a third icon that indicates the third location associated with the third-party A/V recording and communication device to be displayed on the map.

In another embodiment of the sixth aspect, wherein, before receiving the second input, the operations further comprise: receiving, using the communication module, a first indication that a network device is storing the first image data and a second indication that the network device is storing the second image data; causing a first icon that indicates that the remote system is storing the first image data to be displayed on the map; and causing a second icon that indicates that the remote system is storing the second image data to be displayed on the map.

In another embodiment of the sixth aspect, wherein, before receiving the second input, the operations further comprise: causing a first icon that indicates the authorized A/v recording and communication device is authorized to be displayed on the map; and causing a second icon that indicates the unauthorized A/v recording and communication device is unauthorized to be displayed on the map.

In another embodiment of the sixth aspect, the operations further comprising: receiving a third input indicative of a specified area for retrieving image data from A/V recording and communication devices; based on the receiving the third input, causing the specified area to be displayed on the map; and transmitting, using the communication module, the specified area to the network device, wherein the receiving of the second location and the third location is based on the second location and the third location being within the specified area.

In another embodiment of the sixth aspect, the operations further comprising: transmitting, using the communication module, third image data to the network device, the third image data depicting a person; and based on the receiving of the first image data and the second image data, causing a first indication associated with the first image data and a second indication associated with the second image data to be displayed on the GUI, wherein one of: the first indication is displayed before the second indication based on the first image data depicting the person; and the second indication is displayed before the second indication based on the first image data depicting the person.

In another embodiment of the sixth aspect, the operations further comprising: transmitting, using the communication module, identification data to the network device, the identification data being associated with at least one of a person and an object; and based on the receiving of the first image data and the second image data, causing a first indication associated with the first image data and a second indication associated with the second image data to be displayed on the GUI, wherein one of: the first indication is displayed before the second indication based on the first image data depicting the at least one of the person and the object; and the second indication is displayed before the first indication based on the second image data depicting the at least one of the person and the object.

In another embodiment of the sixth aspect, wherein at least one of the first location does not include an actual location of the authorized A/V recording and communication device and the second location does not include an actual location of the third-party A/V recording and communication device.

In a seventh aspect, a method implemented by a client device that includes a display, a communication module, and a processor, the method comprising: causing, by the processor, a graphical user interface (GUI) to be displayed on the display, the GUI for requesting image data; receiving, by the processor, a first input indicating a first location; based on the receiving of the first input, causing, by the processor, a map of an area that is associated with the first location to be displayed on the GUI; receiving, by the processor and using the communication module, first location data for a video device; based on the first location data, causing, by the processor, a second location associated with the video device to be displayed on the map; receiving, by the processor, a second input indicative of a selection of the video device; in response to receiving the second input, transmitting, by the processor and using the communication module, an image data request for image data generated by the video device; and based on the transmitting of the image data request, receiving, by the processor and using the communication module, the image data generated by the video device.

In an embodiment of the seventh aspect, wherein the client device is associated with a public safety service.

In another embodiment of the seventh aspect, the method further comprises: based on the receiving of the image data, causing, by the processor, an indication associated with the image data to be displayed on the GUI.

In another embodiment of the seventh aspect, the method further comprises: receiving, by the processor, a third input selecting the indication; and based on the receiving of the third input, causing, by the processor, the image data to be displayed on the GUI.

In another embodiment of the seventh aspect, wherein: the receiving of the first input indicating the first location comprises receiving, by the processor, the first input indicating an address; and the causing of the map of the area that is associated with the first location to be displayed on the GUI comprises causing, by the processor, the map of the area that is associated with the address to be displayed on the GUI.

In another embodiment of the seventh aspect, the method further comprises: causing, by the processor, a first icon that indicates the first location to be displayed on the map; and causing, by the processor, a second icon that indicates the second location to be displayed on the map.

In another embodiment of the seventh aspect, wherein, before receiving the second input, the method further comprises: receiving, by the processor and using the communication module, a first indication that a network device is storing the first image data; and causing, by the processor, an icon that indicates the remote system is storing the image data to be displayed on the map.

In another embodiment of the seventh aspect, the method further comprises: receiving, by the processor, a third input indicative of a specified area for retrieving image data from A/V recording and communication devices; based on the receiving the third input, causing, by the processor, the specified area to be displayed on the map, wherein the causing of the second location associated with the video device to be displayed on the map is further based on the second location being within the specified area.

In another embodiment of the seventh aspect, the method further comprises: receiving, by the processor, a third input indicating a specified time window, wherein the image data request indicates the specified time window for the image data.

In another embodiment of the seventh aspect, wherein the image data comprises first image data, and wherein the method further comprises: receiving, by the processor and using the communication module, second location data for an audio/video (A/V) recording and communication device; based on the second location data, causing, by the processor, a third location associated with the A/V recording and communication device to be displayed on the map; receiving, by the processor, a third input indicative of a selection of the A/V recording and communication device; in response to receiving the third input, transmitting, by the processor and using the communication module, a second image data request for second image data generated by the A/V recording and communication device; and based on the transmitting of the second image data request, receiving, by the processor and using the communication module, the second image data generated by the A/V recording and communication device.

In another embodiment of the seventh aspect, the method further comprises: transmitting, by the processor and using the communication module, third image data depicting a person; causing, by the processor, a first indication associated with the first image data to be displayed on the GUI; and causing, by the processor, a second indication associated with the second image data to be displayed on the GUI, wherein one of: the first indication is displayed before the second indication based on the first image data depicting the person; and the second indication is displayed before the first image data based on the second image data depicting the person.

In another embodiment of the seventh aspect, the method further comprises: transmitting, by the processor and using the communication module, identification data associated with at least one of a person and an object; causing, by the processor, a first indication associated with the first image data to be displayed on the GUI; and causing, by the processor, a second indication associated with the second image data to be displayed on the GUI, wherein one of: the first indication is displayed before the second indication based on the first image data depicting the at least one of the person and the object; and the second indication is displayed before the first indication based on the second image data depicting the at least one of the person and the object.

In another embodiment of the seventh aspect, wherein: the first location data indicates the second location associated with the video device; the second location data indicates the third location associated with the A/V recording and communication device; and at least one of the first location does not include an actual location of the video device and the second location does not include an actual location of the A/V recording and communication device.

In an eighth aspect, a computer program product, embodied in code executable by a processor, which when executed causes the processor to perform operations comprising: causing a graphical user interface (GUI) to be displayed on the display, the GUI for requesting image data; receiving a first input indicating a first location; based on the receiving of the first input, causing a map of an area that is associated with the first location to be displayed on the GUI; receiving, using the communication module, first location data for a video device; based on the first location data, causing a second location associated with the video device to be displayed on the map; receiving a second input indicative of a selection of the video device; in response to receiving the second input, transmitting, using the communication module, an image data request for image data generated by the video device; and based on the transmitting of the image data request, receiving, using the communication module, the image data generated by the video device.

In an embodiment of the eighth aspect, the operations further comprising: based on the receiving of the image data, causing an indication associated with the image data to be displayed on the GUI.

In another embodiment of the eighth aspect, the operations further comprising: receiving a third input selecting the indication; and based on the receiving of the third input, causing the image data to be displayed on the GUI.

In another embodiment of the eighth aspect, wherein: receiving the first input indicating the first location comprises receiving the first input indicating an address; and causing the map of the area that is associated with the first location to be displayed on the GUI comprise causing the map of the area that is associated with the address to be displayed on the GUI.

In another embodiment of the eighth aspect, the operations further comprising: causing a first icon that indicates the first location to be displayed on the map; and causing a second icon that indicates the second location to be displayed on the map.

In another embodiment of the eighth aspect, wherein, before receiving the second input, the operations further comprising: receiving, using the communication module, a first indication that a network device is storing the first image data; and causing an icon that indicates the remote system is storing the image data to be displayed on the map.

In another embodiment of the eighth aspect, the operations further comprising: receiving a third input indicative of a specified area for retrieving image data from A/V recording and communication devices; based on the receiving the third input, causing the specified area to be displayed on the map, wherein the causing of the second location associated with the video device to be displayed on the map is further based on the second location being within the specified area.

In another embodiment of the eighth aspect, the operations further comprising: receiving a third input indicating a specified time window, wherein the image data request indicates the specified time window for the image data.

In another embodiment of the eighth aspect, wherein the image data comprises first image data, and wherein the operations further comprise: receiving, using the communication module, second location data for an audio/video (A/V) recording and communication device; based on the second location data, causing a third location associated with the A/V recording and communication device to be displayed on the map; receiving a third input indicative of a selection of the A/V recording and communication device; in response to receiving the third input, transmitting, using the communication module, a second image data request for second image data generated by the A/V recording and communication device; and based on the transmitting of the second image data request, receiving, using the communication module, the second image data generated by the A/V recording and communication device.

In another embodiment of the eighth aspect, the operations further comprising: transmitting, using the communication module, third image data depicting a person; causing a first indication associated with the first image data to be displayed on the GUI; and causing a second indication associated with the second image data to be displayed on the GUI, wherein one of: the first indication is displayed before the second indication based on the first image data depicting the person; and the second indication is displayed before the first indication based on the second image data depicting the person.

In another embodiment of the eighth aspect, the operations further comprising: transmitting, using the communication module, identification data associated with at least one of a person and an object; causing a first indication associated with the first image data to be displayed on the GUI; and causing a second indication associated with the second image data to be displayed on the GUI, wherein one of: the first indication is displayed before the second indication based on the first image data depicting the at least one of the person and the object; and the second indication is displayed before the first indication based on the second image data depicting the at least one of the person and the object.

In another embodiment of the eighth aspect, wherein: the first location data indicates the second location associated with the video device; the second location data indicates the third location associated with the A/V recording and communication device; and at least one of the first location does not include an actual location of the video device and the second location does not include an actual location of the A/V recording and communication device.

BRIEF DESCRIPTION OF THE DRAWINGS

The various embodiments of the present apparatus, systems, and methods for sharing video footage from audio/video recording and communication devices now will be discussed in detail with an emphasis on highlighting the advantageous features. These embodiments depict the novel and non-obvious apparatus, systems, and methods for sharing video footage from audio/video recording and communication devices shown in the accompanying drawings, which are for illustrative purposes only. These drawings include the following figures, in which like numerals indicate like parts:

FIGS. 3-7 are sample screenshots of a graphical user interface (GUI) associated with a process for enabling a requesting party to request video footage from one or more A/V recording and communication devices;

DETAILED DESCRIPTION

Figure 1:
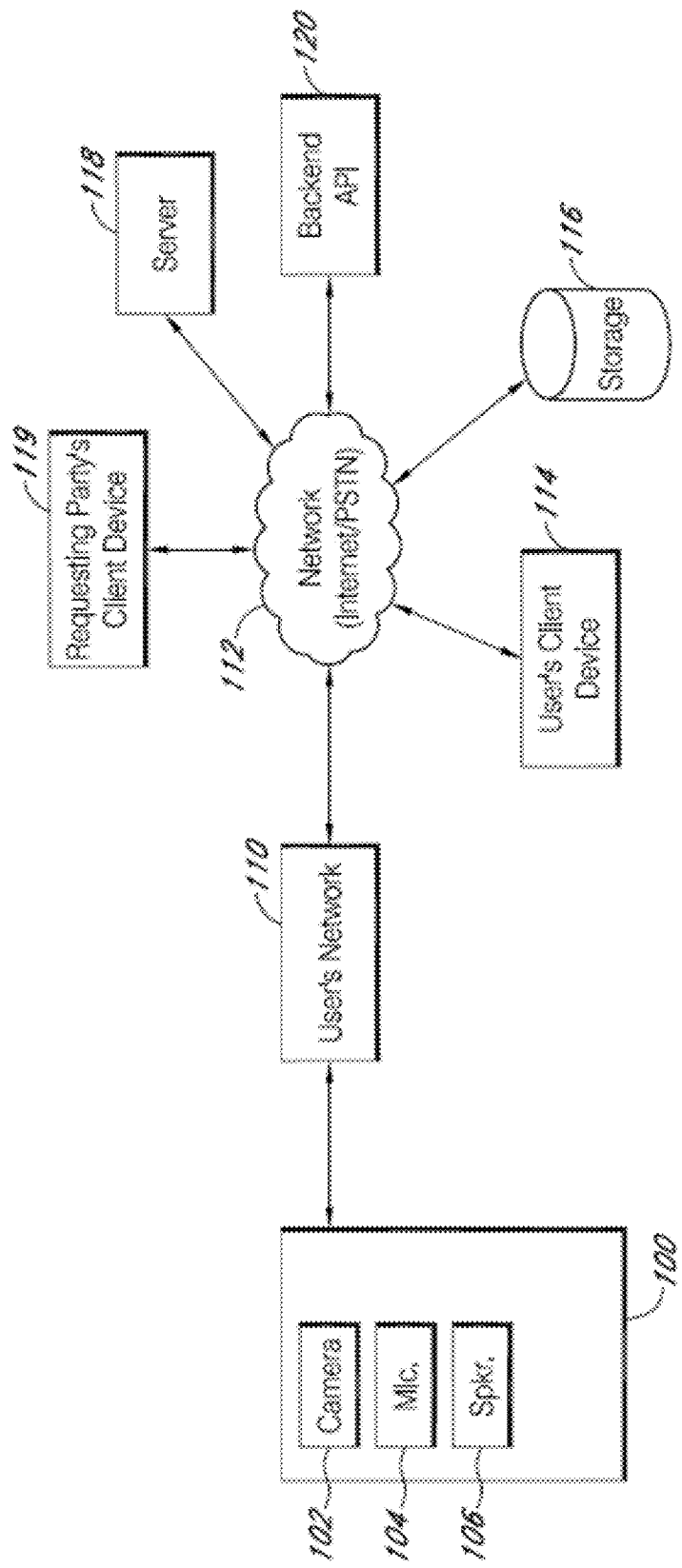
FIG. 1 is a functional block diagram illustrating a system including an A/V recording and communication device according to the present embodiments.

The following detailed description describes the present embodiments with reference to the drawings. In the drawings, reference numbers label elements of the present embodiments. These reference numbers are reproduced below in connection with the discussion of the corresponding drawing features.

The embodiments of the present apparatus, systems, and methods for sharing video footage from audio/video recording and communication devices are described below with reference to the figures. These figures, and their written descriptions, indicate that certain components of the apparatus are formed integrally, and certain other components are formed as separate pieces. Those of ordinary skill in the art will appreciate that components shown and described herein as being formed integrally may in alternative embodiments be formed as separate pieces. Those of ordinary skill in the art will further appreciate that components shown and described herein as being formed as separate pieces may in alternative embodiments be formed integrally. Further, as used herein the term integral describes a single unitary piece.

With reference to FIG. 1, the present embodiments include an audio/video (A/V) communication device 100. While some of the present disclosure provides numerous examples of methods and systems including A/V recording and communication doorbells, the present embodiments are equally applicable for other types of A/V recording and communication devices. For example, the present embodiments may include one or more A/V recording and communication security cameras instead of, or in addition to, one or more A/V recording and communication doorbells. An example A/V recording and communication security camera may include substantially all of the structure and functionality of the doorbells described herein, but without the front button and related components.

The A/V recording and communication device 100 is typically located near the entrance to a structure (not shown), such as a dwelling, a business, a storage facility, etc. The A/V recording and communication device 100 includes a camera 102, a microphone 104, and a speaker 106. The camera 102 may comprise, for example, a high definition (HD) video camera, such as one capable of capturing video images at an image display resolution of 720p or better. While not shown, the A/V recording and communication device 100 may also include other hardware and/or components, such as a housing, one or more motion sensors (and/or other types of sensors), a button, etc. The A/V recording and communication device 100 may further include similar componentry and/or functionality as the wireless communication devices described in US Patent Application Publication Nos. 2015/0022620 (application Ser. No. 14/499,828) and 2015/0022618 (application Ser. No. 14/334,922), both of which are incorporated herein by reference in their entireties as if fully set forth.

With further reference to FIG. 1, the A/V recording and communication device 100 communicates with a user's network 110, which may be for example a wired and/or wireless network. If the user's network 110 is wireless, or includes a wireless component, the network 110 may be a Wi-Fi network compatible with the IEEE 802.11 standard and/or other wireless communication standard(s). The user's network 110 is connected to another network 112, which may comprise, for example, the Internet and/or a public switched telephone network (PSTN). As described below, the A/V recording and communication device 100 may communicate with the user's client device 114 via the user's network 110 and the network 112 (Internet/PSTN). The user's client device 114 may comprise, for example, a personal computer, such as a desktop computer, a laptop computer, a tablet, etc. The user's client device 114 may further comprise, for example, a mobile telephone (may also be referred to as a cellular telephone), such as a smartphone, a personal digital assistant (PDA), or another communication device. The user's client device 114 comprises a display (not shown) and related components capable of displaying streaming and/or recorded video images. The user's client device 114 may also comprise a speaker and related components capable of broadcasting streaming and/or recorded audio, and may also comprise a microphone. The A/V recording and communication device 100 may also communicate with one or more remote storage device(s) 116 (may be referred to interchangeably as "cloud storage device(s)"), one or more servers 118, and/or a backend API (application programming interface) 120 via the user's network 110 and the network 112 (Internet/PSTN). While FIG. 1 illustrates the storage device 116, the server 118, and the backend API 120 as components separate from the network 112, it is to be understood that the storage device 116, the server 118, and/or the backend API 120 may be considered to be components of the network 112.

The network 112 may be any wireless network or any wired network, or a combination thereof, configured to operatively couple the above-mentioned modules, devices, and systems as shown in FIG. 1. For example, the network 112 may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access), TDMA (Time Division Multiple Access), FDMA (Frequency Division Multiple Access), and/or OFDMA (Orthogonal Frequency Division Multiple Access) cellular phone networks, GPS, CDPD (cellular digital packet data), RIM (Research in Motion, Limited) duplex paging network, Bluetooth radio, or an IEEE 802.11-based radio frequency network. The network may further include or interface with any one or more of the following: RS-232 serial connection, IEEE-1394 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking.

According to one or more aspects of the present embodiments, when a person (may be referred to interchangeably as "visitor") arrives at the A/V recording and communication device 100, the A/V recording and communication device 100 detects the visitor's presence and begins capturing video images and/or still images (also referred to as "image data")

within a field of view of the camera 102. The A/V recording and communication device 100 may also capture audio through the microphone 104. The A/V recording and communication device 100 may detect the visitor's presence using a motion sensor, and/or by detecting that the visitor has depressed the button on the A/V recording and communication device 100.

In response to the detection of the visitor, the A/V recording and communication device 100 sends an alert to the user's client device 114 (FIG. 1) via the user's network 110 and the network 112. The A/V recording and communication device 100 also sends streaming video, and may also send streaming audio, to the user's client device 114. If the user answers the alert, two-way audio communication may then occur between the visitor and the user through the A/V recording and communication device 100 and the user's client device 114. The user may view the visitor throughout the duration of the call, but the visitor cannot see the user (unless the A/V recording and communication device 100 includes a display, which it may in some embodiments).

The video images captured by the camera 102 of the A/V recording and communication device 100 (and the audio captured by the microphone 104) may be uploaded to the cloud and recorded on the remote storage device 116 (FIG. 1). In some embodiments, the video and/or audio may be recorded on the remote storage device 116 even if the user chooses to ignore the alert sent to his or her client device 114.

With further reference to FIG. 1, the system may further comprise a backend API 120 including one or more components. A backend API (application programming interface) may comprise, for example, a server (e.g. a real server, or a virtual machine, or a machine running in a cloud infrastructure as a service), or multiple servers networked together, exposing at least one API to client(s) accessing it. These servers may include components such as application servers (e.g. software servers), depending upon what other components are included, such as a caching layer, or database layers, or other components. A backend API may, for example, comprise many such applications, each of which communicate with one another using their public APIs. In some embodiments, the API backend may hold the bulk of the user data and offer the user management capabilities, leaving the clients to have very limited state.

The backend API 120 illustrated FIG. 1 may include one or more APIs. An API is a set of routines, protocols, and tools for building software and applications. An API expresses a software component in terms of its operations, inputs, outputs, and underlying types, defining functionalities that are independent of their respective implementations, which allows definitions and implementations to vary without compromising the interface. Advantageously, an API may provide a programmer with access to an application's functionality without the programmer needing to modify the application itself, or even understand how the application works. An API may be for a web-based system, an operating system, or a database system, and it provides facilities to develop applications for that system using a given programming language. In addition to accessing databases or computer hardware like hard disk drives or video cards, an API may ease the work of programming GUI components. For example, an API may facilitate integration of new features into existing applications (a so-called "plug-in API"). An API may also assist otherwise distinct applications with sharing data, which may help to integrate and enhance the functionalities of the applications.

The backend API 120 illustrated in FIG. 1 may further include one or more services (also referred to as network services). A network service is an application that provides data storage, manipulation, presentation, communication, and/or other capability. Network services are often implemented using a client-server architecture based on application-layer network protocols. Each service may be provided by a server component running on one or more computers (such as a dedicated server computer offering multiple services) and accessed via a network by client components running on other devices. However, the client and server components may both be run on the same machine. Clients and servers may have a user interface, and sometimes other hardware associated with them.

One aspect of the present embodiments includes the realization that audio/video (A/V) recording and communication devices may from time to time record video footage of criminal activity and/or of criminal perpetrators. This video footage may be useful to law enforcement agencies, not only because it may be evidence of the commission of a crime and of the person(s) responsible for the crime (if the crime is caught on video), but also because it may provide information about a location of a criminal perpetrator (if, for example, the crime is not caught on video, but a person wanted for questioning in connection with a crime is recorded by the A/V recording and communication device). It would be advantageous, then, to enhance the functionality of A/V recording and communication devices by facilitating easy sharing of video footage recorded by such devices with law enforcement. The present embodiments, as described in detail below, provide this enhancement. In particular, the present embodiments enable video footage captured by A/V recording and communication devices to be readily uploaded to the cloud and shared with a requesting party, such as a law enforcement agency. The footage from these A/V recording and communication devices, which may contain images of the perpetrator(s) of the crime and/or other valuable information, may then be used in identifying and/or capturing the perpetrator(s), thereby making communities safer.

Figure 2:
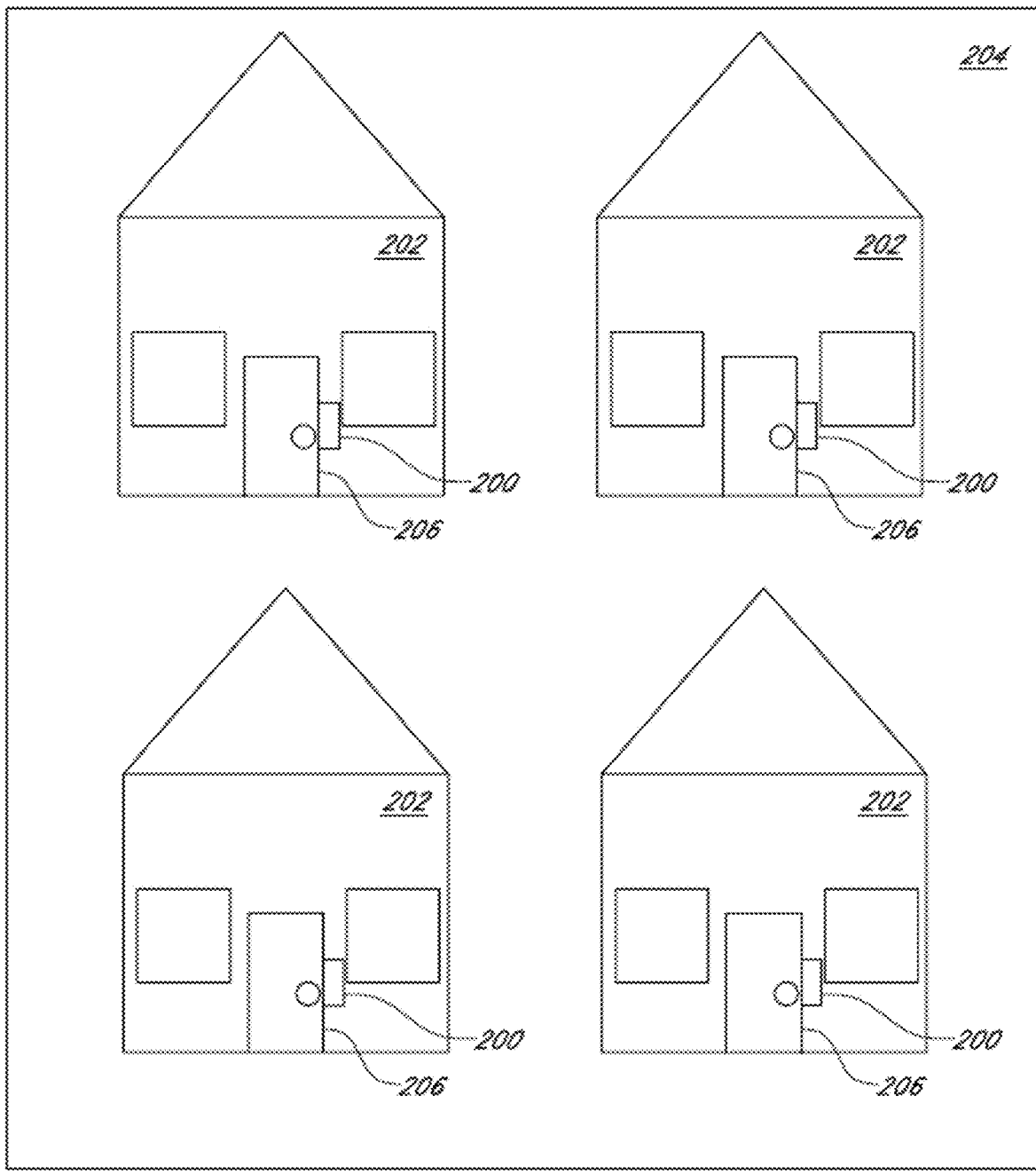
FIG. 2 is a functional block diagram illustrating a system for sharing video footage from A/V recording and communication devices according to the present embodiments.

FIG. 2 illustrates a plurality of A/V recording and communication devices 200 mounted on the exteriors of a plurality of homes 202 in a neighborhood 204. Each of the A/V recording and communication devices 200 is mounted near the entrance 206 of its respective home 202, such that each A/V recording and communication device 200 is configured to capture video footage (and, in some embodiments, accompanying audio) from an area adjacent to and within the field of view of the camera of the respective A/V recording and communication device 200. The video footage (also referred to as "image data") may be uploaded and stored in the cloud, as described above. According to the present embodiments, and as described in detail below, the video footage captured by each of the A/V recording and communication devices 200 and uploaded to the cloud may be shared with a requesting party, such as a law enforcement agency. For example, law enforcement may desire to gather video footage from one or more A/V devices that are located in the same vicinity as a crime that has occurred. The video footage from these A/V devices may contain images of the perpetrator(s) of the crime and/or other valuable information that may aid in identifying and/or capturing the perpetrator(s).

Figure 3:
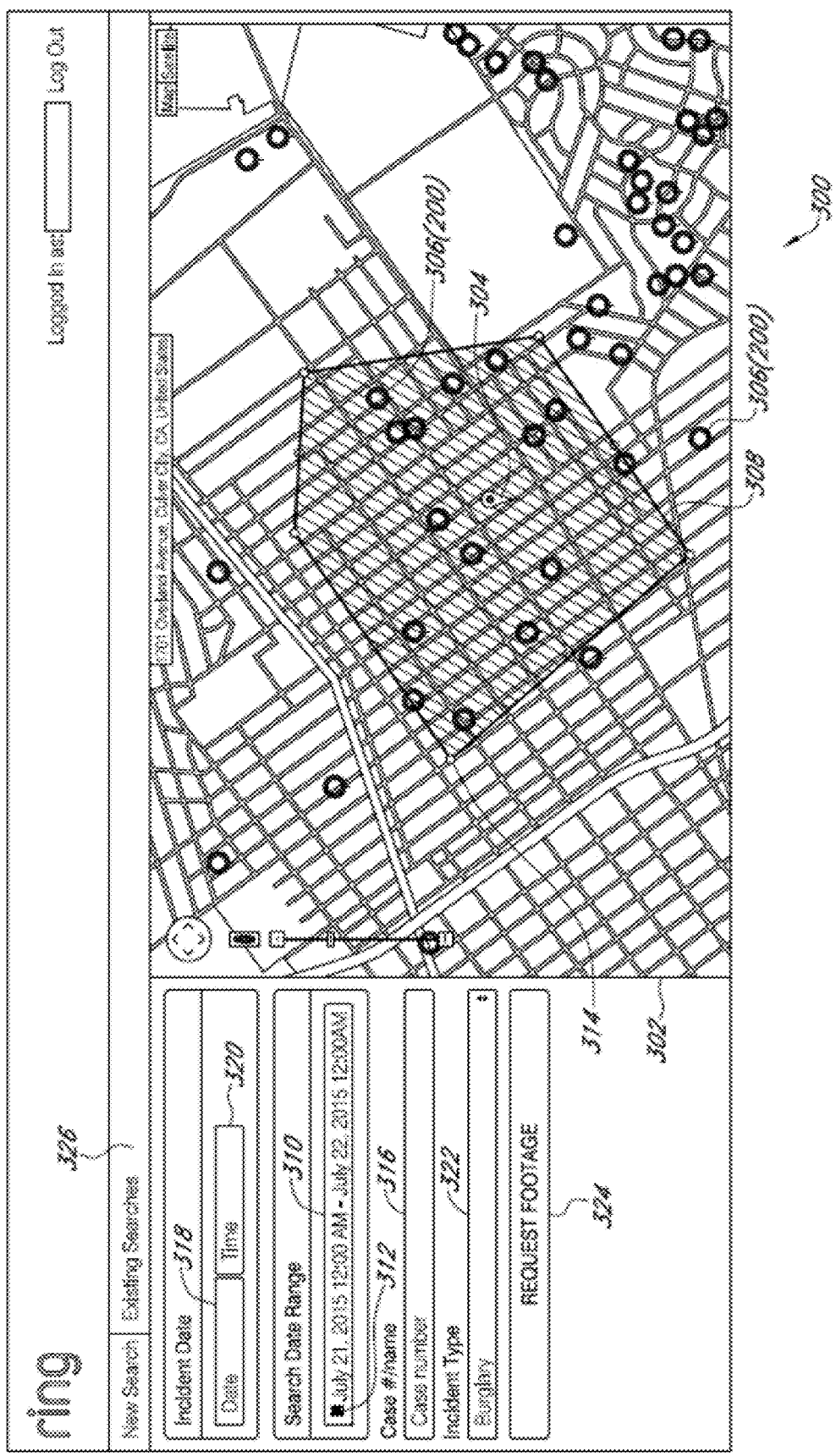

FIG. 3 illustrates one example of a graphical user interface (GUI 300) associated with a process for enabling a requesting party (or "requester") to request video footage from one or more A/V devices. The process, or program, may be embodied in code executable by one or more processors. The requesting party may, for example, login through a user portal at a website using a client device (requesting party's client device 119, FIG. 1). The requesting party's client device 119 may comprise, for example, a personal computer, such as a desktop computer, a laptop computer, a tablet, etc. The requesting party's client device 119 may further comprise, for example, a mobile telephone (may also be referred to as a cellular telephone), such as a smartphone, a personal digital assistant (PDA), or another communication device.

With further reference to FIG. 3, at the GUI 300 the requester may enter an address that identifies a location around which the requester wishes to gather video footage. The GUI 300 then displays a map 302 of the area 308 around the address. An icon of a first type 304 may indicate the location of the entered address on the map 302. The map 302 may further display one or more additional icons a second type 306 that indicate the locations of A/V recording and communication devices 200 (FIG. 2). The requester may specify an area 308 of interest (from which the requester wishes to gather video footage) by indicating the area 308 on the map 302. The GUI 300 identifies the locations of A/V recording and communication devices 200 within the specified area 308 by displaying them on the map 302 within the defined area 308. The GUI 300 may further include a mechanism, such as a text box 310 or a calendar 312, that enables the requester to specify a range of dates and/or times. If the requester enters a date range, the video footage provided to the requester is restricted to the specified date range.

The requester may specify the area 308 from which video footage will be gathered in any of a variety of ways. For example, the requester may draw a polygon of any shape and size on the map 302 of the GUI 300 by specifying locations of vertices 314 of the polygon, such as by touching the locations of the vertices 314, if the requester's client device includes a touchscreen, or by using a pointing device, such as a mouse or a trackball, and an onscreen pointer to specify the locations of the vertices 314. In certain embodiments, the polygon specified by the requester may not have any vertices 314, such as a circle. The requester in such an embodiment may specify an area of interest by providing a radius around the address (indicated on the map 302 by the icon of the first type 304) that the requester has entered.

With further reference to FIG. 3, the GUI 300 may also include one or more text boxes and/or dropdown menus that enable the requester to identify a given request with a case number or incident number 316, to specify an incident date 318 and/or time 320, and to specify an incident type 322. The GUI 300 may further include a button 324 that the requester presses after entering information in the text boxes and/or dropdown menus. Pressing the button 324 may cause the program to execute and return the video footage specified by the requester. The GUI 300 may also include a tab 326 that enables the requester to access previous (or existing) searches.

Figure 4:
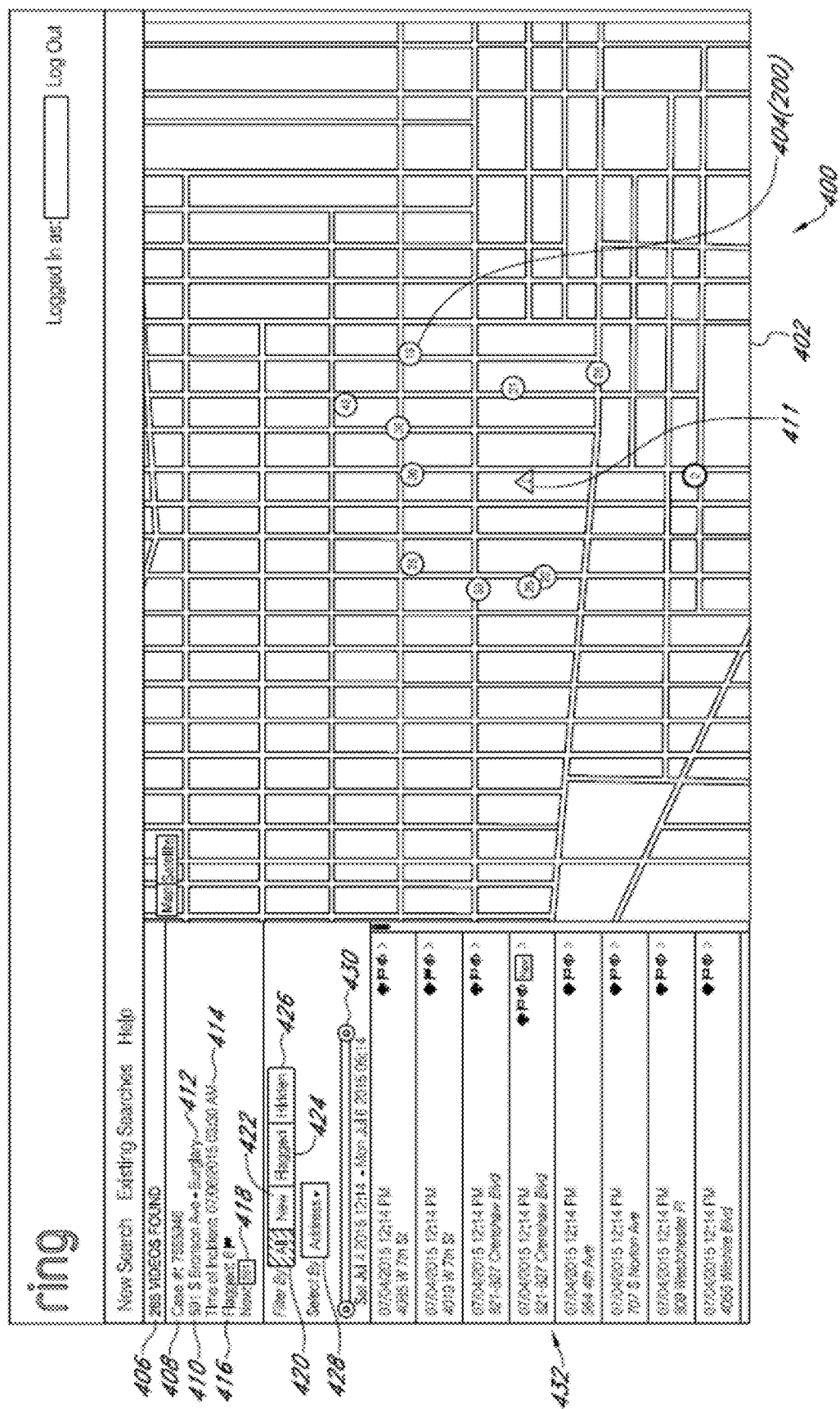

After the requester specifies an area 308, and optionally a date range 310/312 and/or any other criteria, as described above, the process identifies the video footage meeting the criteria specified by the requester, and returns the identified video footage to the requester. For example, FIG. 4 illustrates one example of a GUI 400 for presenting identified video footage to the requester. The GUI 400 includes a map 402 showing locations of A/V recording and communication devices 200 that have video footage meeting the requester's criteria. Icons 404 on the map 402 indicate the locations of the A/V recording and communication devices 200. In the illustrated embodiment, each icon 404 includes a number that indicates the number of videos associated with that A/V recording and communication device 200 that meet the requester's criteria. The GUI 400 may present additional information, such as the total number of videos 406 that meet the requester's criteria, a case number 408, the address 410 where the incident occurred, an incident icon 411 on the map 402 indicating the location of the address 410 where the incident occurred, the type of incident (such as a burglary 412), the date and time 414 of the incident, a first counter 416 that indicates the number of flagged videos (described in further detail below), a second counter 418 that indicates the number of new videos (described in further detail below), one or more filter buttons 420, 422, 424, 426, a dropdown menu 428 for selecting videos by address, and/or a date range selector 430.

Figure 5:
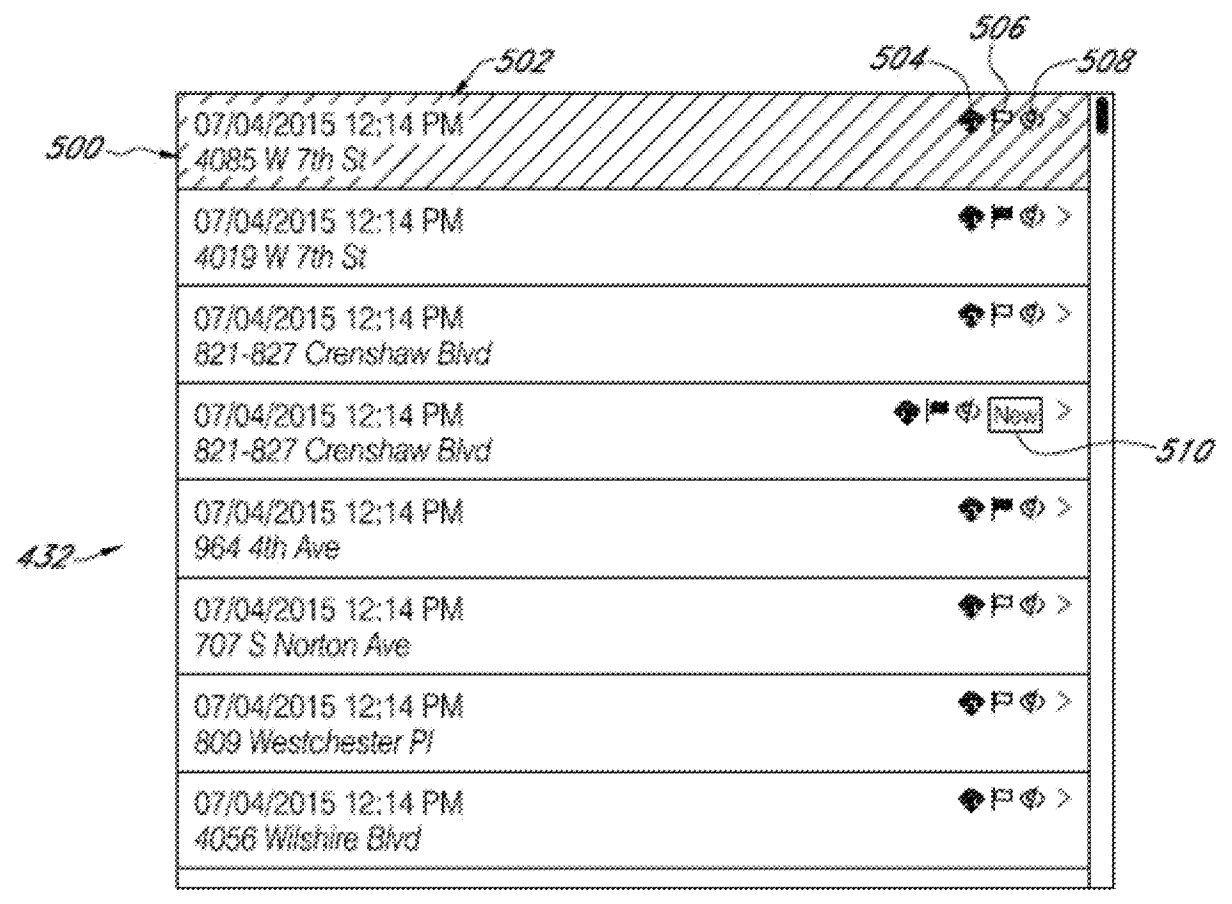
Figure 6:
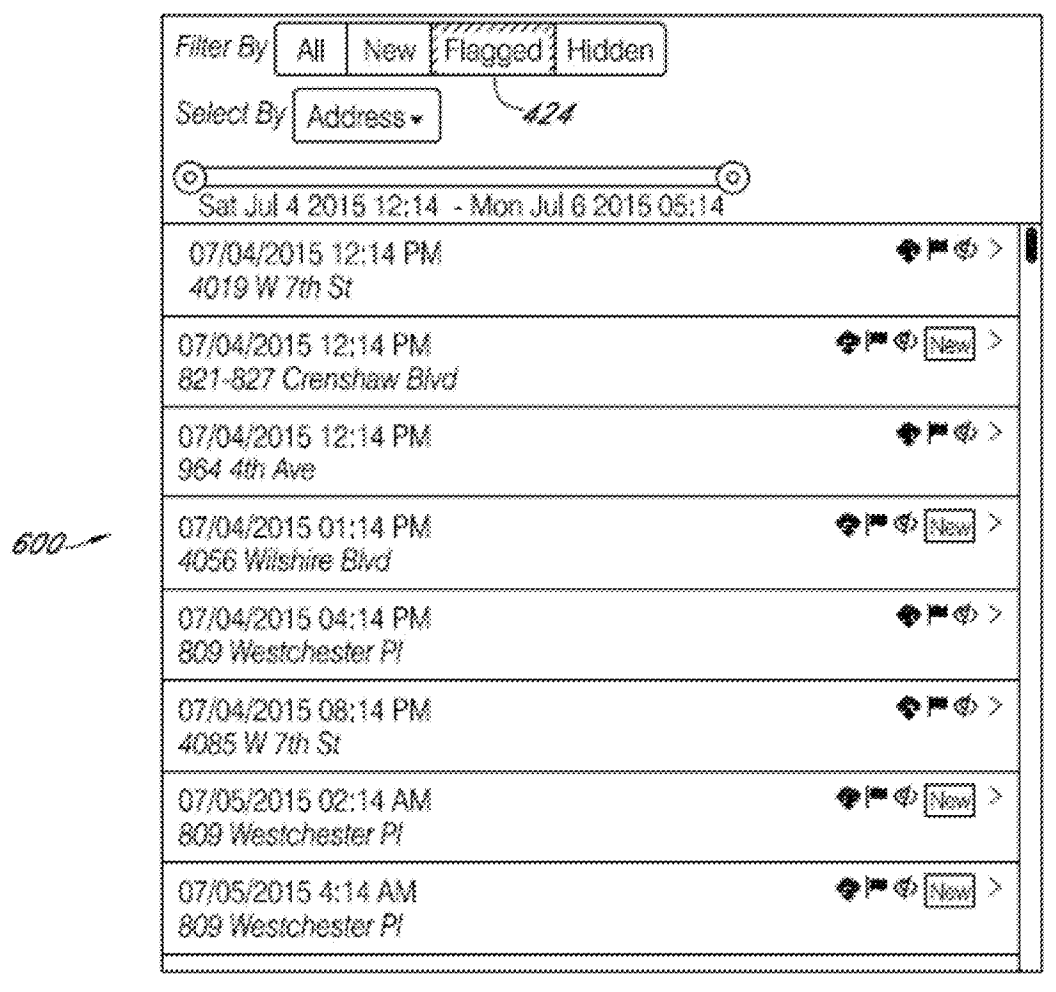

With further reference to FIG. 4, the GUI 400 may further present a list of the videos 432 that meet the requester's criteria. With reference to FIG. 4 and to FIG. 5, which presents a magnified view of the video list 432, each video in the list 432 may include identifying information, such as the address 500 where the A/V device that recorded the video is located, and/or the date and time 502 that the video was recorded. With further reference to FIG. 5, each video in the list 432 may further include a download icon 504, a flag icon 506, a hide icon 508, a new icon 510, and/or other icons (not shown). If the requester selects the download icon 504, the video associated with that download icon 504 is downloaded to the requester's client device 119. If the requester selects the flag icon 506, the video associated with that flag icon 506 is added to the group of "flagged" videos, and the appearance of the flag icon 506 may change. For example, in the illustrated embodiment the color of the flag icon 506 changes from gray to red when selected. The requester may subsequently narrow the list of videos shown by selecting the Flagged filter button 424 (FIG. 4), after which only those videos that have been flagged are shown in a modified list 600, as illustrated in FIG. 6.

With reference to FIGS. 4 and 5, if the user selects the hide icon 508 next to a given video, the video associated with that hide icon 508 may disappear from the list 432. The user may subsequently see a list of only hidden videos by selecting the Hidden filter button 426 (FIG. 4). With reference to FIG. 5, the new icon 510 identifies videos that have recently been recorded and/or uploaded to the cloud, and/or that the requester has not yet viewed. After the requester views a video that includes a new icon 510, the new icon 510 may no longer appear next to that video in the list 432. If the requester selects the New filter button 422 (FIG. 4), the videos displayed in the list 432 may include only those that include the new icon 510.

With further reference to FIG. 4, the GUI 400 may further present a dropdown address menu 428 that allows the user to narrow the videos in the list 432 to only those associated with the A/V device at a particular address. The GUI 400 may further present a selectable date range 430. In the illustrated embodiment, the selectable date range 430 includes a slider at either end. By moving the sliders, the user may narrow or broaden the date range, after which the program will narrow or broaden the videos displayed in the list 432 to include only those videos that fall within the specified date range.

Figure 7:
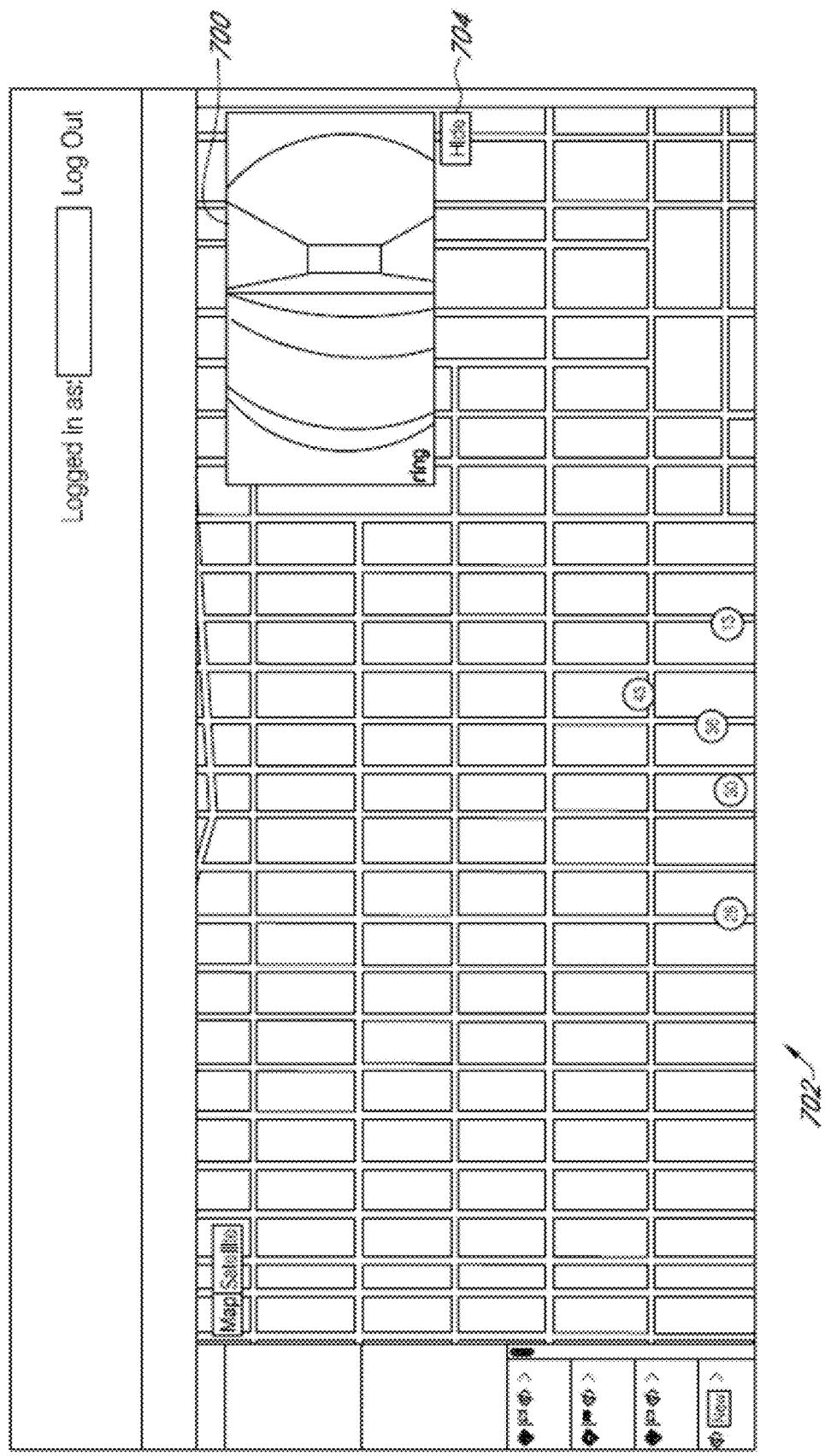

With reference to FIG. 7, when the user selects one of the videos from the list 432, such as by double-clicking on the selected video, the selected video 700 may playback within a portion of the GUI 702. In the illustrated embodiment, the selected video 700 plays in the upper-right corner of the GUI 702, but in other embodiments the selected video 700 may play in a different portion of the GUI 702, or may open in a new window, for example. The GUI 702 may further include a Hide button 704 that causes the selected video 700 to disappear from the GUI 702 when the Hide button 704 is selected.

Figure 8A:
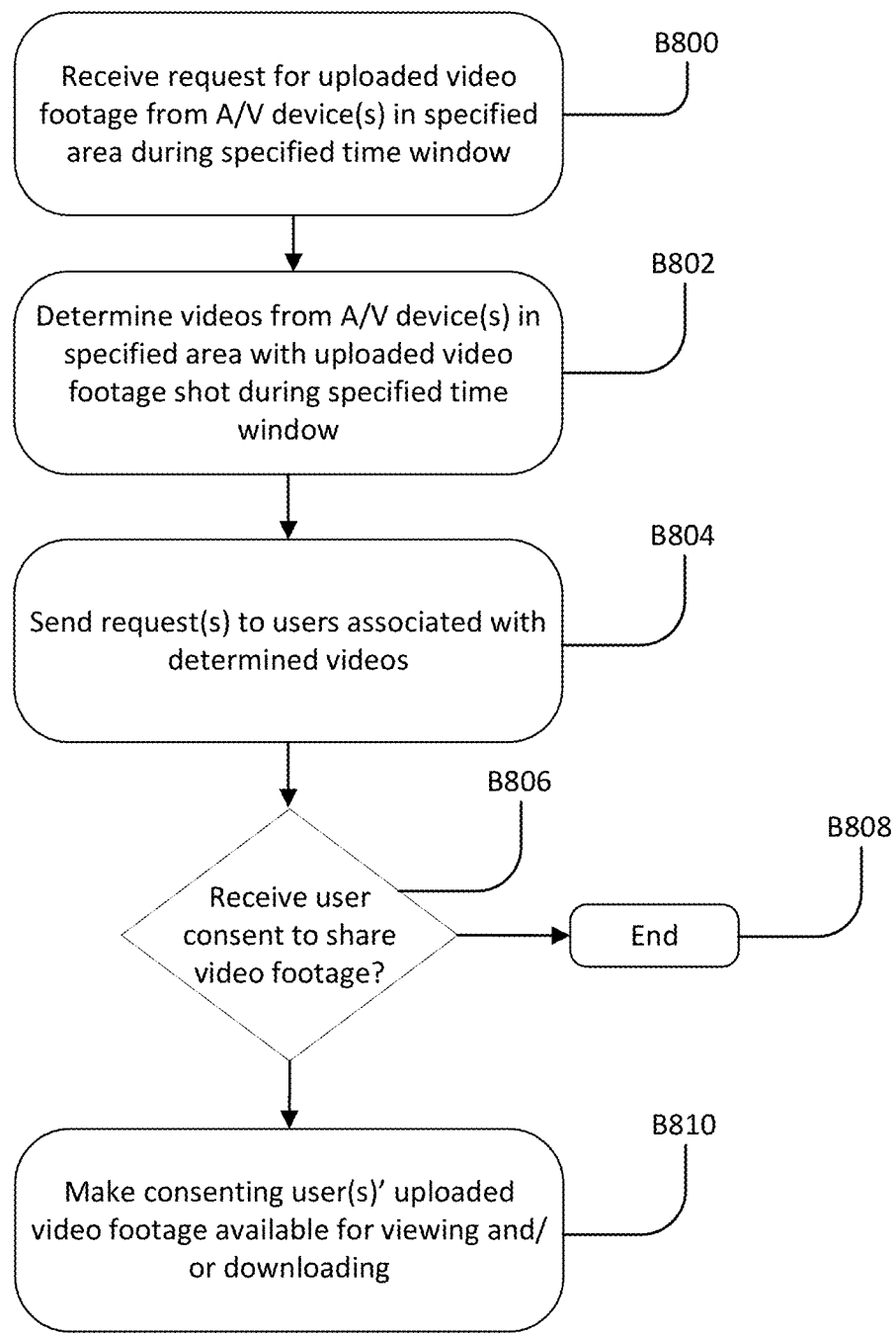
FIG. 8A is a flowchart illustrating a process for sharing video footage from A/V recording and communication devices according to the present embodiments.
Figure 8B:
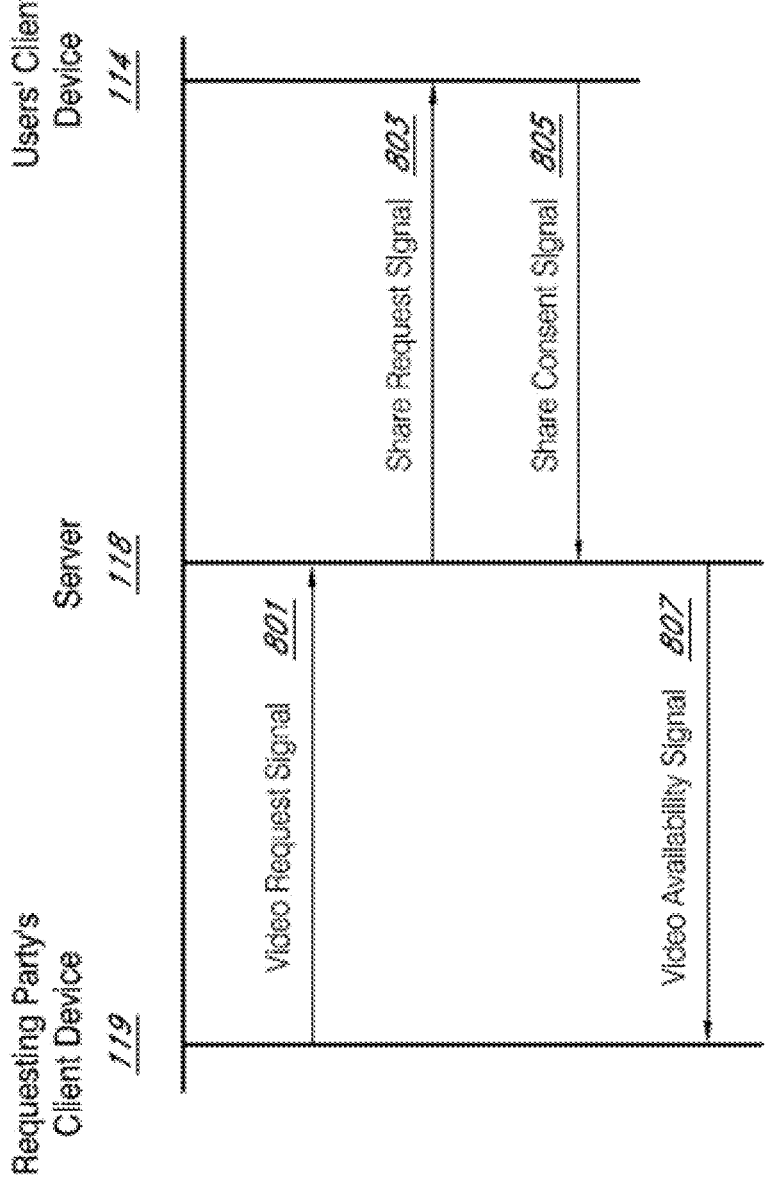
FIG. 8B is a sequence diagram illustrating one embodiment of the process of FIG. 8.

FIG. 8 is a flowchart illustrating a process for sharing video footage from A/V devices according to the present embodiments, and FIG. 8A is a sequence diagram illustrating one embodiment of the process of FIG. 8. With reference to FIG. 8, the process begins at block B800, when a request is received from a requesting party for video footage recorded by one or more A/V devices in a specified area and during a specified time window. The requesting party may be, for example, a law enforcement agency. With reference to FIG. 8A, the requesting party may submit the request to the network 112 in a video request signal 801 sent from the requesting party's client device 119 (FIG. 1) to a network device, such as the server 118 (or the backend API 120 or another network device). The requesting party's client device 119 may be, for example, a computer that connects to the network 112 using a web browser, and the requesting party may submit the request through a web portal provided on the network 112, such as in the example illustrated above with respect to FIGS. 3-7.

For example, with reference to FIG. 3, the requesting party may access the web portal on the network 112 and enter an address in a search box (not shown). The web portal may then display the map 302 of the area around the entered address, with an icon of a first type 304 identifying the entered address and a plurality of icons of a second type 306 identifying the locations of A/V recording and communication devices 200 in the vicinity of the entered address 304. The requesting party may then specify the area of interest 308 as described above with respect to FIG. 3, and also specify the time window of interest. For example, the requesting party may enter a beginning date and time and an ending date and/or time using one or more text boxes 310, dropdown menus, popup calendars 312, etc. In some embodiments, the ending date and/or time may be in the future, and/or the request may be open ended, meaning that the requesting party does not provide an ending date and/or time. In such cases, the video footage returned to the requesting party may include videos that are uploaded from one or more of the A/V recording and communication devices 200 in the specified area 308 at one or more future times.

With further reference to FIG. 8, the process next moves to block B802, where it is determined which videos satisfy the criteria provided by the requester. For example, the determination process, which may be performed at the server 118 (or the backend API 120 or another network device), for example, may take as criteria the area of interest and the time window of interest, and use those criteria to search through video metadata to identify videos that meet the criteria. The result set is then a set of these video metadata records, e.g. a set of references to videos. The process then moves to blocks B804 and B806, where permissions are obtained for sharing the videos that were determined at block B802. For example, at block B804 a request for consent to share may be sent to each of the users associated with each of the A/V recording and communication devices 200 having at least one of the videos determined at block B802. The request for consent may comprise, for example, a push notification sent to each user's client device 114 (such as a smartphone). The push notification (or other type of request for consent) may indicate the time and date range for which sharing has been requested, may also indicate the identity of the requesting party, and/or may also lead the user to a listing of the videos that are associated with the request, which the user may also view. For example, with reference to FIG. 8A, the request for consent to share videos may comprise a share request signal (or consent request signal) 803 transmitted by the server 118 (or the backend API 120 or another network device) to one or more of the user's client devices 114 associated with the A/V recording and communication devices 200 having at least one of the videos determined at block B802.

Referring back to FIG. 8, then, at block B806, it is determined which of the users (if any) have provided consent to share their videos. For example, each user may respond to the push notification with a "yes" or "no." With reference to FIG. 8A, the user consents (or denials of consent) may be sent in one or more share consent signals 805 from the users' client devices 114 to the server 118 (or the backend API 120 or another network device). For those users who do not provide consent to share, the process ends at block B808 (FIG. 8). However, for those users who do provide consent to share, the process continues to block B810. At block B810, the videos from the consenting users' A/V recording and communication devices 200 that fall within the specified time window are presented to the requester through the web portal. For example, with reference to FIG. 4, icons 404 on the map 402 may indicate the locations of the A/V recording and communication devices 200 corresponding to the consenting users, and a number on each icon 404 may indicate a number of videos recorded by that A/V recording and communication device 200. The list of videos 432 may be populated with the videos corresponding to the icons 404 shown on the map 402, and the requester may view the videos, flag selected ones of the videos, hide selected ones of the videos, etc., as described above with respect to FIGS. 4-7. With reference to FIG. 8A, information about the videos from the consenting users' A/V recording and communication devices 200 that fall within the specified time window may be sent in a video availability signal 807 from the server 118 (or the backend API 120 or another network device) to the requesting party's client device 119.

Figure 9A:
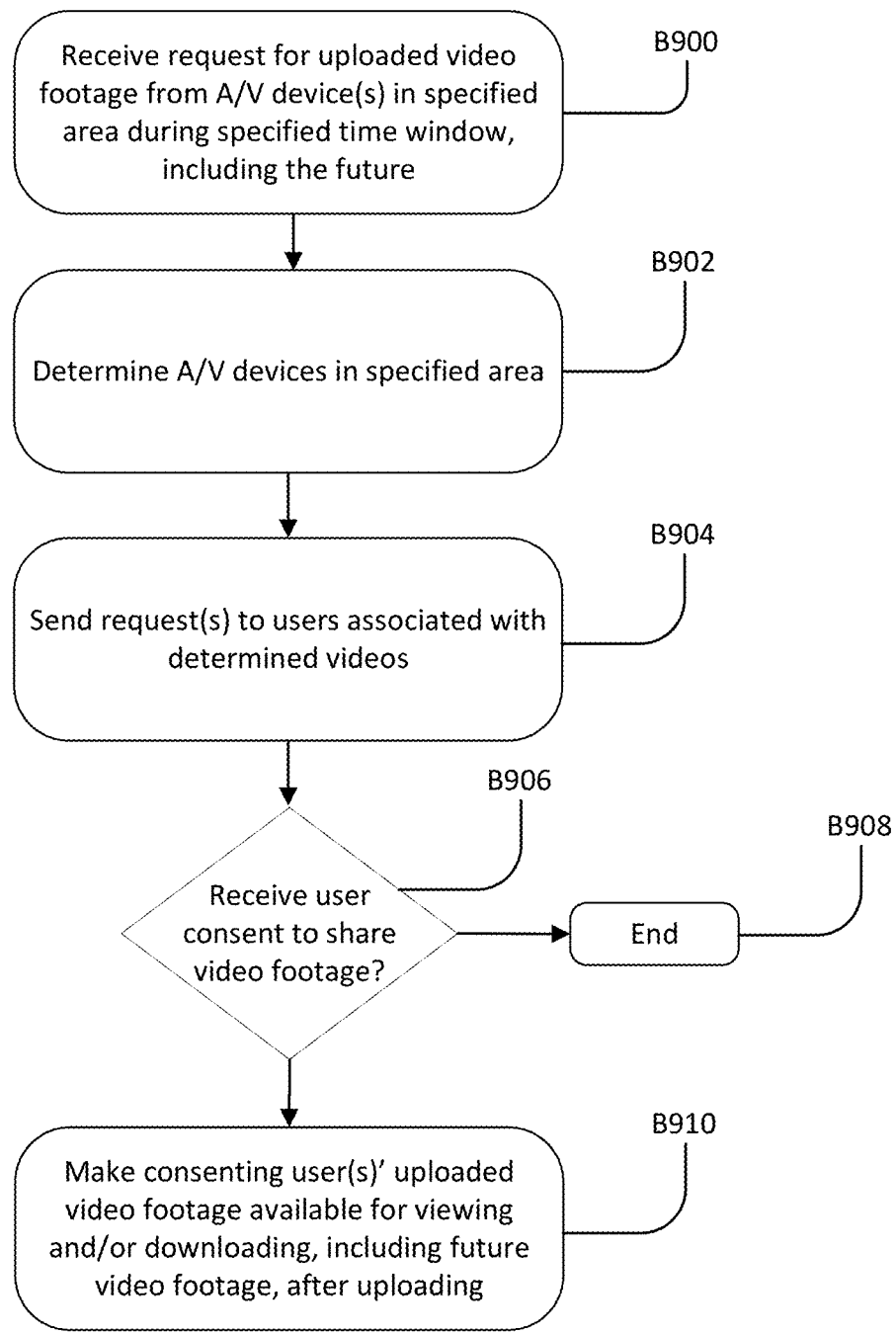
FIG. 9A is a flowchart illustrating another process for sharing video footage from A/V recording and communication devices according to the present embodiments.
Figure 9B:
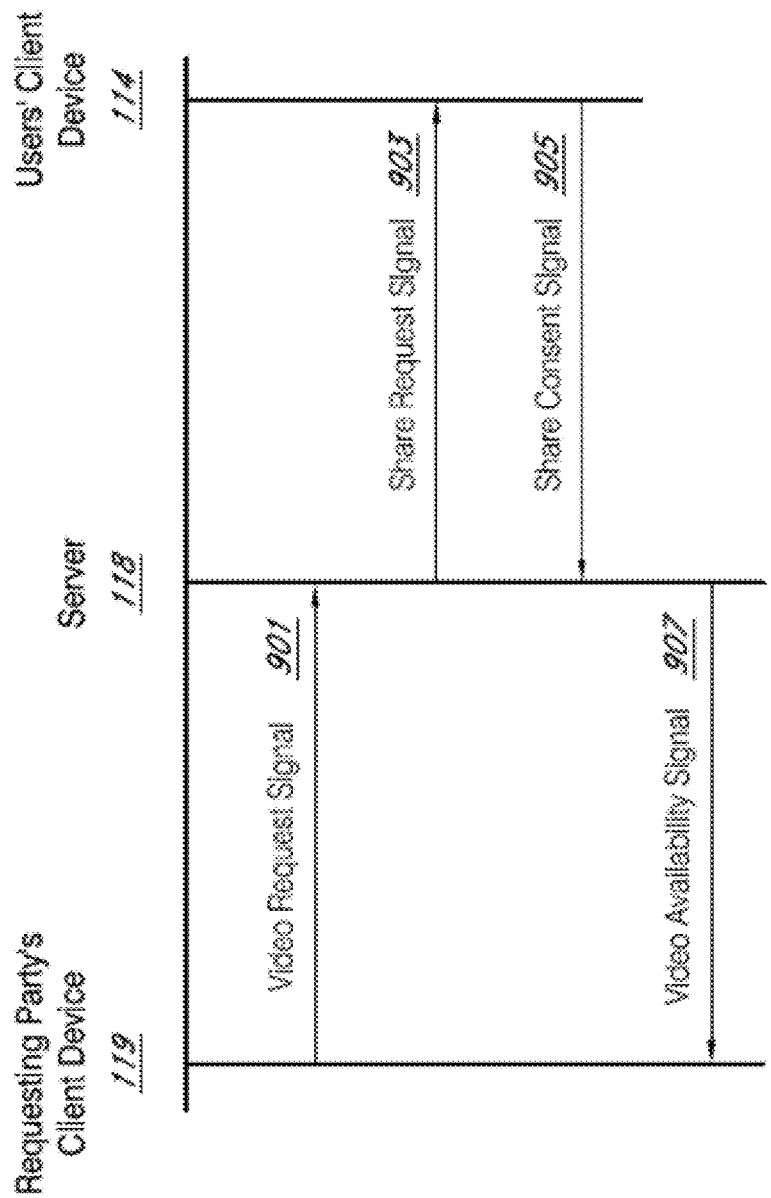
FIG. 9B is a sequence diagram illustrating one embodiment of the process of FIG. 9.

As described above, in some embodiments the requesting party may enter an ending date and/or time that is in the future, or the requester may not provide an ending date and/or time. FIG. 9 is a flowchart illustrating an example embodiment of a process for sharing video footage in situations in which the requester does not provide an ending date and/or time, and FIG. 9A is a sequence diagram illustrating one embodiment of the process of FIG. 9. The processes of FIGS. 9 and 9A may, for example, aid in stopping a crime that is currently in progress or that has recently occurred, such as when implemented close in time to a reported burglary. With reference to FIG. 9, at block B900 a request is received from a requesting party for video footage recorded by one or more A/V recording and communication devices 200 in a specified area during a specified time window, where the specified time window includes the future. For example, the request may request videos from all A/V recording and communication devices 200 in the specified area that are recorded and uploaded from a specified start time going forward into the future. The specified start time may be a time in the past, or may simply correspond to whatever time the request is submitted. The request may identify a future end time, after which any videos recorded and uploaded by A/V recording and communication devices 200 in the specified area would not be shared with the requester. Alternatively, the request may not include an end time, such that all future videos recorded and uploaded by A/V recording and communication devices 200 in the specified area would be shared with the requester (subject to obtaining permissions from the user(s) of the A/V recording and communication devices 200). As in the example of FIG. 8, the requesting party may be, for example, a law enforcement agency. With reference to FIG. 9A, the requesting party may submit the request to the network 112 in a video request signal 901 sent from the requesting party's client device 119 (FIG. 1) to a network device, such as the server 118 (or the backend API 120 or another network device). The requesting party's client device 119 may be, for example, a computer that connects to the network 112 using a web browser, and the requesting party may submit the request through a web portal provided on the network 112, such as in the example illustrated above with respect to FIGS. 3-7.

With further reference to FIG. 9, the process next moves to block B902, where it is determined which A/V recording and communication devices 200 are located in the specified area. In other words, the process, which may be performed at the server 118 (or the backend API 120 or another network device), for example, determines a subset of all A/V recording and communication devices 200 that satisfy the criteria provided by the requester. The process then moves to blocks B904 and B906, where permissions are obtained for sharing the videos from the A/V recording and communication devices 200 that were determined at block B902. For example, at block B904 a request for consent to share may be sent to each of the users associated with each of the A/V recording and communication devices 200 in the subset determined at block B902. For example, with reference to FIG. 9A, the request for consent to share may comprise a share request signal (or consent request signal) 903 transmitted by the server 118 (or the backend API 120 or another network device) to one or more of the user's client devices 114 associated with the A/V recording and communication devices 200 determined at block B902. The request for consent may comprise, for example, a push notification sent to each user's client device 114 (such as a smartphone). The push notification (or other type of request for consent) may indicate the time and date range for which sharing has been requested, and may also indicate the identity of the requesting party.

Referring back to FIG. 9, then, at block B906, it is determined which of the users (if any) have provided consent to share their videos. For example, each user may respond to the push notification with a "yes" or "no." With reference to FIG. 9A, the user consents (or denials of consent) may be sent in one or more share consent signals 905 from the users' client devices 114 to the server 118 (or the backend API 120 or another network device). For those users who do not provide consent to share, the process ends at block B908. However, for those users who do provide consent to share, the process continues to block B910. At block B910, the videos from the consenting users' A/V recording and communication devices 200 are presented to the requester through the web portal. With reference to FIG. 9A, information about the videos from the consenting users' A/V recording and communication devices 200 may be sent in a video availability signal 907 from the server 118 (or the backend API 120 or another network device) to the requesting party's client device 119. Since the request includes future videos, those future videos are presented to the requester after they are uploaded. For example, with reference to FIG. 4, icons 404 on the map 402 may indicate the locations of the A/V recording and communication devices 200 corresponding to the consenting users, and a number on each icon 404 may indicate a number of videos recorded by that A/V recording and communication device 200. The list of videos 432 may be populated with the videos corresponding to the icons 404 shown on the map 402, and the requester may view the videos, flag selected ones of the videos, hide selected ones of the videos, etc., as described above with respect to FIGS. 4-7.

While not shown in FIG. 9, the present embodiments may include an option for users to grant permission to share some videos that meet the criteria provided by the requesting party, and to withhold permission to share other videos that meet the criteria provided by the requesting party. For example, the push notification (or other type of request for consent) sent to the users of the A/V devices may include at least three response options: 1) share all videos meeting the criteria provided by the requesting party, 2) share no videos, or 3) share some videos meeting the criteria provided by the requesting party and withhold others. If the user selects option 3), the user may be presented with a menu (not shown) that enables the user to select those videos to be shared and/or to select those videos to be withheld.

In certain other embodiments, a user may provide consent to share videos prospectively. For example, when a user sets up a new A/V device, one step in the setup process may present the user with a request to provide consent (to "opt-in") to share all videos recorded and uploaded by that A/V device. In another example, a user may be required to provide consent to share all videos recorded and uploaded by that A/V device as a condition of receiving the A/V device. For example, a law enforcement agency may offer to provide A/V devices to users free of charge with the condition that any videos recorded and uploaded by that A/V device be shared with the law enforcement agency that provided the A/V device to the user.

As described above, the present embodiments advantageously enable a requesting party, such as a law enforcement agency, to request that users of A/V doorbells share video footage recorded and uploaded (to the cloud) by those A/V doorbells. Such footage may be useful to law enforcement for solving crimes and apprehending perpetrators, and for stopping crimes that may be currently in progress.

As described above, the present embodiments leverage the capabilities of the A/V recording and communication device, thereby providing enhanced functionality by allowing both preauthorized A/V recording and communication devices as well as third-party A/V recording and communication devices to share video footage with a requesting party. For example, Another aspect of the present embodiments includes the realization that a service provider that stores and manages video footage for sharing may only have authorization to share with law enforcement the video footage captured by preauthorized A/V recording and communication devices associated with the service provider. For example, the service provider may be communicatively coupled to the preauthorized A/V recording and communication devices such that the service provider may automatically receive, store, and share with law enforcement the video footage generated by the preauthorized A/V recording and communication devices. However, other A/V recording and communication devices, such as third-party A/V recording and communication devices that are not associated with the service provider and/or are not communicatively coupled to the service provider, may not automatically send video footage to the service provider. In many circumstances, it may be useful for law enforcement to, in addition to receiving the video footage from the pre-authorized A/V recording and communication devices, also receive the video footage from the third-party A/V recording and communication devices because the video footage may also contain valuable identifying information of the perpetrator(s) of the crime. The present embodiments, as described in detail below, may help solve this problem by providing various techniques that allow the service provider to obtain the video footage from the third-party A/V recording and communication devices and share the video footage with law enforcement. For example, the service provider may receive and store registration data for the third-party A/V recording and communication devices, which may indicate respective locations of each third-party A/V recording and communication device. When receiving a request for video footage, the service provider may use the registration data to determine which third-party A/V recording and communication devices are located within an area specified by law enforcement. The service provider may then send requests for respective video footage generated by each of the third-party recording and communication devices that are located within the area and, in response, receive the video footage. After receiving the video footage, the service provider may store and/or send the video footage to law enforcement. The video footage from these third-party A/V recording and communication devices, in addition to the video footage from the pre-authorized A/V recording and communication devices, may then be used by law enforcement in identifying and/or capturing the perpetrator(s), thereby potentially leading to an increase in arrests by law enforcement. As a result of the increase in arrests, the safety of the community (e.g., the street, the neighborhood, the town, the city, etc.) in which the pre-authorized and third-party A/V recording and communication devices are located may be increased, in addition to the safety of the surrounding communities.

Figure 10:
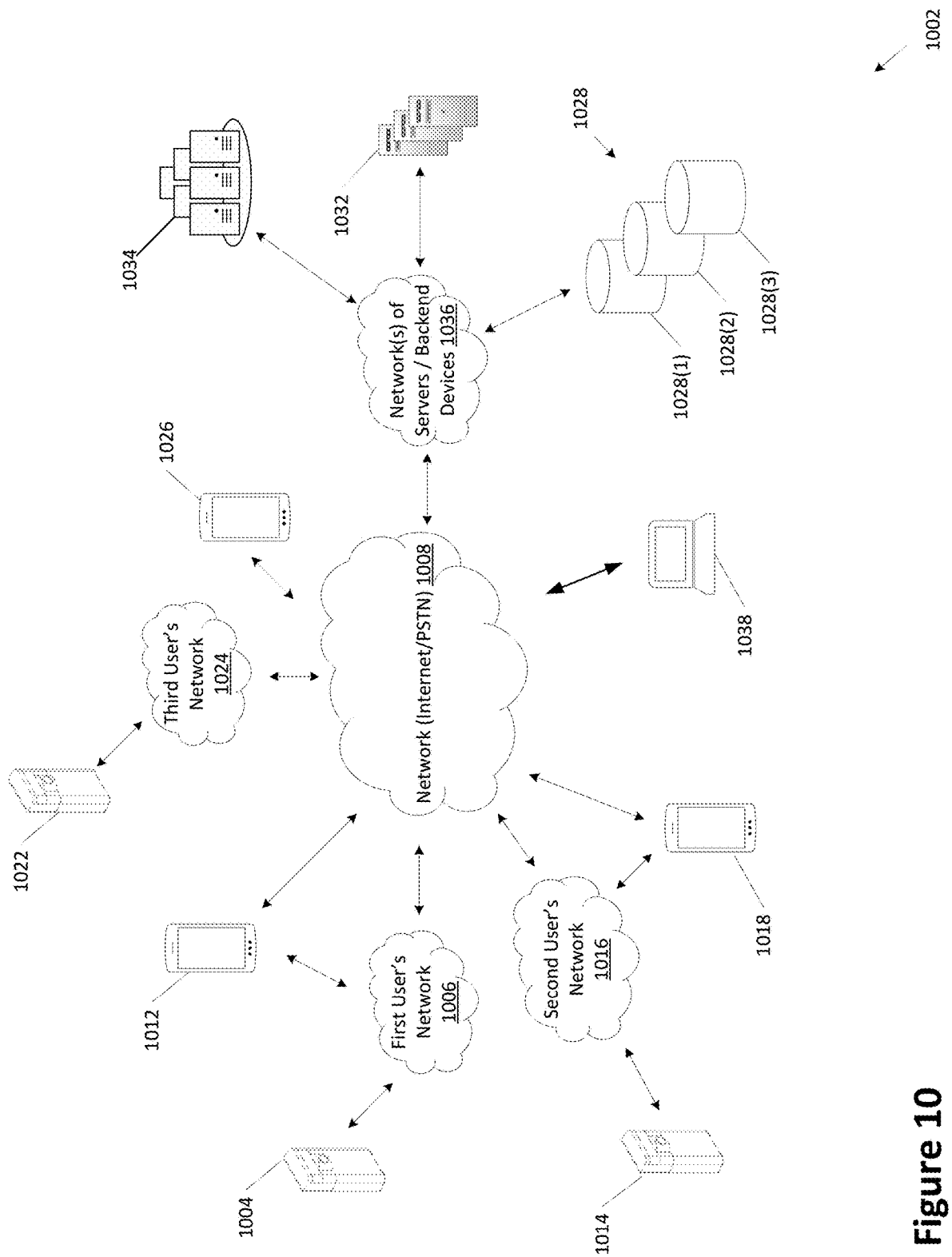
FIG. 10 is a functional block diagram illustrating an example system for communicating in a network according to various aspects of the present disclosure.

FIG. 10 is a functional block diagram illustrating a system 1002 for sharing video footage from both authorized A/V recording and communication devices as well as third-party A/V recording and communication devices. The system 1002 may include at least a first authorized A/V recording and communication device 1004 (which may correspond to the A/V recording and communication device 110, and which may alternatively be referred to herein as the "first A/V recording and communication device 1004" or the "A/V recording and communication device 1004") configured to access a first user's network 1006 (which may correspond to the user's network 110) to connect to a network (Internet/PSTN) 1008 (in some embodiments, the first A/V recording and communication device 1004 may be configured to connect directly to the network (Internet/PSTN) 1008, such as over a cellular connection). The first A/V recording and communication device 1004 may include any or all of the components and/or functionality of the A/V recording and communication device 100.

The first user's network 1006 may include any or all of the components and/or functionality of the user's network 110 described herein. The system 1002 may also include a first client device 1012 (which may correspond to the user's client device 114, and may also be referred to as "client device 1012"), which in various embodiments may be configured to be in network communication and/or associated with the first A/V recording and communication device 1004. The first client device 1012 may comprise, for example, a mobile phone such as a smartphone, or a computing device such as a tablet computer, a laptop computer, a desktop computer, etc. The first client device 1012 may include any or all of the components and/or functionality of the client device 114 (FIG. 1) described herein. In some embodiments, the first client device 1012 may not be associated with the first A/V recording and communication device 1004.

The system 1002 may include a second authorized A/V recording and communication device 1014 (which may alternatively be referred to herein as the "second A/V recording and communication device 1014" or the "A/V recording and communication device 1014") configured to access a second user's network 1016 (which may be similar to the user's network 110) to connect to the network (Internet/PSTN) 1008 (in some embodiments, the second A/V recording and communication device 1014 may be configured to connect directly to the network (Internet/PSTN) 1008, such as over a cellular connection). The second A/V recording and communication device 1014 may include any or all of the components and/or functionality of the A/V recording and communication device 100.

The second user's network 1016 may include any or all of the components and/or functionality of the user's network 110 described herein. The system 1002 may also include a second client device 1018 (also referred to as "client device 1018"), which in various embodiments may be configured to be in network communication and/or associated with the second A/V recording and communication device 1014. The second client device 1018 may comprise, for example, a mobile phone such as a smartphone, or a computing device such as a tablet computer, a laptop computer, a desktop computer, etc. The second client device 1018 may include any or all of the components and/or functionality of the client device 114 (FIG. 1) described herein. In some embodiments, the second client device 1018 may not be associated with the second A/V recording and communication device 1014.

The system 1002 may include a third-party A/V recording and communication device 1022 (which may alternatively be referred to herein as the "third A/V recording and communication device 1022", "unauthorized A/V recording and communication device 1022", or the "A/V recording and communication device 1022") configured to access a third user's network 1024 (which may be similar to the user's network 110) to connect to the network (Internet/PSTN) 1008 (in some embodiments, the third A/V recording and communication device 1022 may be configured to connect directly to the network (Internet/PSTN) 1008, such as over a cellular connection). The third A/V recording and communication device 1022 may include any or all of the components and/or functionality of the A/V recording and communication device 100.

The third user's network 1024 may include any or all of the components and/or functionality of the user's network 110 described herein. The system 1002 may also include a third client device 1026 (also referred to as "client device 1026"), which in various embodiments may be configured to be in network communication and/or associated with the third A/V recording and communication device 1022. The third client device 1026 may comprise, for example, a mobile phone such as a smartphone, or a computing device such as a tablet computer, a laptop computer, a desktop computer, etc. The third client device 1026 may include any or all of the components and/or functionality of the client device 114 (FIG. 1) described herein. In some embodiments, the third client device 1026 may not be associated with the third A/V recording and communication device 1022.

With further reference to FIG. 10, the system 1002 may also include various backend devices such as (but not limited to) storage devices 1028 (which may correspond to the storage device 116), backend server 1032 (which may correspond to the backend server 118), and backend APIs 1034 (which may correspond to backend APIs 120) that may be in network communication (e.g., over a network(s) of servers/backend devices 1036 and/or over the network (Internet/PSTN) 1008) with the first A/V recording and communication devices 1004, the first client device 1012, the second A/V recording and communication device 1014, the second client device 1018, the third A/V recording and communication device 1022, and/or the third client device 1026. In some examples, the storage devices 1028, the backend server 1032, and/or the backend APIs 1034 constitute the "cloud" described herein.

In some embodiments, the storage devices 1028 may be a separate device from the backend server 1032 (as illustrated) or may be an integral component of the backend server 1032. The storage devices 1028 may be similar in structure and/or function to the storage devices 116 (FIG. 1). In addition, in some embodiments, the backend server 1032 and backend APIs 1034 may be similar in structure and/or function to the server 118 and the backend API 120 (FIG. 1), respectively.

With further reference to FIG. 10, the system 1002 may also include a requesting party's client device 1038 (e.g., which may correspond to the requesting party's client device 119, and which may alternatively be referred to herein as a "fourth client device 1038" or "client device 1038"). A requesting party may, for example, login through a user portal at a website using the fourth client device 1038 in order to request image data from A/V recording and communication devices. The fourth client device 1038 may comprise, for example, a personal computer, such as a desktop computer, a laptop computer, a tablet, etc. The fourth client device 1038 may further comprise, for example, a mobile telephone (may also be referred to as a cellular telephone), such as a smartphone, a personal digital assistant (PDA), or another communication device. In some embodiments, the fourth client device 1038 may be similar in structure and/or function to the requesting party's client device 119.

With further reference to FIG. 10, the storage devices 1028 may include first storage devices 1028(1), second storage devices 1028(2), and/or third storage devices 1028(3). In some embodiments, the backend server 1032 may store all image data that is received from authorized A/V recording and communication devices (e.g., the first A/V recording and communication device 1004 and/or the second A/V recording and communication device 1014) in the first storage devices 1028(1). Additionally, the second storage devices 1028(2) may be associated with one or more third-party requesters of image data, such as one or more law enforcement agencies. For example, the backend server 1032 may store image data that is received from the authorized A/V recording and communication devices in the second storage devices 1028(2) when consent has been provided (which is described in detail above) by the users of the authorized A/V recording and communication devices. As such, in some examples, the third-party requesters may be able to access the image data stored in the second storage devices 1028(2) by transmitting requests to the backend server 1032, but the backend server 1032 may be required to receive consent from the owners or other users of the various A/V recording and communication devices that captured the image data in order for the third-party requesters to access the image data stored in the first storage devices 1028(1).

In some embodiments, the backend server 1032 may store registration data in the third storage device 1028(3). As will be described in detail below, the registration data may be utilized to register unauthorized A/V recording and communication devices (e.g., the third A/V recording and communication device 1022) with the backend server 1032.

In some examples, A/V recording and communication devices (e.g., the first A/V recording and communication device 1004 and/or the second A/V recording and communication device 1014) may be authorized based on the A/V recording and communication devices being communicatively coupled to the backend server 1032. For example, image data generated by the authorized A/V recording and communication devices may automatically be transmitted to the network server 1032 and stored in the storage devices 1028. Additionally, A/V recording and communication devices (e.g., the third A/V recording and communication device 1022) may be unauthorized and/or third-party devices based on the A/V recording and communication devices refraining from transmitting image data to the backend server 1032 when image data is initially generated by the unauthorized A/V recording and communication devices. Rather, the image data generated by the unauthorized A/V recording and communication devices may be transmitted to the backend server 1032 and/or directly to the fourth client device 1038 based on receiving a request from the backend server 1032 (e.g., in response to a request for the image data from the third-party requester(s)).

Additionally, or alternatively, in some examples, the authorized A/V recording and communication devices, the backend server 1032, the storage device 1028, and/or the backend APIs 1034 may be associated with a same or related entity (e.g., company, business, etc.). For example, the entity that controls, monitors, and/or provides the backend server 1032 may also control, monitor, and/or generate the authorized A/V recording and communication devices and/or the software utilized by the authorized A/V recording and communication devices. Additionally, the unauthorized A/V recording and communication devices may be associated with a second, different entity (e.g., second company, business, etc.). For example, the second entity may control, monitor, and/or generate the unauthorized A/V recording and communication devices and/or the software utilized by the unauthorized A/V recording and communication devices. In such examples, and using the techniques described below, the backend server 1032 is capable of providing third-party requesters with image data that is generated by its authorized A/V recording and communication devices as well as image data generated by third-party, unauthorized A/V recording and communication devices.

Figure 11:
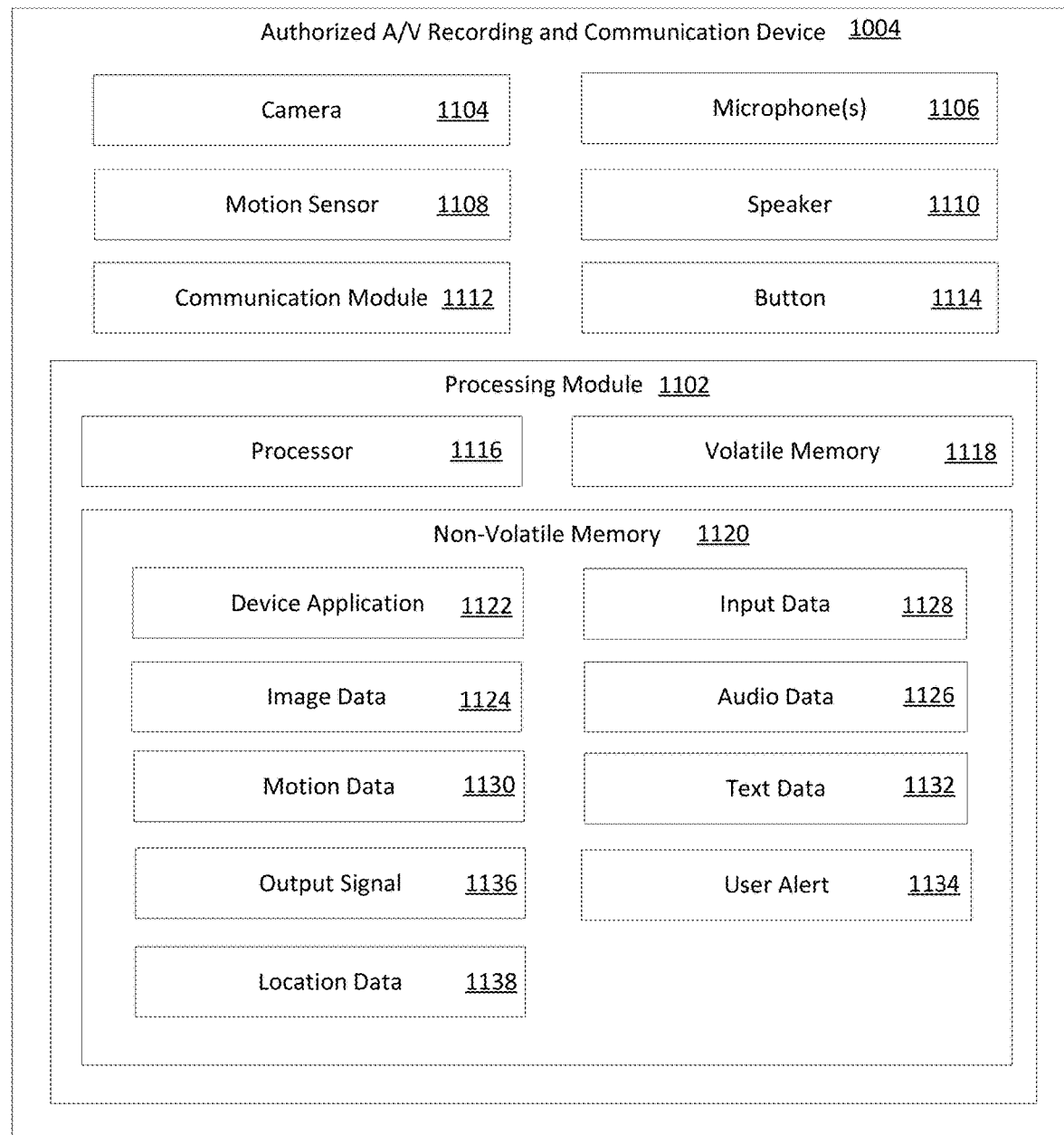
FIG. 11 is a functional block diagram illustrating one example embodiment of a preauthorized A/V recording and communication device according to various aspects of the present disclosure.

FIG. 11 is a functional block diagram illustrating an embodiment of an authorized A/V recording and communication device 1004 according to various aspects of the present disclosure. The second A/V recording and communication device 1014, as described above, may include similar features, components, and functionality to the first A/V recording and communication device 1004. In some embodiments, the first A/V recording and communication device 1004 and/or the second A/V recording and communication device 1014 may represent, and further include one or more of the components from, the A/V recording and communication device 100. Additionally, in some embodiments, the first A/V recording and communication device 1004 and/or the second A/V recording and communication device 1014 may omit one or more of the components shown in FIG. 11 and/or may include one or more additional components not shown in FIG. 11.

The first A/V recording and communication device 1004 may comprise a processing module 1102 that is operatively connected to a camera 1104, microphone(s) 1106, a motion sensor 1108, a speaker 1110, a communication module 1112, and a button 1114 (in embodiments where the first A/V recording and communication device 1004 is a doorbell). The processing module 1102 may comprise a processor 1116, volatile memory 1118, and non-volatile memory 1120, which includes a device application 1122. In various embodiments, the device application 1122 may configure the processor 1116 to capture image data 1124 (e.g., video footage) using the camera 1104, audio data 1126 using the microphone(s) 1106, input data 1128 using the button 1114 (and/or the camera 1104 and/or the motion sensor 1108, depending on the embodiment), and/or motion data 1130 using the camera 1104 and/or the motion sensor 1108. In some embodiments, the device application 1122 may also configure the processor 1116 to generate text data 1132 describing the image data 1124, the audio data 1126, and/or the input data 1128, such as in the form of metadata, for example.

In addition, the device application 1122 may configure the processor 1116 to transmit the image data 1124, the audio data 1126, the motion data 1130, the input data 1128, the text data 1132, and/or a user alert 1134 to the first client device 1012 and/or the backend server 1032 using the communication module 1112 (which may be via another device, such as a hub device of a security system associated with the first A/V recording and communication device 1004). In various embodiments, the device application 1122 may also configure the processor 1116 to generate and transmit an output signal 1136 that may include the image data 1124, the audio data 1126, the text data 1132, the input data 1128, and/or the motion data 1130. In some of the present embodiments, the output signal 1136 may be transmitted to the backend server 1032 (in some embodiments, via the hub device) using the communication module 1112, and the backend server 1032 may transmit (or forward) the output signal 1136 to the first client device 1012. In other embodiments, the output signal 1136 may be transmitted directly to the first client device 1012.

In further reference to FIG. 11, the image data 1124 may comprise image sensor data such as (but not limited to) exposure values and data regarding pixel values for a particular sized grid. The image data 1124 may include still images, live video, and/or pre-recorded images and/or video. The image data 1124 may be recorded by the camera 1104 in a field of view of the camera 1104.

In further reference to FIG. 11, the motion data 1130 may comprise motion sensor data generated in response to motion events. For example, the motion data 1130 may include an amount or level of a data type generated by the motion sensor 1108 (e.g., the voltage level output by the motion sensor 1108 when the motion sensor 1108 is a PIR type motion sensor). In some of the present embodiments, such as those where the first A/V recording and communication device 1004 does not include the motion sensor 1108, the motion data 1130 may be generated by the camera 1104. In such embodiments, based on a frame by frame comparison of changes in the pixels from the image data 1124, it may be determined that motion is present.

The input data 1128 may include data generated in response to an input to the button 1114. The button 1114 may receive an input (e.g., a press, a touch, a series of touches and/or presses, etc.) and may generate the input data 1128 in response that is indicative of the type of input. In embodiments where the first A/V recording and communication device 1004 is not a doorbell, the first A/V recording and communication device 1004 may not include the button 1114, and the first A/V recording and communication device 1004 may not generate the input data 1128.

In further reference to FIG. 11, the first A/V recording and communication device 1004 includes location data 1138. The location data 1138 may indicate the location of the first A/V recording and communication device 1004. For example, location data 1138 may indicate, but is not limited to, the street address, zip code, city, state, property, neighborhood, GPS coordinates, distance from one or more cell towers, and/or the like of where the first A/V recording and communication device 1004 is located. In some examples, the first A/V recording and communication device 1004 (and/or the first client device 1012) may transmit the location data 1138 to the backend server 1032.

Figure 12:
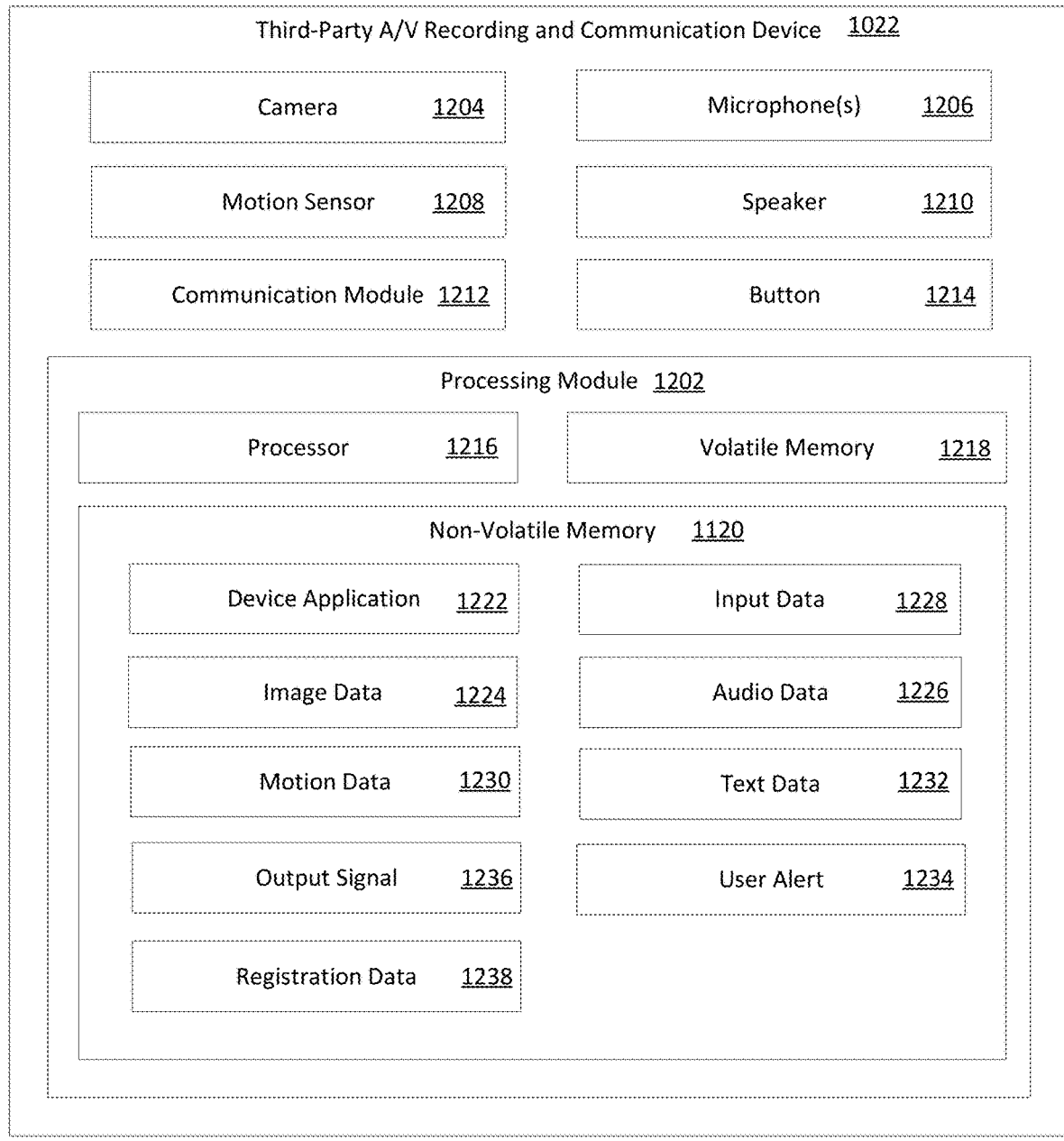
FIG. 12 is a functional block diagram illustrating one example embodiment of a third-party A/V recording and communication device according to various aspects of the present disclosure.

FIG. 12 is a functional block diagram illustrating an embodiment of an unauthorized A/V recording and communication device 1022 (alternatively referred to herein as the third A/V recording and communication device 1022) according to various aspects of the present disclosure. In some embodiments, the third A/V recording and communication device 1022 may functionally be similar to, include one or more of the similar components of, the first A/V recording and communication device 1004. In some embodiments, the third A/V recording and communication device may be functionally different than, and/or include different components that, the first A/V recording and communication device 1004. Additionally, in some embodiments, the third A/V recording and communication device 1022 may omit one or more of the components shown in FIG. 12 and/or may include one or more additional components not shown in FIG. 12. For example, in some embodiments, the third A/V recording and communication device 1022 may include an imaging device (e.g., a video camera) that generates image data and audio data, and then stores the image data and audio data locally and/or transmits the image data and audio data to a separate device for storage.

The third A/V recording and communication device 1022 may comprise a processing module 1202 that is operatively connected to a camera 1204, microphone(s) 1206, a motion sensor 1208, a speaker 1210, a communication module 1212, and a button 1214 (in embodiments where the third A/V recording and communication device 1022 is a doorbell). The processing module 1202 may comprise a processor 1216, volatile memory 1218, and non-volatile memory 1220, which includes a device application 1222. In various embodiments, the device application 1222 may configure the processor 1216 to capture image data 1224 (e.g., video footage) using the camera 1204, audio data 1226 using the microphone(s) 1206, input data 1228 using the button 1214 (and/or the camera 1204 and/or the motion sensor 1208, depending on the embodiment), and/or motion data 1230 using the camera 1204 and/or the motion sensor 1208. In some embodiments, the device application 1222 may also configure the processor 1216 to generate text data 1232 describing the image data 1224, the audio data 1226, and/or the input data 1228, such as in the form of metadata, for example.

In addition, the device application 1222 may configure the processor 1216 to transmit the image data 1224, the audio data 1226, the motion data 1230, the input data 1228, the text data 1232, and/or a user alert 1234 to the third client device 1026 and/or the backend server 1032 using the communication module 1212 (which may be via another device, such as a hub device associated with the third A/V recording and communication device 1022) after receiving a request for such data. In various embodiments, the device application 1222 may also configure the processor 1216 to generate and transmit an output signal 1236 that may include the image data 1224, the audio data 1226, the text data 1232, the input data 1228, and/or the motion data 1230 in response to receiving a request. In some of the present embodiments, the output signal 1236 may be transmitted to the backend server 1032 (e.g., via the hub device) using the communication module 1212, and the backend server 1032 may transmit (or forward) the output signal 1236 to the third client device 1026 and/or the fourth client device 1038. In other embodiments, the output signal 1236 may be transmitted directly to the third client device 1026 and/or the fourth client device 1038.

In further reference to FIG. 12, the image data 1224 may comprise image sensor data such as (but not limited to) exposure values and data regarding pixel values for a particular sized grid. The image data 1224 may include still images, live video, and/or pre-recorded images and/or video. The image data 1224 may be recorded by the camera 1204 in a field of view of the camera 1204.

In further reference to FIG. 12, the motion data 1230 may comprise motion sensor data generated in response to motion events. For example, the motion data 1230 may include an amount or level of a data type generated by the motion sensor 1208 (e.g., the voltage level output by the motion sensor 1208 when the motion sensor 1208 is a PIR type motion sensor). In some of the present embodiments, such as those where the third A/V recording and communication device 1022 does not include the motion sensor 1208, the motion data 1230 may be generated by the camera 1204. In such embodiments, based on a frame by frame comparison of changes in the pixels from the image data 1224, it may be determined that motion is present.

The input data 1228 may include data generated in response to an input to the button 1214. The button 1214 may receive an input (e.g., a press, a touch, a series of touches and/or presses, etc.) and may generate the input data 1228 in response that is indicative of the type of input. In embodiments where the third A/V recording and communication device 1022 is not a doorbell, the third A/V recording and communication device 1022 may not include the button 1214, and the third A/V recording and communication device 1022 may not generate the input data 1228.

In further reference to FIG. 12, the third A/V recording and communication device 1022 may include registration data 1238. The registration data 1238 may include, but is not limited to, the location of the third A/V recording and communication device 1022, contact information (e.g., phone number, email address, IP address, username, etc.) associated with the user of the third client device 1026 and/or other registration information. The location of the third A/V recording and communication device 1022 may include, but is not limited to, the street address, zip code, city, state, property, neighborhood, GPS coordinates, distance from one or more cell towers, and/or the like of where the third A/V recording and communication device 1022 is located. In some examples, the third A/V recording and communication device 1022 (and/or the third client device 1026) may transmit the registration data 1238 to the backend server 1032.

Figure 13:
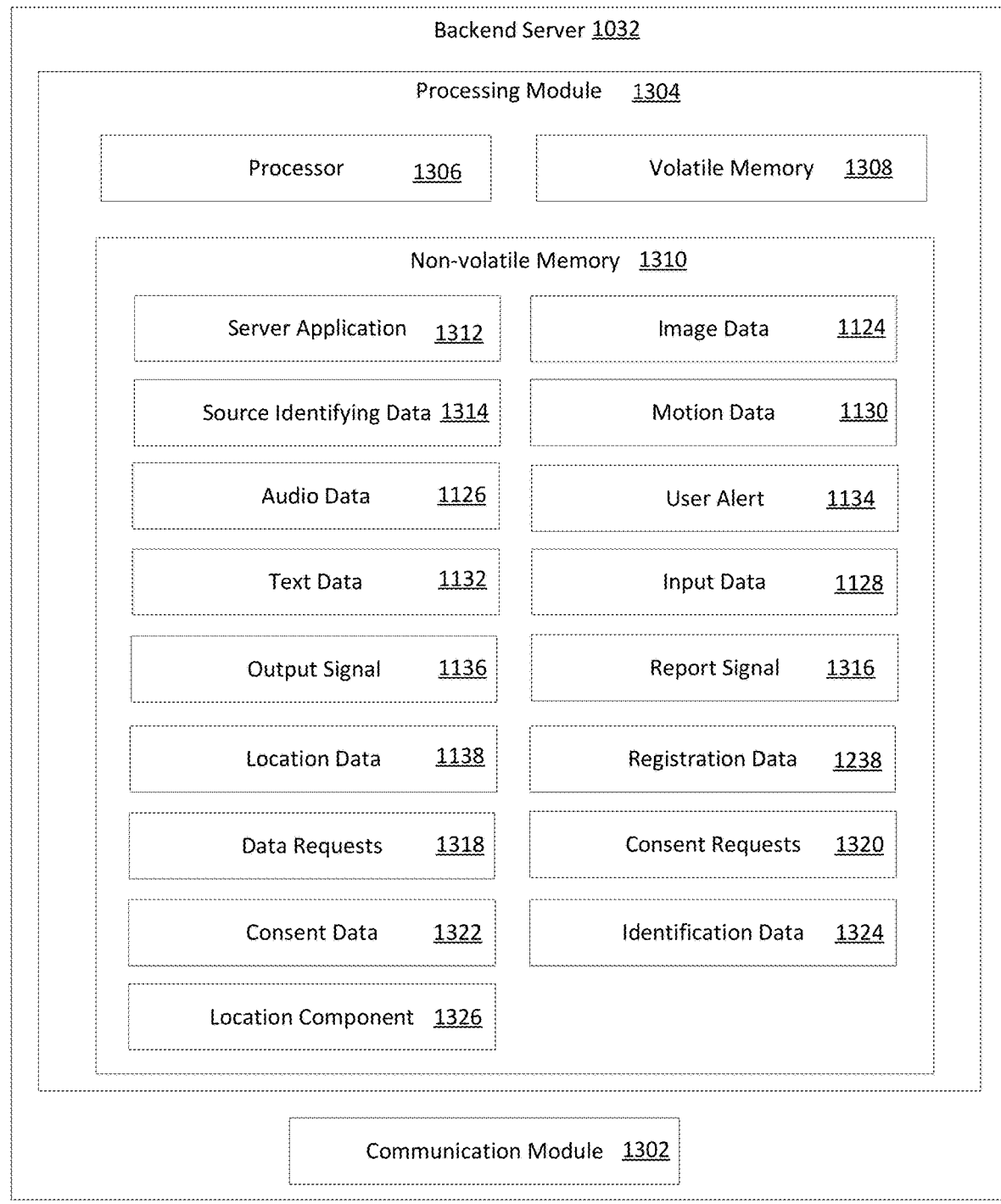
FIG. 13 is a functional block diagram illustrating one example embodiment of a backend sever according to various aspects of the present disclosure.

FIG. 13 is a functional block diagram illustrating one embodiment of the backend server 1032 according to various aspects of the present disclosure. The backend server 1032 may comprise a communication module 1302 and a processing module 1304, which includes a processor 1306, volatile memory 1308, and non-volatile memory 1310. The communication module 1302 may allow the backend server 1032 to access and communicate with devices connected to the network (Internet/PSTN) 1008 (e.g., the first A/V recording and communication device 1004, the first client device 1012, the second A/V recording and communication device 1014, the second client device 1018, the third A/V recording and communication device 1022, the third client device 1026, and/or the fourth client device 1038). The non-volatile memory 1310 may include a server application 1312 that configures the processor 1306 to receive and/or retrieve the audio data 1126, the text data 1132, the input data 1128, the user alerts 1134, the image data 1124, and/or the motion data 1130 from the first A/V recording and communication device 1004 (e.g., in the output signal 1136) (which may be received via a hub device, as described herein). The server application 1312 may also configure the processor 1306 to transmit (and/or forward) the audio data 1126, the text data 1132, the input data 1128, the user alerts 1134, the image data 1124, and/or the motion data 1130 to the first client device 1012 and/or the fourth client device 1038 using the communication module 1302.

In further reference to FIG. 13, the non-volatile memory 1310 may also include source identifying data 1314 that may be used to identify the first A/V recording and communication device 1004, the first client device 1012, the second A/V recording and communication device 1014, the second client device 1018, the third A/V recording and communication device 1022, and/or the third client device 1026. In addition, the source identifying data 1314 may be used by the processor 1306 of the backend server 1032 to determine the first client device 1012 is associated with the first A/V recording and communication device 1004, the second client device 1018 is associated with the second A/V recording and communication device 1014, and/or the third client device 1026 is associated with the third A/V recording and communication device 1022.

In some embodiments, the server application 1312 may further configure the processor 1306 to generate and transmit a report signal 1316 to the fourth client device 1038, which may be associated with one or more law enforcement agencies, for example. The report signal 1316, in some examples, may include the image data 1124, the audio data 1126, and/or the text data 1132. Additionally, the remote signal 1316, in some examples, may include the image data 1224, the audio data 1126, and/or the text data 1232, which the backend server 1032 may receive based on transmitting a request (as described in further detail below). In such embodiments, an operator of the fourth client device 1038 may be able to view the image data 1124, the text data 1132, the image data 1224, and/or the text data 1232 to help in making a determination of whether a person in the first field of view of the first A/V recording and communication device 1004, the second field of view of the second A/V recording and communication device 1014, and/or in the third field of view of the third A/V recording and communication device 1022 is suspicious and/or performing suspicious activities.

In further reference to FIG. 13, the backend server 1032 may receive data requests 1318 from one or more third-party devices, where the data requests 1318 (also referred to as "image data requests 1318") may be for image data (e.g., image data 1124 and/or image data 1224). For example, the processor 1306 of the backend server 1032 may receive, using the communication module 1302, a data request 1318 from the fourth client device 1038. As discussed above, the data request 1318 may specify an area 308 of interest (from which the requester wishes to gather video footage). Additionally, the data request 1318 may specify a range of dates and/or times associated with the image data being requested. The processor 1306 of the backend server 1032 may then use the location data 1138 and/or the registration data 1238 to determine which authorized A/V recording and communication devices (e.g., the first A/V recording and communication device 1004 and/or the second A/V recording and communication device 1014) and/or unauthorized A/V recording and communication devices (e.g., the third A/V recording and communication device 1022) are located within the area 308. Based on the determination, the processor 1306 of the backend server 1032 may determine which image data to transmit to the fourth client device 1038.

For example, based on the first A/V recording and communication device 1004 including an authorized A/V recording and communication device, the processor 1306 of the backend server 1032 may transmit, using the communication module 1302, the image data 1124 to the fourth client device 1038. Additionally, based on the third A/V recording and communication device 1022 being unauthorized and/or associated with a third-party, the processor 1306 of the backend server 1032 may generate a second data request 1318. The second data request 1318 may indicate the entity that is requesting the image data 1224 (e.g., the backend server 1032, the fourth client device 1038, law enforcement, etc.), the specified range of dates and/or times being requested for the image data 1224, why the image data 1224 is being requested (e.g., may include evidence associated with a crime), and/or the like. The processor 1306 of the backend server 1032 may then transmit, using the communication module 1302, the second data request 1318 to at least one of the third A/V recording and communication device 1022 and/or the third client device 1026.

In response to transmitting the second data request 1318, the processor 1306 of the backend server 1032 may receive, using the communication module 1302, at least a portion of the image data 1224 from the third A/V recording and communication device 1022 and/or the third client device 1026. For example, the processor 1306 of the backend server 1032 may receive the portion of the image data 1224 that is generated by the third A/V recording and communication device 1022 during the specified range of dates and/or times. The processor 1306 of the backend server 1032 may then transmit, using the communication module 1302, at least the portion of the image data 1224 to the fourth client device 1038. By transmitting at least the portion of the image data 1224, the backend server 1032 is capable of providing the fourth client device 1038 with image data 1124 from the authorized, first A/V recording and communication device 1004 as well as the image data 1124 from the unauthorized, fourth A/V recording and communication device 1022.

In further reference to FIG. 13, the processor 1306 of the backend server 1032 may generate consent requests 1320. For example, and as discussed above, the backend server 1032 may request consent to share image data 1124 generated by authorized A/V recording and communication devices 1004, 1014, such as if the backend server 1032 has yet to receive the consent at the time the backend server 1032 receives a data request 1318 for the image data 1124. As such, the processor 1306 of the backend server 1032 may generate the consent requests 1320, which may request the authorized A/V recording and communication devices 1004, 1014 to share the image data 1124. In some examples, the consent requests 1320 may indicate the entity that is requesting the image data 1124, the specified range of dates and/or time being requested for the image data 1224, why the image data 1124 is being requested, an indication of the image data 1124 that is being requested (e.g., if the first A/V recording and communication device 1004 has generated image data 1124 corresponding to four separate instances of detecting motion, which instances of image data 1124 are being requested), and/or the like. The processor 1306 of the backend server 1032 may then transmit, using the communication module 1302, the consent requests 1320 to the authorized A/V recording and communication devices 1004, 1014 and/or the client devices 1012, 1018.

In response, the processor 1306 of the backend server 1032 may receive, using the communication module 1302, consent to share the image data 1124 from the authorized A/V recording and communication devices 1004, 1014 and/or the client devices 1012, 1018, which may be represented by the consent data 1322. The processor 1306 of the backend server 1032 may then transmit, using the communication module 1302, the image data 1124 to the fourth client device 1038. Additionally, the processor 1306 of the backend server 1032 may store the image data 1124 in the storage devices 1028, such as the second storage devices 1028(2), which may be associated with one or more third-party requesters. In any embodiment, the image data 1124 may be stored with an associated tag, such as a "consent tag" or a "law enforcement share tag" which may allow the image data 1124 having the associated consent data 1322 to be shared with the third-party requesters.

In further reference to FIG. 13, the processor 1306 of the backend server 1032 may receive, using the communication module 1302, identification data 1324 from the fourth client device 1038. In some examples, the identification data 1324 may include image data depicting an object of interest, such as a person, automobile, license plate, piece of clothing, and/or the like. In some instances, the identification data 1324 may include information describing an object of interest, such as the name, weight, and/or height of a person, the type and/or color of an automobile, the license plate number of the automobile, and/or the like. The processor 1306 of the backend server 1032 may thus use the identification data 1324 to sort and/or filter the image data (e.g., the image data 1124 and/or the image data 1224) before transmitting such image data to the fourth client device 1038.

For example, the processor 1306 of the backend server 1032 may analyze the image data (e.g., the image data 1124 and the image data 1224 (once received)) using the identification data 1324. In some embodiments, analyzing the image data includes using at least one of image processing and/or computer vision processing to determine if the image data depicts the person and/or object of interest. Based on the analysis, the processor 1306 of the backend server 1032 may determine that a least a portion of the image data (e.g., the image data 1124 and the image data 1224) depicts the person and/or object of interest. The processor 1306 of the backend server 1032 may then order the image data such that image data that depicts the person and/or the object of interest is ordered first, followed by image data that does not depict the object of interest. Based on the order, the processor 1306 of the backend server 1032 may transmit the image data to the fourth client device 1038 such that the image data that depicts the person and/or the object of interest is displayed by the fourth client device 1038 before the image data that does not depict the person and/or the object of interest. In some embodiments, the sorting, filtering, and/or ordering of the image data may also include determining the most useful image data (e.g., the image data that depicts the person and/or the object of interest most clearly). In such embodiments, the most useful image data may be listed and/or ordered before the image data with less useful depictions of the person and/or the object of interest. In other words, by analyzing the image data using the identification data 1324, the processor 1306 of the backend server 1032 is capable of providing the fourth client device 1038 with the most relevant image data first.

In further reference to FIG. 13, the backend server 1032 stores a location component 1326 in the non-volatile memory 1310. In some embodiments, the processor 1306 of the backend server 1032 can utilize the location component 1326 in order to obfuscate locations of A/V recording and communication devices 1004, 1014, and 1022 that are transmitted to other devices, such as the fourth client device 1038. For instance, the location component 1326 can include one or more algorithms that obfuscate the addresses of the A/V recording and communication devices 1004, 1014, and 1022. In some examples, the processor 1306 of the backend server 1032 utilizes the location component 1326 to obfuscate locations of A/V recording and communication devices that have yet to provide consent for sharing image data. Additionally, or alternatively, in some examples, the processor 1306 of the backend server 1032 utilizes the location component 1326 to obfuscate locations of third-party A/V recording and communication devices 1022. Still, in some examples, the processor 1306 of the backend server 1032 utilizes the location component 1326 to obfuscate locations of all A/V recording and communication devices 1004, 1014, and 1022.

In some examples, the location component 1326 may obfuscate a location of an A/V recording and communication devices 1004, 1014, and 1022 by generating an obfuscated location for the A/V recording and communication devices 1004, 1014, and 1022. In some examples, the obfuscated location may be based on the actual locations of the A/V recording and communication devices 1004, 1014, and 1022. For example, an obfuscated location may include, but is not limited to, the block, neighborhood, zip code, city, and/or any other geographic location associated the actual location. In some examples, the obfuscated locations may include locations that are proximate to the actual locations of the A/V recording and communication devices 1004, 1014, and 1022. For example, an obfuscated location can include a neighborhood's address.

When obfuscating locations of A/V recording and communication devices 1004, 1014, and 1022, the processor 1306 of the backend server 1032 may then transmit, using the communication module, 1302, the obfuscated locations to the fourth client device 1038 such that a user of the fourth client device 1038, such as a law enforcement agent, cannot determine the actual locations of the A/V recording and communication devices 1004, 1014, and 1022. Additionally, when obfuscating the locations of the A/V recording and communication devices 1004, 1014, and 1022, the processor 1306 of the backend server 1032 may refrain from transmitting the identities of the A/V recording and communication devices 1004, 1014, and 1022 and/or the users associated with the A/V recording and communication devices 1004, 1014, and 1022, or the processor 1306 of the backend server 1032 may transmit, using the communication module 1302, obfuscated identities (which may be obfuscated using the location component 1326) of the A/V recording and communication devices 1004, 1014, and 1022 and/or the users associated with the A/V recording and communication devices 1004, 1014, and 1022. In some examples, the processor 1306 of the backend server 1032 may receive, using the communication module 1302, requests for the actual locations of the A/V recording and communication devices 1004, 1014, and 1022, the identities of the A/V recording and communication devices 1004, 1014, and 1022, and/or the identities of the users associated with the A/V recording and communication devices 1004, 1014, and 1022. In such instances, the processor 1306 of the backend server 1032 may transmit the actual locations of the A/V recording and communication devices 1004, 1014, and 1022, the identities of the A/V recording and communication devices 1004, 1014, and 1022, and/or the identities of the users associated with the A/V recording and communication devices 1004, 1014, and 1022 after receiving consent.

Figure 14:
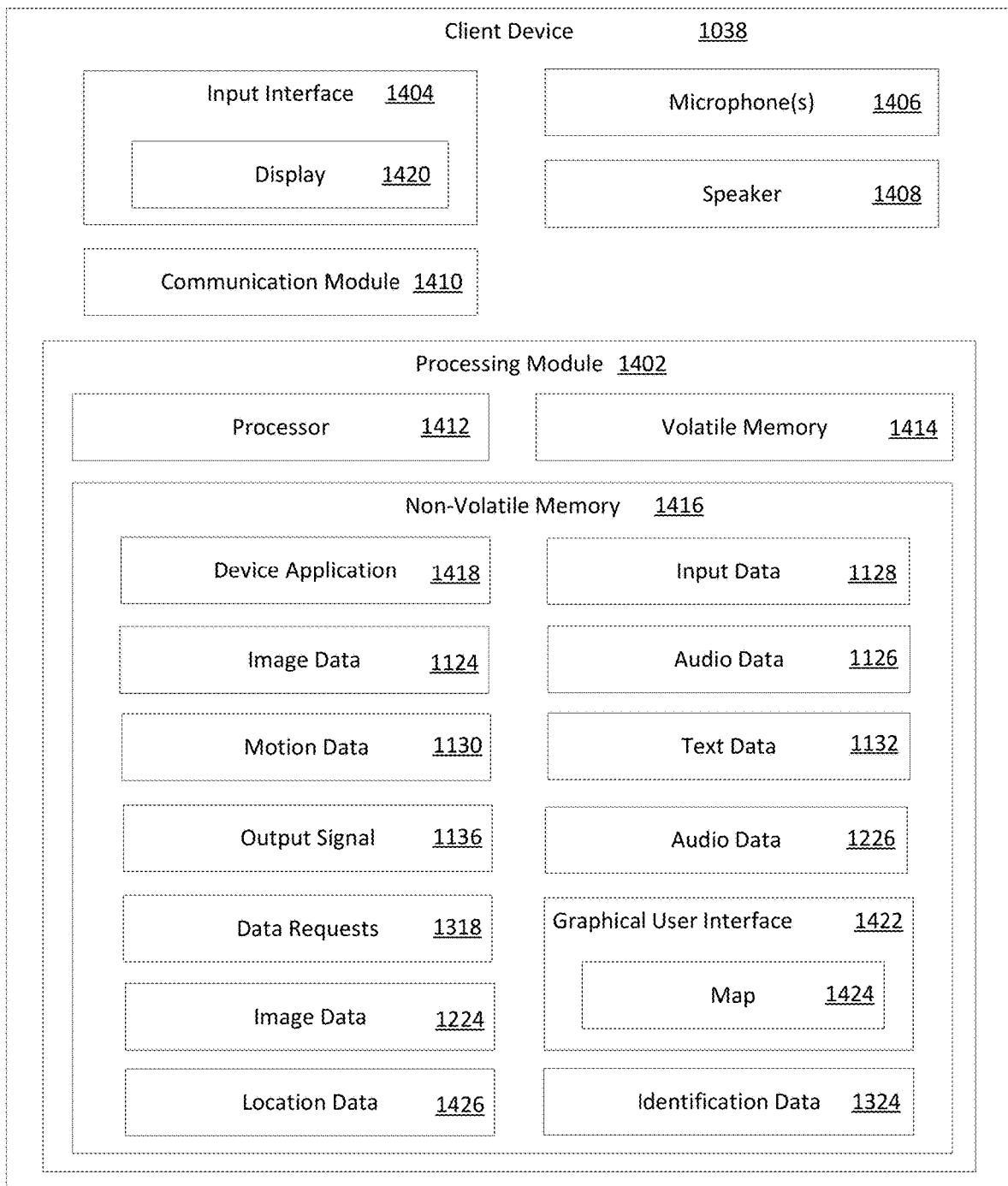
FIG. 14 is a functional block diagram illustrating one example embodiment of a client device according to various aspects of the present disclosure.

Now referring to FIG. 14, FIG. 14 is a functional block diagram illustrating one embodiment of the fourth client device 1038 according to various aspects of the present disclosure. The fourth client device 1038 may comprise a processing module 1402 that is operatively connected to an input interface 1404, microphone(s) 1406, a speaker 1408, and a communication module 1410. The fourth client device 1038 may further comprise a camera (not shown) operatively connected to the processing module 1402. The processing module 1402 may comprise a processor 1412, volatile memory 1414, and non-volatile memory 1416, which includes a device application 1418. In various embodiments, the device application 1418 may configure the processor 1412 to receive input(s) to the input interface 1404 (e.g., requests for the image data 1124 and/or the image data 1224), for example. In addition, the device application 1418 may configure the processor 1412 to receive input data 1128, image data 1124, audio data 1126, and/or the output signal 1136 from one or more of the first A/V recording and communication device 1004 or the backend server 1032. Additionally, the device application 1418 may configure the processor 1412 to receive the image data 1224 and/or the audio data 1226 from one or more of the third A/V recording and communication device 1022 or the backend server 1032. Furthermore, the device application 1418 may configure the processor 1412 to transmit the data requests 1318 to the backend server 1032.

With further reference to FIG. 14, the input interface 1404 may include a display 1420. The display 1420 may include a touchscreen, such that the user of the fourth client device 1038 may provide inputs directly to the display 1420 (e.g., requests for the image data 1124 and/or the image data 1224). In some embodiments, the fourth client device 1038 may not include a touchscreen. In such embodiments, and in embodiments where the fourth client device 1038 includes the touchscreen, the user may provide an input using any input device, such as, without limitation, a mouse, a trackball, a touchpad, a joystick, a pointing stick, a stylus, etc.

In some of the present embodiments, the device application 1418 may configure the processor 1412 to cause the display 1420 to display a graphical user interface (GUI) 1422 for requesting image data 1124 and/or image data 1224. In some examples, the GUI 1418 may correspond to, and/or include similar functionality as, the GUI 300 from the example in FIG. 3. In some of the present embodiments, the device application 1418 may configure the processor 1412 to cause the display 1420 to display a map 1424 on the GUI 1422. In some examples, the map 1424 may correspond to, and/or include similar functionality as, the map 302 from the example in FIG. 3. In some of the present embodiments, the device application 1418 may configure the processor 1412 to cause the display 1420 to display an icon associated with a location that is input by a user of the fourth client device 1038. For example, the device application 1418 may configure the processor 1412 to cause the display 1420 to display the icon 304 the selected location, as illustrated in the example of FIG. 3.

In some of the present embodiments, the device application 1418 may further configure the processor 1412 to cause the display 1420 to display icons associated with locations of both authorized and unauthorized A/V recording and communication devices. For example, the processor 1412 of the fourth client device 1038 may receive location data 1426 from the backend server 1032, where the location data 1426 indicates the locations of both the authorized and the unauthorized A/V recording and communication devices. For instance, the location data 1324 may indicate the location of the first A/V recording and communication device 1004, the location of the second A/V recording and communication device 1014, and/or the third A/V recording and communication device 1022. The device application 1418 may then use the location data 1426 to configure the processor 1412 to display the icons. For example, the device application 1418 may configure the processor 1412 to cause the display 1420 to display the icons 306 associated with the A/V recording and communication devices, as illustrated in the example of FIG. 3.

In some of the present embodiments, the device application 1418 may configure the processor 1412 to generate and transmit data requests 1318 for image data generated by both the authorized and the unauthorized A/V recording and communication devices. For example, the processor 1418 of the fourth client device 1038 may receive, using the input interface 1404, input indicating that the user of the fourth client device 1038 would like to access the image data 1124 from the first A/V recording and communication device 1004 and the image data 1224 from the third A/V recording and communication device. The device application 1418 may then configure the processor 1412 to generate a data request 1318 for the image data 1124 and the image 1224. Additionally, the device application 1418 may configured the processor 1412 to transmit, using the communication module 1410, the data request 1318 to the backend server 1032.

In some of the present embodiments, the device application 1418 may configure the processor 1412 to receive input associated with the identification data 1324. For example, the device application 1418 may configure the processor 1412 to receive image data depicting the person and/or the object of interest. For another example, the device application 1418 may configure the processor 1412 to receive information associated with the person and/or the object of interest. In either example, the device application 1418 may configure the processor 1412 to transmit, using the communication module 1410, the identification data 1418 to the backend server 1032.

Figure 15:
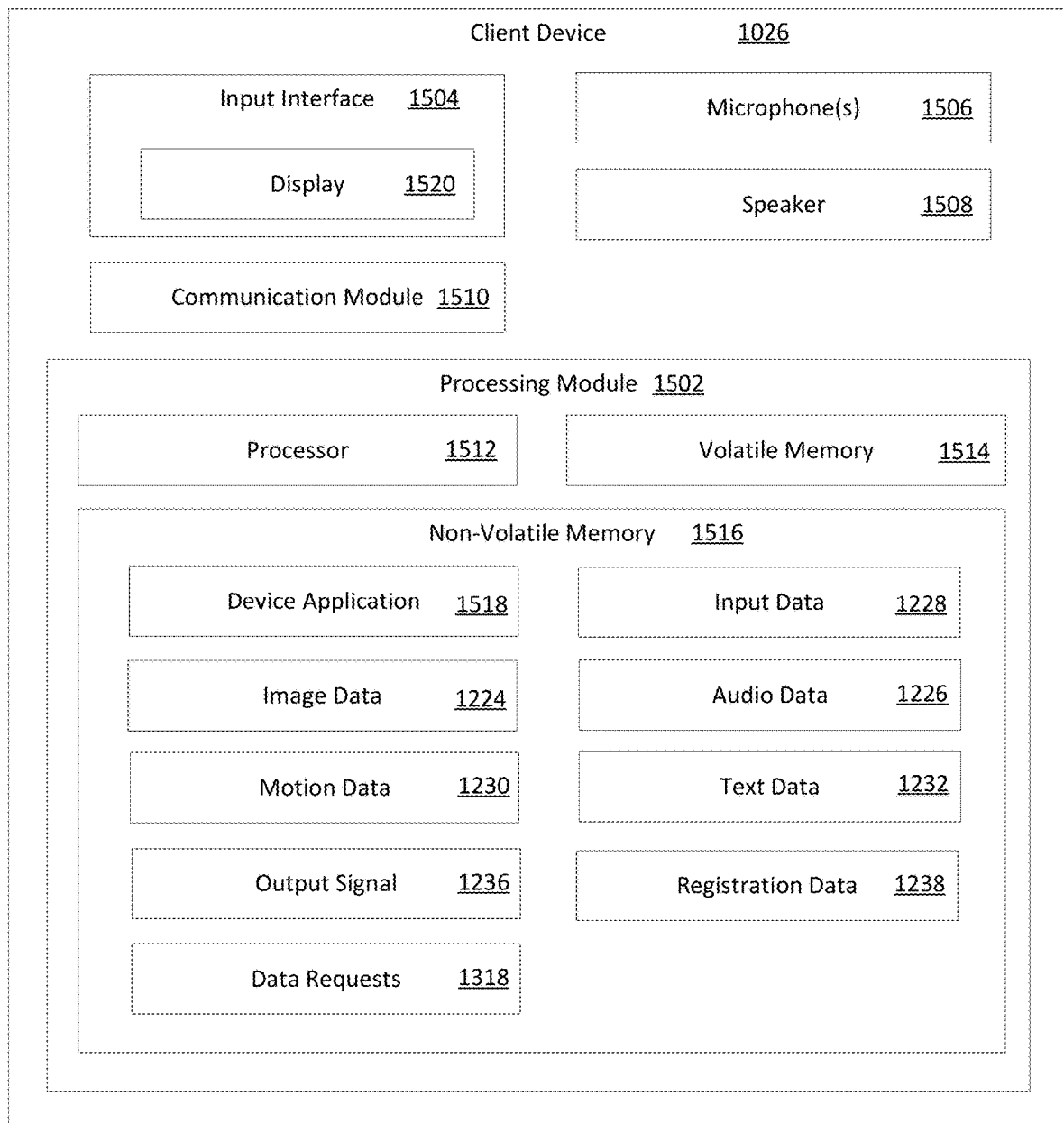
FIG. 15 is a functional block diagram illustrating another example embodiment of a client device according to various aspects of the present disclosure.

Now referring to FIG. 15, FIG. 15 is a functional block diagram illustrating one embodiment of the third client device 1026 according to various aspects of the present disclosure. The third client device 1026 may comprise a processing module 1502 that is operatively connected to an input interface 1504, microphone(s) 1506, a speaker 1508, and a communication module 1510. The third client device 1026 may further comprise a camera (not shown) operatively connected to the processing module 1502. The processing module 1502 may comprise a processor 1512, volatile memory 1514, and non-volatile memory 1516, which includes a device application 1518. In various embodiments, the device application 1518 may configure the processor 1512 to receive input(s) to the input interface 1504. In addition, the device application 1518 may configure the processor 1512 to receive input data 1228, image data 1224, audio data 1226, and/or the output signal 1236 from the third A/V recording and communication device 1022.

Additionally, the device application 1518 may configure the processor 1512 to transmit the registration data 1238 and the image data 1224 to the backend server 1032 and/or the fourth client device 1038.

With further reference to FIG. 15, the input interface 1504 may include a display 1520. The display 1520 may include a touchscreen, such that the user of the third client device 1026 may provide inputs directly to the display 1520. In some embodiments, the third client device 1026 may not include a touchscreen. In such embodiments, and in embodiments where the third client device 1026 includes the touchscreen, the user may provide an input using any input device, such as, without limitation, a mouse, a trackball, a touchpad, a joystick, a pointing stick, a stylus, etc.

In some of the present embodiments, the device application 1518 may configure the processor 1512 to cause the display 1520 to display a data request 1318 that is received from the backend server 1032. The device application 1518 may further configure the processor 1512 to cause the display 1520 to display the image data 1224 that is being requested by the data request 1318. In some examples, the user of the third client device 1026 may then search through the image data 1224 and select which portion of the image data 1224 is being requested by the backend server 1032. Based on receiving the selection, the device application 1518 may configure the processor 1512 to transmit, using the communication module 1510, the selected image data 1224 to the backend server 1032 and/or the fourth client device 1038.

Figure 16:
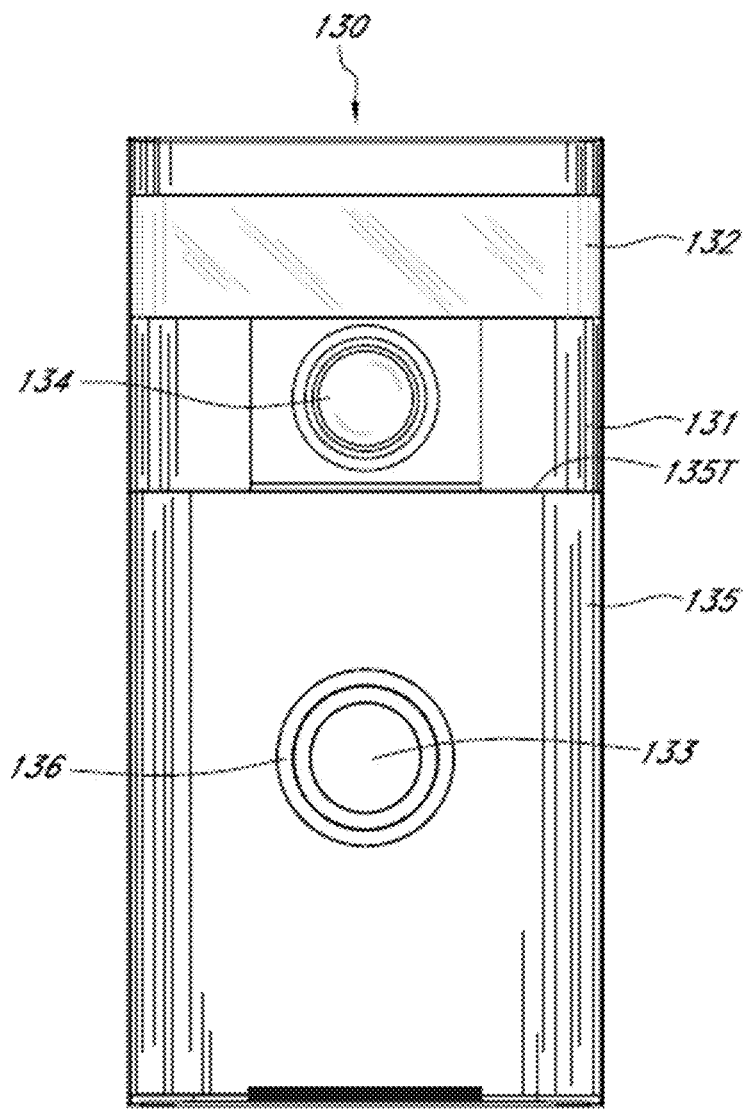
FIG. 16 is a front view of an A/V recording and communication doorbell according to an aspect of the present disclosure.
Figure 17:
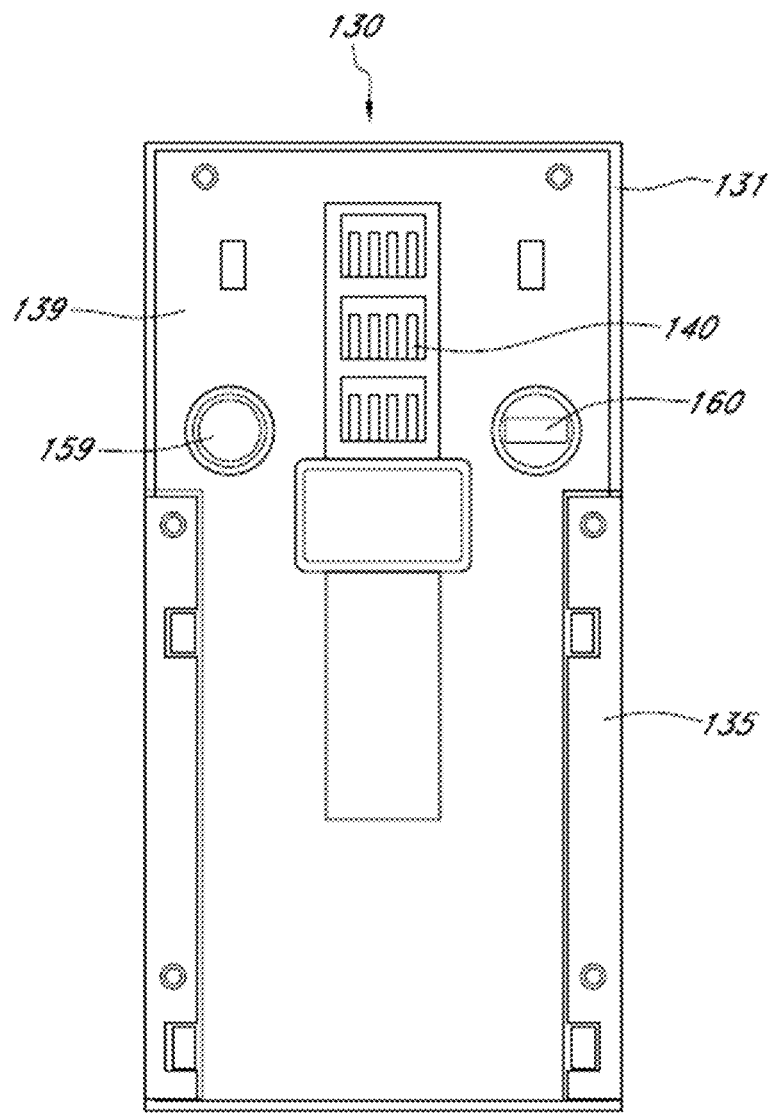
FIG. 17 is a rear view of the A/V recording and communication doorbell of FIG. 16.
Figure 18:
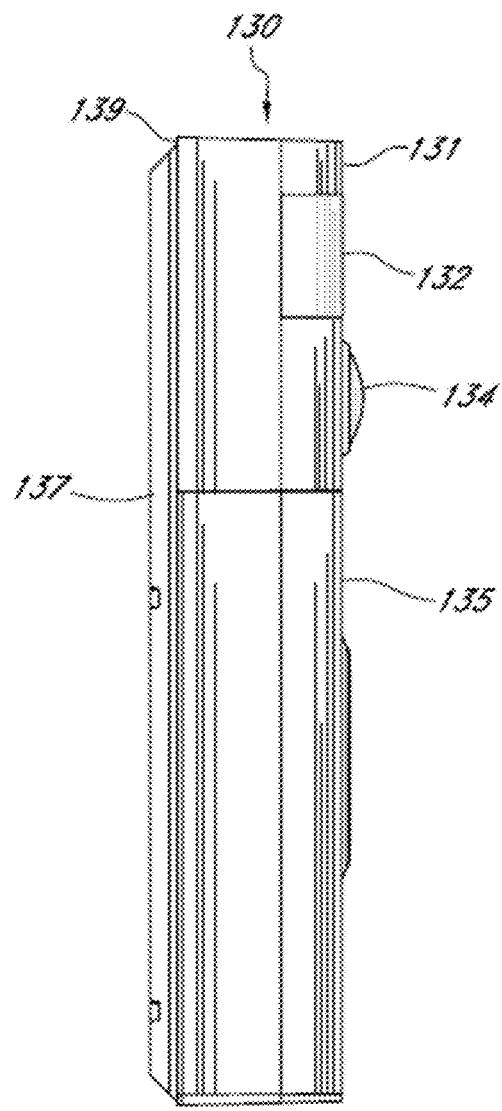
FIG. 18 is a left side view of the A/V recording and communication doorbell of FIG. 16 attached to a mounting bracket according to an aspect of the present disclosure.

FIGS. 16-18 illustrate an A/V recording and communication doorbell 130 (which may alternatively be referred to herein as a "doorbell 130") according to an aspect of present embodiments. In some embodiments, the doorbell 130 may be functionally similar to, include one or more of the similar components of, the A/V recording and communication device 100, the first A/V recording and communication device 1004, the second A/V recording and communication device 1014, and/or the third A/V recording and communication device 1022. The doorbell 130 is configured for use in the methods and systems described in the present disclosure, including those described above. FIG. 16 is a front view, FIG. 17 is a rear view, and FIG. 18 is a left side view of the doorbell 130 coupled with a mounting bracket 137. The doorbell 130 includes a faceplate 135 mounted to a back plate 139 (FIG. 17). With reference to FIG. 18, the faceplate 135 has a substantially flat profile. The faceplate 135 may comprise any suitable material, including, without limitation, metals, such as brushed aluminum or stainless steel, metal alloys, or plastics. The faceplate 135 protects the internal contents of the doorbell 130 and serves as an exterior front surface of the doorbell 130.

With reference to FIG. 16, the faceplate 135 includes a button 133 and a light pipe 136. The button 133 and the light pipe 136 may have various profiles that may or may not match the profile of the faceplate 135. The light pipe 136 may comprise any suitable material, including, without limitation, transparent plastic, that is capable of allowing light produced within the doorbell 130 to pass through. The light may be produced by one or more light-emitting components, such as light-emitting diodes (LED's), contained within the doorbell 130, as further described below. The button 133 may make contact with a button actuator (not shown) located within the doorbell 130 when the button 133 is pressed by a visitor. When pressed, the button 133 may trigger one or more functions of the doorbell 130, as further described below.

With reference to FIGS. 16 and 18, the doorbell 130 further includes an enclosure 131 that engages the faceplate 135. In the illustrated embodiment, the enclosure 131 abuts an upper edge 135T (FIG. 16) of the faceplate 135, but in alternative embodiments one or more gaps between the enclosure 131 and the faceplate 135 may facilitate the passage of sound and/or light through the doorbell 130. The enclosure 131 may comprise any suitable material, but in some embodiments the material of the enclosure 131 preferably permits infrared light to pass through from inside the doorbell 130 to the environment and vice versa. The doorbell 130 further includes a lens 132. In some embodiments, the lens may comprise a Fresnel lens, which may be patterned to deflect incoming light into one or more infrared sensors located within the doorbell 130. The doorbell 130 further includes a camera 134, which captures video data when activated, as described below.

FIG. 17 is a rear view of the doorbell 130, according to an aspect of the present embodiments. As illustrated, the enclosure 131 may extend from the front of the doorbell 130 around to the back thereof and may fit snugly around a lip of the back plate 139. The back plate 139 may comprise any suitable material, including, without limitation, metals, such as brushed aluminum or stainless steel, metal alloys, or plastics. The back plate 139 protects the internal contents of the doorbell 130 and serves as an exterior rear surface of the doorbell 130. The faceplate 135 may extend from the front of the doorbell 130 and at least partially wrap around the back plate 139, thereby allowing a coupled connection between the faceplate 135 and the back plate 139. The back plate 139 may have indentations in its structure to facilitate the coupling.

With further reference to FIG. 17, spring contacts 140 may provide power to the doorbell 130 when mated with other conductive contacts connected to a power source. The spring contacts 140 may comprise any suitable conductive material, including, without limitation, copper, and may be capable of deflecting when contacted by an inward force, for example the insertion of a mating element. The doorbell 130 further comprises a connector 160, such as a micro-USB or other connector, whereby power and/or data may be supplied to and from the components within the doorbell 130. A reset button 159 may be located on the back plate 139, and may make contact with a button actuator (not shown) located within the doorbell 130 when the reset button 159 is pressed. When the reset button 159 is pressed, it may trigger one or more functions, as described below.

FIG. 18 is a left side profile view of the doorbell 130 coupled to the mounting bracket 137, according to an aspect of the present embodiments. The mounting bracket 137 facilitates mounting the doorbell 130 to a surface, such as the exterior of a building, such as a home or office. As illustrated in FIG. 18, the faceplate 135 may extend from the bottom of the doorbell 130 up to just below the camera 134, and connect to the back plate 139 as described above. The lens 132 may extend and curl partially around the side of the doorbell 130. The enclosure 131 may extend and curl around the side and top of the doorbell 130, and may be coupled to the back plate 139 as described above. The camera 134 may protrude slightly through the enclosure 131, thereby giving it a wider field of view. The mounting bracket 137 may couple with the back plate 139 such that they contact each other at various points in a common plane of contact, thereby creating an assembly including the doorbell 130 and the mounting bracket 137. The couplings described in this paragraph, and elsewhere, may be secured by, for example and without limitation, screws, interference fittings, adhesives, or other fasteners. Interference fittings may refer to a type of connection where a material relies on pressure and/or gravity coupled with the material's physical strength to support a connection to a different element.

Figure 19:
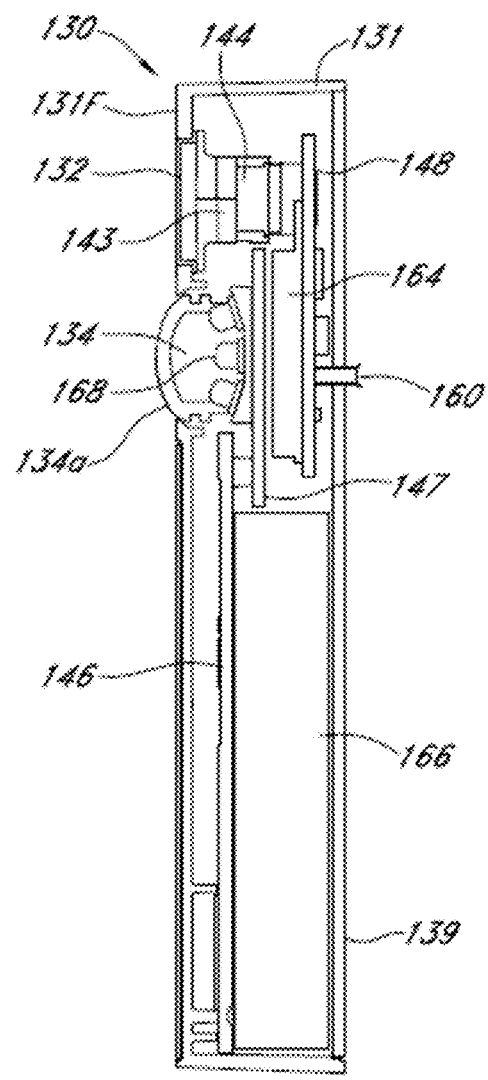
FIG. 19 is cross-sectional right side view of the A/V recording and communication doorbell of FIG. 16.

FIG. 19 is a right side cross-sectional view of the doorbell 130 without the mounting bracket 137. In the illustrated embodiment, the lens 132 is substantially coplanar with the front surface 131F of the enclosure 131. In alternative embodiments, the lens 132 may be recessed within the enclosure 131 or may protrude outward from the enclosure 131. The camera 134 is coupled to a camera printed circuit board (PCB) 147, and a lens of the camera 134 protrudes through an opening in the enclosure 131. The camera lens 134 may be a lens capable of focusing light into the camera 134 so that clear images may be taken.

The camera PCB 147 may be secured within the doorbell 130 with any suitable fasteners, such as screws, or interference connections, adhesives, etc. The camera PCB 147 comprises various components that enable the functionality of the camera 134 of the doorbell 130, as described below. Infrared light-emitting components, such as infrared LED's 168, are coupled to the camera PCB 147 and may be triggered to activate when a light sensor detects a low level of ambient light. When activated, the infrared LED's 168 may emit infrared light through the enclosure 131 and/or the camera 134 out into the ambient environment. The camera 134, which may be configured to detect infrared light, may then capture the light emitted by the infrared LED's 168 as it reflects off objects within the camera's 134 field of view, so that the doorbell 130 may clearly capture images at night (may be referred to as "night vision").

With continued reference to FIG. 19, the doorbell 130 further comprises a front PCB 146, which in the illustrated embodiment resides in a lower portion of the doorbell 130 adjacent a battery 166. The front PCB 146 may be secured within the doorbell 130 with any suitable fasteners, such as screws, or interference connections, adhesives, etc. The front PCB 146 comprises various components that enable the functionality of the audio and light components, as further described below. The battery 166 may provide power to the doorbell 130 components while receiving power from the spring contacts 140, thereby engaging in a trickle-charge method of power consumption and supply. Alternatively, the doorbell 130 may draw power directly from the spring contacts 140 while relying on the battery 166 only when the spring contacts 140 are not providing the power necessary for all functions.

With continued reference to FIG. 19, the doorbell 130 further comprises a power PCB 148, which in the illustrated embodiment resides behind the camera PCB 147. The power PCB 148 may be secured within the doorbell 130 with any suitable fasteners, such as screws, or interference connections, adhesives, etc. The power PCB 148 comprises various components that enable the functionality of the power and device-control components, as further described below.

With continued reference to FIG. 19, the doorbell 130 further comprises a communication module 164 coupled to the power PCB 148. The communication module 164 facilitates communication with client devices in one or more remote locations, as further described below. The connector 160 may protrude outward from the power PCB 148 and extend through a hole in the back plate 139. The doorbell 130 further comprises passive infrared (PIR) sensors 144, which are secured on or within a PIR sensor holder 143, and the assembly resides behind the lens 132. The PIR sensor holder 143 may be secured to the doorbell 130 with any suitable fasteners, such as screws, or interference connections, adhesives, etc. The PIR sensors 144 may be any type of sensor capable of detecting and communicating the presence of a heat source within their field of view. Further, alternative embodiments may comprise one or more motion sensors either in place of or in addition to the PIR sensors 144. The motion sensors may be configured to detect motion using any methodology, such as a methodology that does not rely on detecting the presence of a heat source within a field of view.

Figure 20:
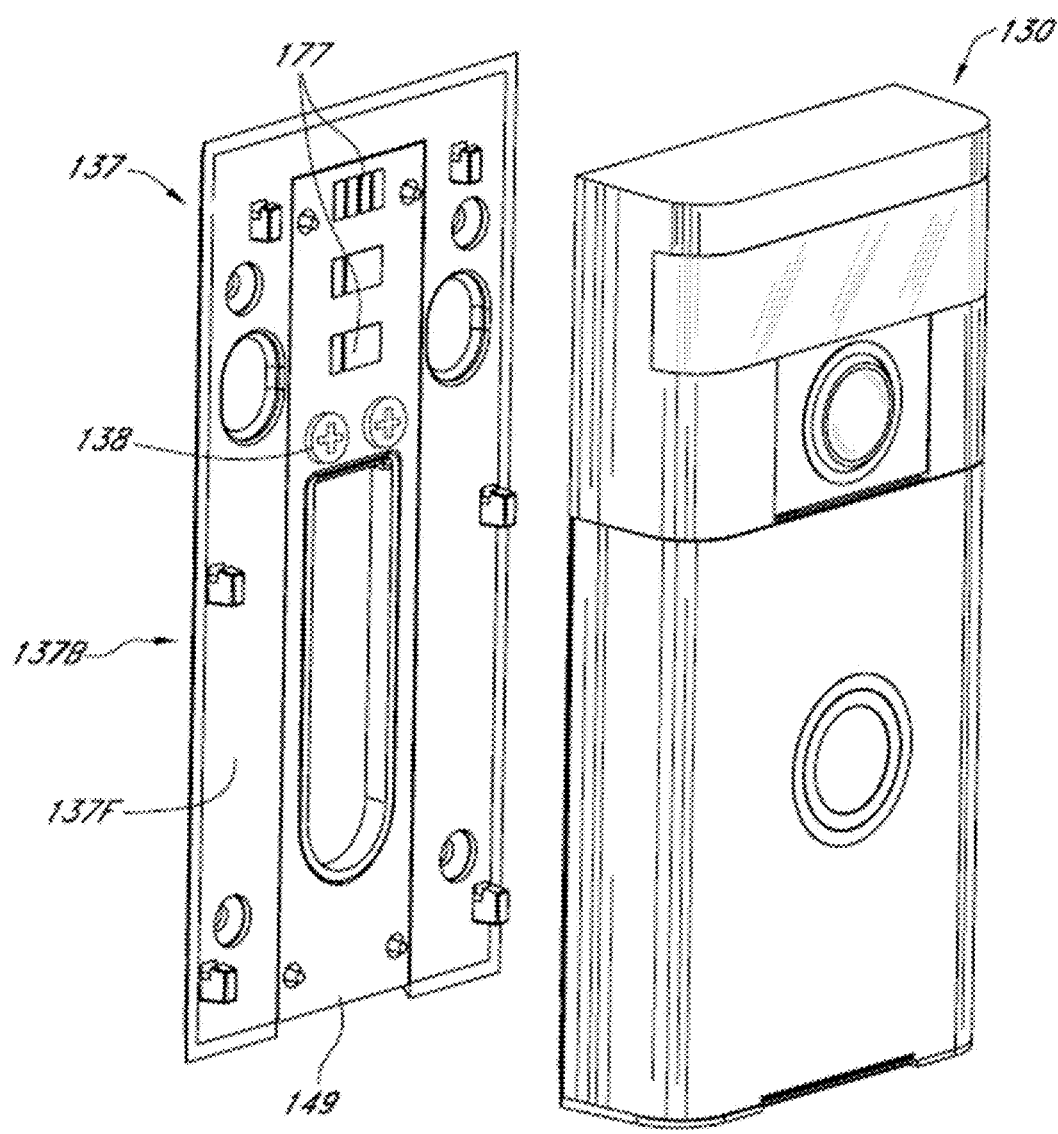
FIG. 20 is an exploded view of the A/V recording and communication doorbell and the mounting bracket of FIG. 18.

FIG. 20 is an exploded view of the doorbell 130 and the mounting bracket 137 according to an aspect of the present embodiments. The mounting bracket 137 is configured to be mounted to a mounting surface (not shown) of a structure, such as a home or an office. FIG. 20 shows the front side 137F of the mounting bracket 137. The mounting bracket 137 is configured to be mounted to the mounting surface such that the back side 137B thereof faces the mounting surface. In certain embodiments, the mounting bracket 137 may be mounted to surfaces of various composition, including, without limitation, wood, concrete, stucco, brick, vinyl siding, aluminum siding, etc., with any suitable fasteners, such as screws, or interference connections, adhesives, etc. The doorbell 130 may be coupled to the mounting bracket 137 with any suitable fasteners, such as screws, or interference connections, adhesives, etc.

With continued reference to FIG. 20, the illustrated embodiment of the mounting bracket 137 includes the terminal screws 138. The terminal screws 138 are configured to receive electrical wires adjacent the mounting surface of the structure upon which the mounting bracket 137 is mounted, so that the doorbell 130 may receive electrical power from the structure's electrical system. The terminal screws 138 are electrically connected to electrical contacts 177 of the mounting bracket. If power is supplied to the terminal screws 138, then the electrical contacts 177 also receive power through the terminal screws 138. The electrical contacts 177 may comprise any suitable conductive material, including, without limitation, copper, and may protrude slightly from the face of the mounting bracket 137 so that they may mate with the spring contacts 140 located on the back plate 139.

Figure 21:
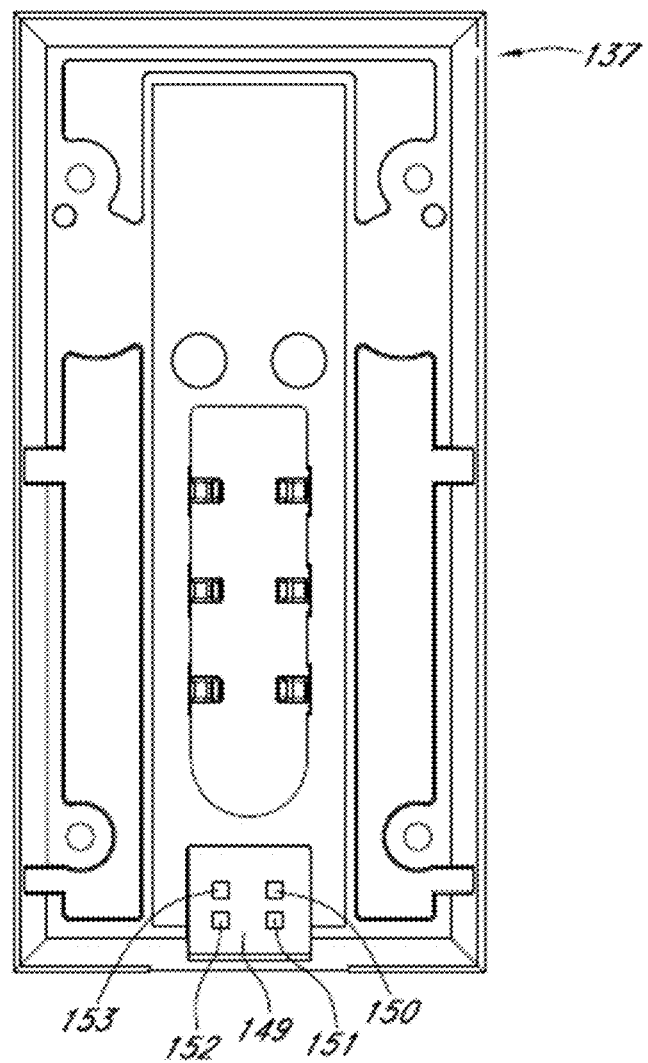
FIG. 21 is a rear view of the mounting bracket of FIG. 18.

With reference to FIGS. 20 and 21 (which is a rear view of the mounting bracket 137), the mounting bracket 137 further comprises a bracket PCB 149. With reference to FIG. 21, the bracket PCB 149 is situated outside the doorbell 130, and is therefore configured for various sensors that measure ambient conditions, such as an accelerometer 150, a barometer 151, a humidity sensor 152, and a temperature sensor 153. The functions of these components are discussed in more detail below. The bracket PCB 149 may be secured to the mounting bracket 137 with any suitable fasteners, such as screws, or interference connections, adhesives, etc.

Figure 22A:
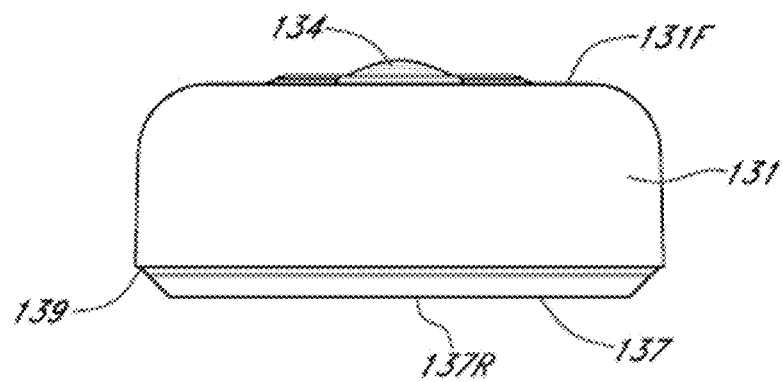
FIGS. 22A and 22B are top and bottom views, respectively, of the A/V recording and communication doorbell and the mounting bracket of FIG. 18.
Figure 22B:
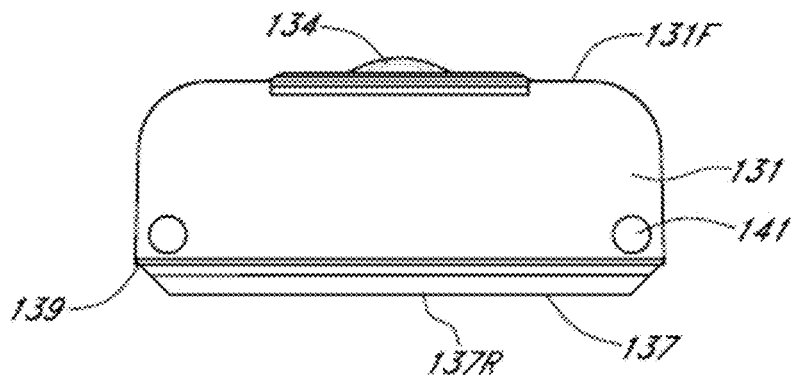

FIGS. 22A and 22B are top and bottom views, respectively, of the doorbell 130. As described above, the enclosure 131 may extend from the front face 131F of the doorbell 130 to the back, where it contacts and snugly surrounds the back plate 139. The camera 134 may protrude slightly beyond the front face 131F of the enclosure 131, thereby giving the camera 134 a wider field of view. The mounting bracket 137 may include a substantially flat rear surface 137R, such that the doorbell 130 and the mounting bracket 137 assembly may sit flush against the surface to which they are mounted. With reference to FIG. 16B, the lower end of the enclosure 131 may include security screw apertures 141 configured to receive screws or other fasteners.

Figure 23A:
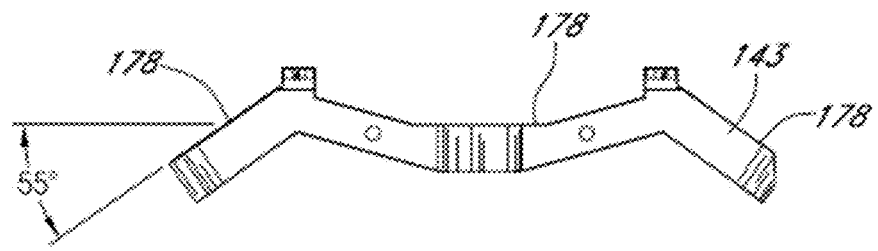
FIGS. 23A and 23B are top and front views, respectively, of a passive infrared sensor holder of the A/V recording and communication doorbell of FIG. 16.

FIG. 23A is a top view of the PIR sensor holder 143. The PIR sensor holder 143 may comprise any suitable material, including, without limitation, metals, metal alloys, or plastics. The PIR sensor holder 143 is configured to mount the PIR sensors 144 behind the lens 132 such that the PIR sensors 144 face out through the lens 132 at varying angles, thereby creating a wide field of view for the PIR sensors 144, and dividing the field of view into zones, as further described below. With further reference to FIG. 23A, the PIR sensor holder 143 includes one or more faces 178 within or on which the PIR sensors 144 may be mounted. In the illustrated embodiment, the PIR sensor holder 143 includes three faces 178, with each of two outer faces 178 angled at 55° with respect to a center one of the faces 178. In alternative embodiments, the angle formed by adjacent ones of the faces 178 may be increased or decreased as desired to alter the field of view of the PIR sensors 144.

Figure 23B:
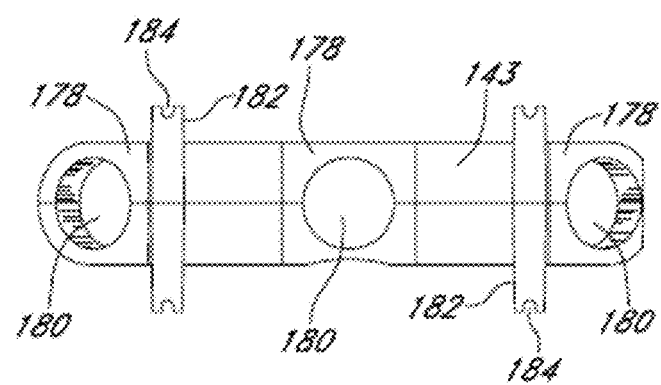

FIG. 23B is a front view of the PIR sensor holder 143. In the illustrated embodiment, each of the faces 178 includes a through hole 180 in which the PIR sensors 144 may be mounted. First and second brackets 182, spaced from one another, extend transversely across the PIR sensor holder 143. Each of the brackets 182 includes notches 184 at either end. The brackets 182 may be used to secure the PIR sensor holder 143 within the doorbell 130. In alternative embodiments, the through holes 180 in the faces 178 may be omitted. For example, the PIR sensors 144 may be mounted directly to the faces 178 without the through holes 180. Generally, the faces 178 may be comprise any structure configured to locate and secure the PIR sensors 144 in place.

Figure 24A:
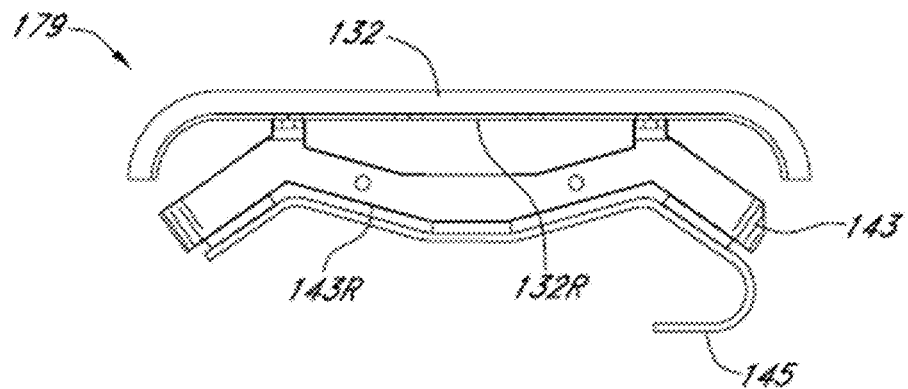
FIGS. 24A and 24B are top and front views, respectively, of a passive infrared sensor holder assembly of the A/V recording and communication doorbell of FIG. 16.
Figure 24B:
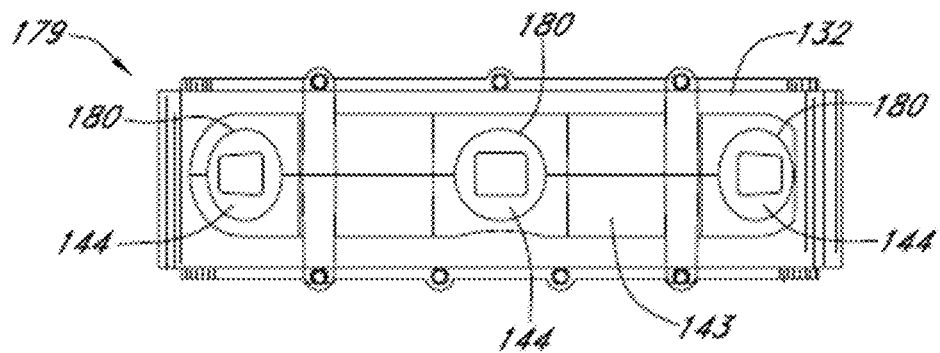

FIGS. 24A and 24B are top and front views, respectively, of a PIR sensor assembly 179, including the PIR sensor holder 143, the lens 132, and a flexible power circuit 145. The PIR sensor holder 143 may be secured to a rear face 132R of the lens 132, as shown, with the brackets 182 abutting the rear face 132R of the lens 132. The flexible power circuit 145, which may be any material or component capable of delivering power and/or data to and from the PIR sensors 144, is secured to a rear face 143R of the PIR sensor holder 143, and may be contoured to match the angular shape of the PIR sensor holder 143. The flexible power circuit 145 may connect to, draw power from, and/or transmit data to and/or from, the power PCB 148 (FIG. 13).

Figure 25:
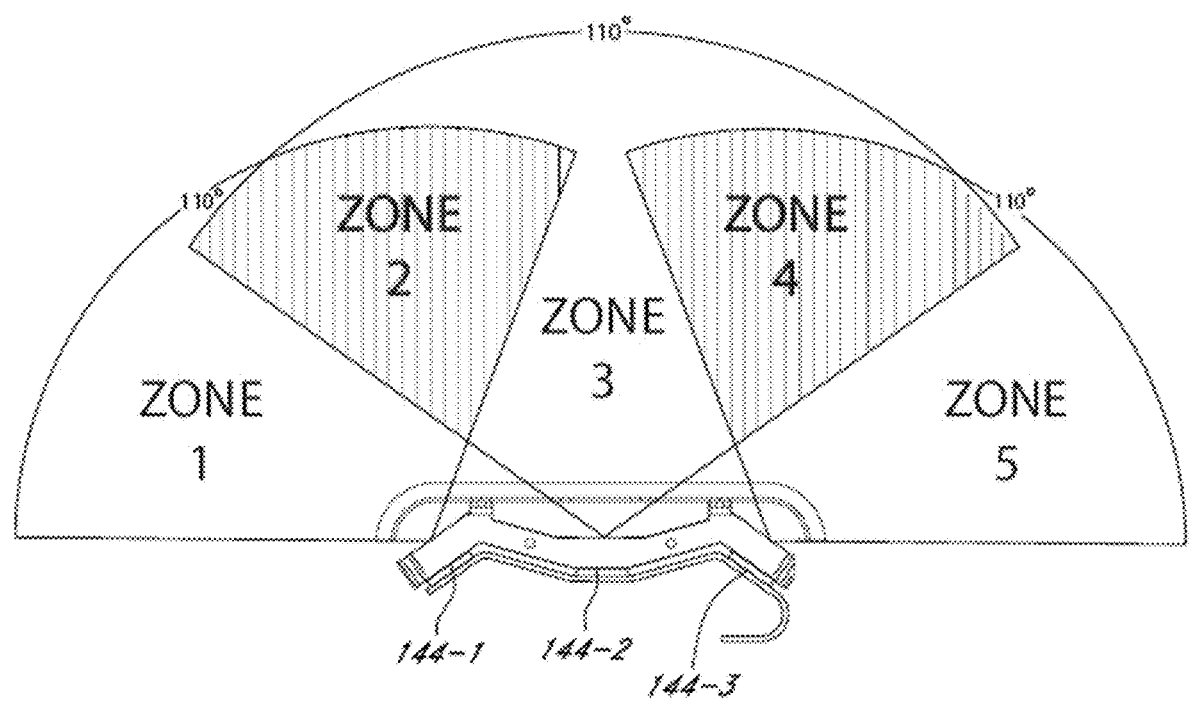
FIG. 25 is a top view of the passive infrared sensor assembly of FIG. 24A and a field of view thereof according to an aspect of the present disclosure.

FIG. 25 is a top view of the PIR sensor assembly 179 illustrating the fields of view of the PIR sensors 144. Each PIR sensor 144 includes a field of view, referred to as a "zone," that traces an angle extending outward from the respective PIR sensor 144. Zone 1 is the area that is visible only to Passive Infrared Sensor 144-1. Zone 2 is the area that is visible only to the PIR sensors 144-1 and 144-2. Zone 3 is the area that is visible only to Passive Infrared Sensor 144-2. Zone 4 is the area that is visible only to the PIR sensors 144-2 and 144-3. Zone 5 is the area that is visible only to Passive Infrared Sensor 144-3. The doorbell 130 may be capable of determining the direction that an object is moving based upon which zones are triggered in a time sequence. In the illustrated embodiment, each zone extends across an angle of 110°. In alternative embodiments, each zone may extend across a different angle, such as one greater than or less than 110°.

Figure 26:
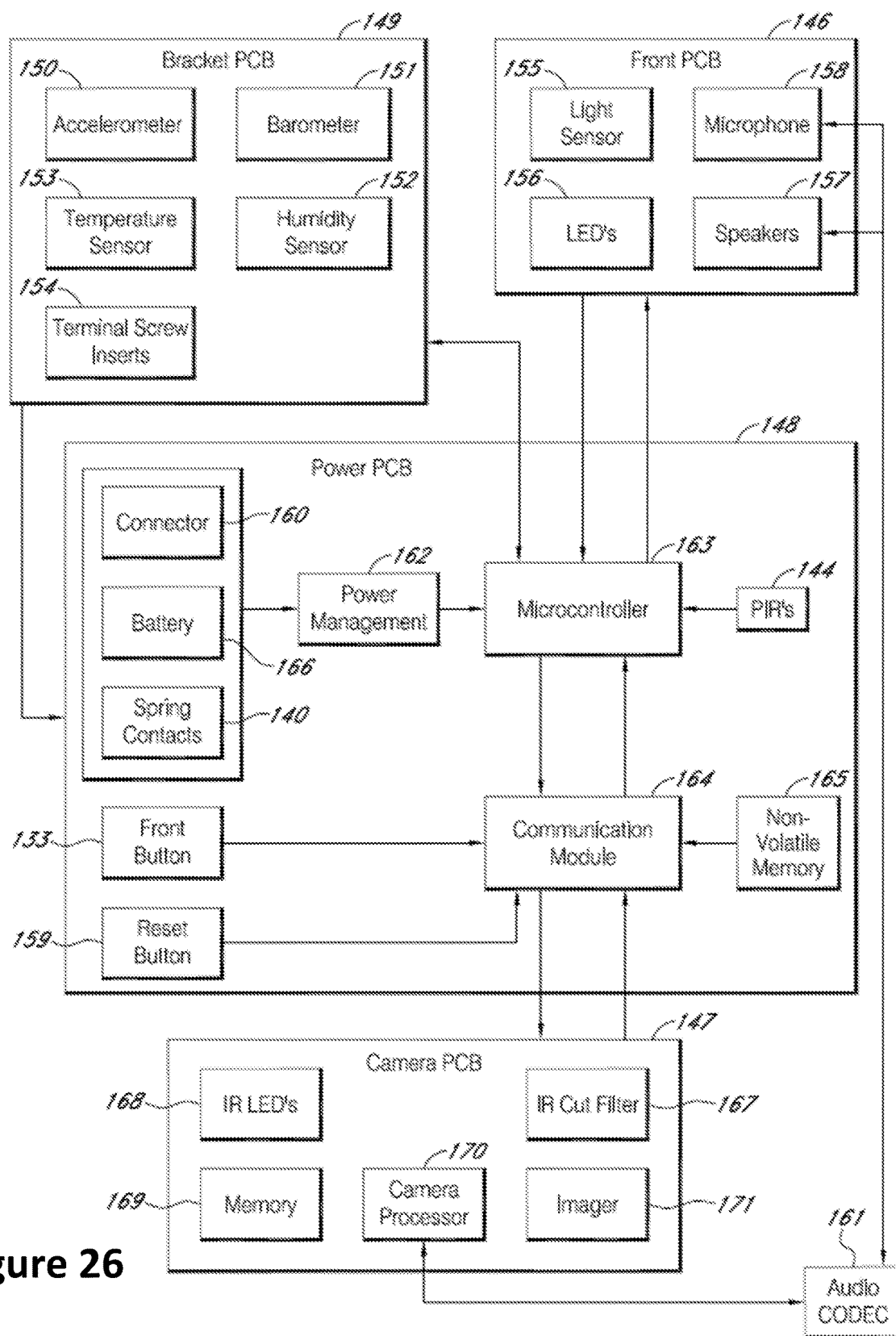
FIG. 26 a functional block diagram of the components of the A/V recording and communication doorbell of FIG. 16.

FIG. 26 is a functional block diagram of the components within or in communication with the doorbell 130, according to an aspect of the present embodiments. As described above, the bracket PCB 149 may comprise an accelerometer 150, a barometer 151, a humidity sensor 152, and a temperature sensor 153. The accelerometer 150 may be one or more sensors capable of sensing motion and/or acceleration. The barometer 151 may be one or more sensors capable of determining the atmospheric pressure of the surrounding environment in which the bracket PCB 149 may be located. The humidity sensor 152 may be one or more sensors capable of determining the amount of moisture present in the atmospheric environment in which the bracket PCB 149 may be located. The temperature sensor 153 may be one or more sensors capable of determining the temperature of the ambient environment in which the bracket PCB 149 may be located. As described above, the bracket PCB 149 may be located outside the housing of the doorbell 130 so as to reduce interference from heat, pressure, moisture, and/or other stimuli generated by the internal components of the doorbell 130.

With further reference to FIG. 26, the bracket PCB 149 may further comprise terminal screw inserts 154, which may be configured to receive the terminal screws 138 and transmit power to the electrical contacts 177 on the mounting bracket 137 (FIG. 6). The bracket PCB 149 may be electrically and/or mechanically coupled to the power PCB 148 through the terminal screws 138, the terminal screw inserts 154, the spring contacts 140, and the electrical contacts 177. The terminal screws 138 may receive electrical wires located at the surface to which the doorbell 130 is mounted, such as the wall of a building, so that the doorbell may receive electrical power from the building's electrical system. Upon the terminal screws 138 being secured within the terminal screw inserts 154, power may be transferred to the bracket PCB 149, and to all of the components associated therewith, including the electrical contacts 177. The electrical contacts 177 may transfer electrical power to the power PCB 148 by mating with the spring contacts 140.

With further reference to FIG. 26, the front PCB 146 may comprise a light sensor 155, one or more light-emitting components, such as LED's 156, one or more speakers 157, and a microphone 158. The light sensor 155 may be one or more sensors capable of detecting the level of ambient light of the surrounding environment in which the doorbell 130 may be located. LED's 156 may be one or more light-emitting diodes capable of producing visible light when supplied with power. The speakers 157 may be any electro-mechanical device capable of producing sound in response to an electrical signal input. The microphone 158 may be an acoustic-to-electric transducer or sensor capable of converting sound waves into an electrical signal. When activated, the LED's 156 may illuminate the light pipe 136 (FIG. 2). The front PCB 146 and all components thereof may be electrically coupled to the power PCB 148, thereby allowing data and/or power to be transferred to and from the power PCB 148 and the front PCB 146.

The speakers 157 and the microphone 158 may be coupled to the camera processor 170 through an audio CODEC 161. For example, the transfer of digital audio from the user's client device 114 and the speakers 157 and the microphone 158 may be compressed and decompressed using the audio CODEC 161, coupled to the camera processor 170. Once compressed by audio CODEC 161, digital audio data may be sent through the communication module 164 to the network 112, routed by one or more servers 118, and delivered to the user's client device 114. When the user speaks, after being transferred through the network 112, digital audio data is decompressed by audio CODEC 161 and emitted to the visitor via the speakers 157.

With further reference to FIG. 26, the power PCB 148 may comprise a power management module 162, a microcontroller 163, the communication module 164, and power PCB non-volatile memory 165. In certain embodiments, the power management module 162 may comprise an integrated circuit capable of arbitrating between multiple voltage rails, thereby selecting the source of power for the doorbell 130. The battery 166, the spring contacts 140, and/or the connector 160 may each provide power to the power management module 162. The power management module 162 may have separate power rails dedicated to the battery 166, the spring contacts 140, and the connector 160. In one aspect of the present disclosure, the power management module 162 may continuously draw power from the battery 166 to power the doorbell 130, while at the same time routing power from the spring contacts 140 and/or the connector 160 to the battery 166, thereby allowing the battery 166 to maintain a substantially constant level of charge. Alternatively, the power management module 162 may continuously draw power from the spring contacts 140 and/or the connector 160 to power the doorbell 130, while only drawing from the battery 166 when the power from the spring contacts 140 and/or the connector 160 is low or insufficient. The power management module 162 may also serve as a conduit for data between the connector 160 and the microcontroller 163.

With further reference to FIG. 26, in certain embodiments the microcontroller 163 may comprise an integrated circuit including a processor core, memory, and programmable input/output peripherals. The microcontroller 163 may receive input signals, such as data and/or power, from the PIR sensors 144, the bracket PCB 149, the power management module 162, the light sensor 155, the microphone 158, and/or the communication module 164, and may perform various functions as further described below. When the microcontroller 163 is triggered by the PIR sensors 144, the microcontroller 163 may be triggered to perform one or more functions, such as those described below with reference to FIG. 20. When the light sensor 155 detects a low level of ambient light, the light sensor 155 may trigger the microcontroller 163 to enable "night vision," as further described below. The microcontroller 163 may also act as a conduit for data communicated between various components and the communication module 164.

With further reference to FIG. 26, the communication module 164 may comprise an integrated circuit including a processor core, memory, and programmable input/output peripherals. The communication module 164 may also be configured to transmit data wirelessly to a remote network device, and may include one or more transceivers (not shown). The wireless communication may comprise one or more wireless networks, such as, without limitation, Wi-Fi, cellular, Bluetooth, and/or satellite networks. The communication module 164 may receive inputs, such as power and/or data, from the camera PCB 147, the microcontroller 163, the button 133, the reset button 159, and/or the power PCB non-volatile memory 165. When the button 133 is pressed, the communication module 164 may be triggered to perform one or more functions, such as those described below with reference to FIG. 19. When the reset button 159 is pressed, the communication module 164 may be triggered to erase any data stored at the power PCB non-volatile memory 165 and/or at the camera PCB memory 169. The communication module 164 may also act as a conduit for data communicated between various components and the microcontroller 163. The power PCB non-volatile memory 165 may comprise flash memory configured to store and/or transmit data. For example, in certain embodiments the power PCB non-volatile memory 165 may comprise serial peripheral interface (SPI) flash memory.

With further reference to FIG. 26, the camera PCB 147 may comprise components that facilitate the operation of the camera 134. For example, an imager 171 may comprise a video recording sensor and/or a camera chip. In one aspect of the present disclosure, the imager 171 may comprise a complementary metal-oxide semiconductor (CMOS) array, and may be capable of recording high definition (720p or better) video files. A camera processor 170 may comprise an encoding and compression chip. In some embodiments, the camera processor 170 may comprise a bridge processor. The camera processor 170 may process video recorded by the imager 171 and audio recorded by the microphone 158, and may transform this data into a form suitable for wireless transfer by the communication module 164 to a network. The camera PCB memory 169 may comprise volatile memory that may be used when data is being buffered or encoded by the camera processor 170. For example, in certain embodiments the camera PCB memory 169 may comprise synchronous dynamic random access memory (SD RAM). IR LED's 168 may comprise light-emitting diodes capable of radiating infrared light. IR cut filter 167 may comprise a system that, when triggered, configures the imager 171 to see primarily infrared light as opposed to visible light. When the light sensor 155 detects a low level of ambient light (which may comprise a level that impedes the performance of the imager 171 in the visible spectrum), the IR LED's 168 may shine infrared light through the doorbell 130 enclosure out to the environment, and the IR cut filter 167 may enable the imager 171 to see this infrared light as it is reflected or refracted off of objects within the field of view of the doorbell. This process may provide the doorbell 130 with the "night vision" function mentioned above.

Figure 27:
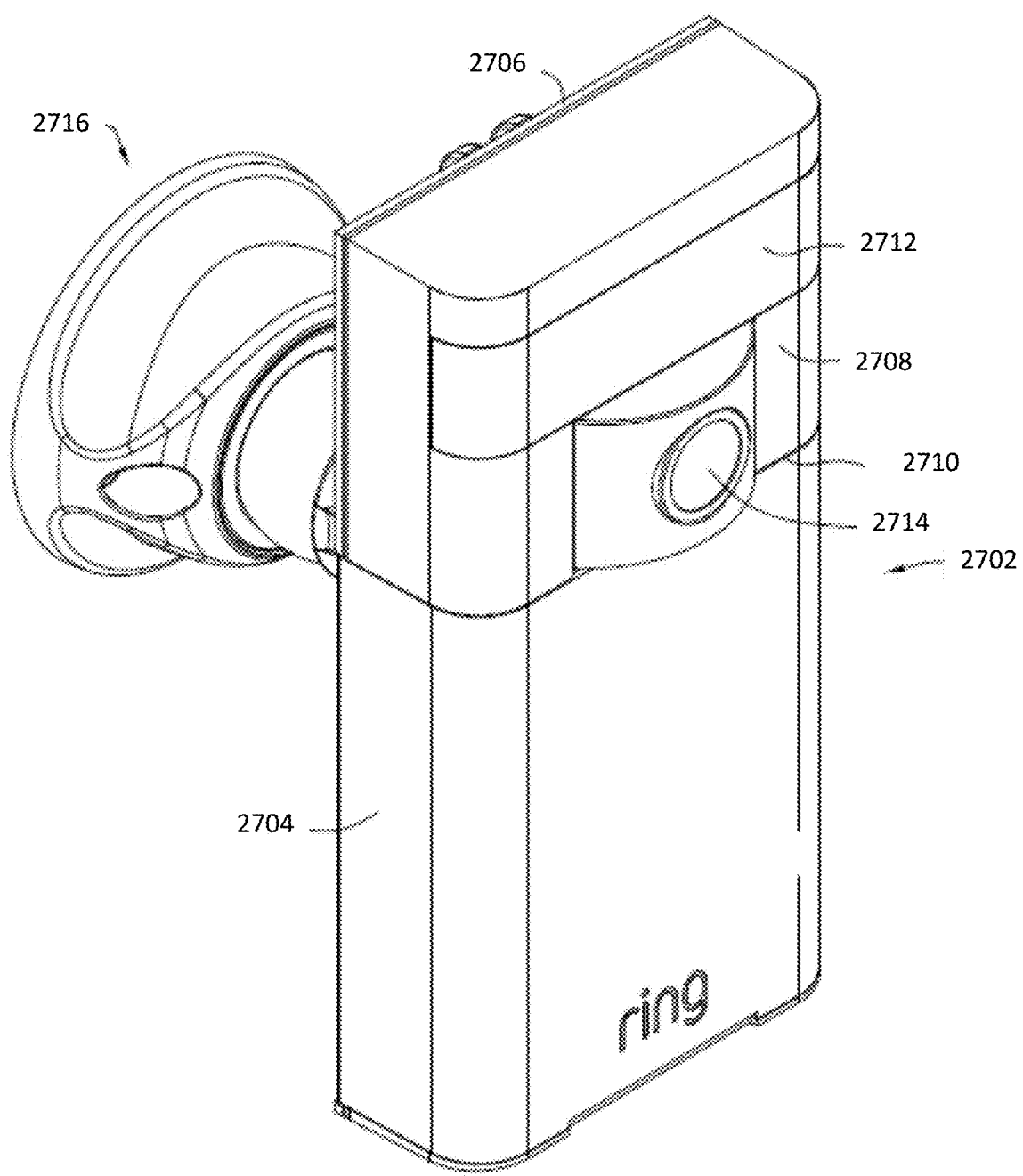
FIG. 27 is an upper front perspective view of an example A/V recording and communication security camera according to various aspects of the present disclosure.
Figure 28:
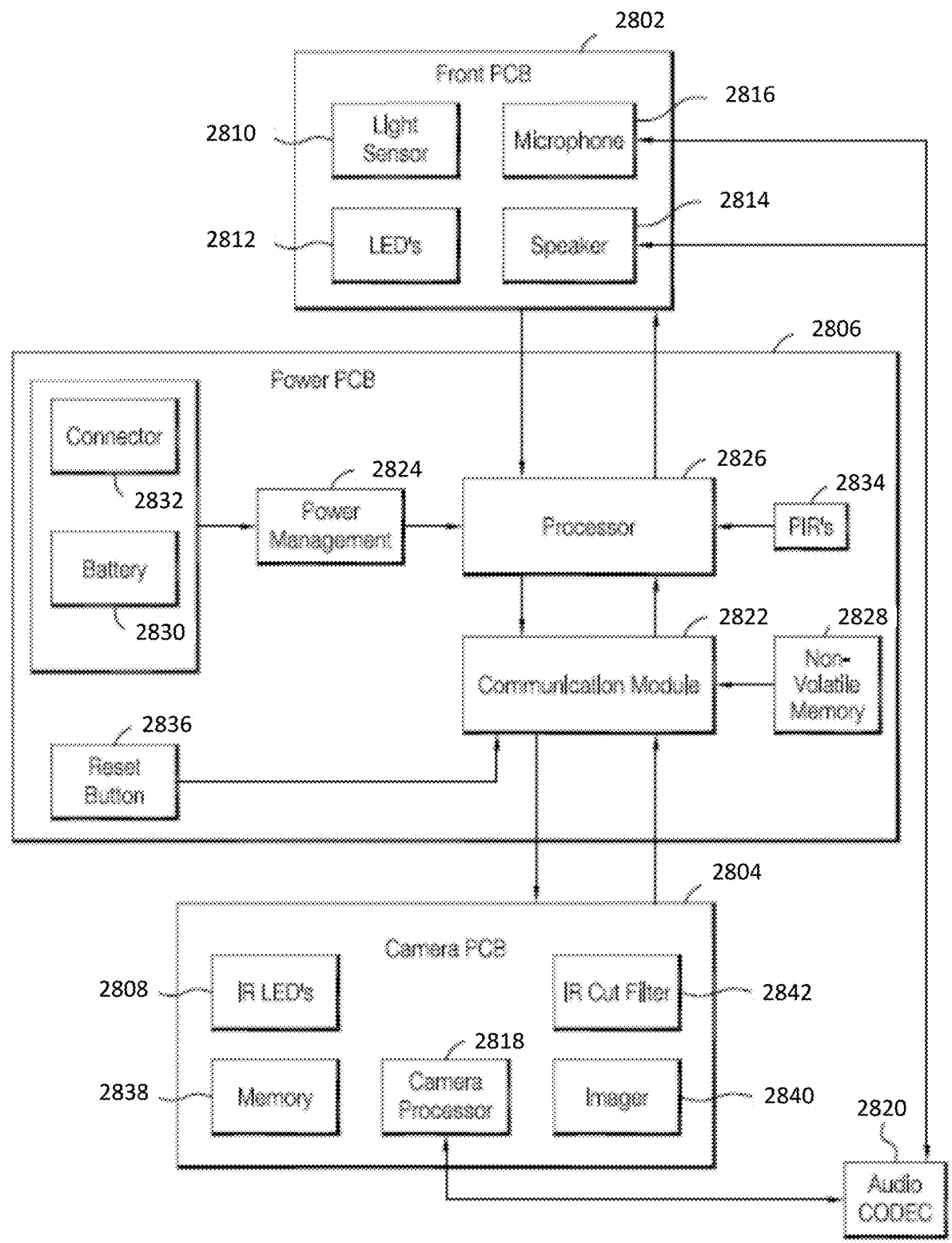
FIG. 28 is a functional block diagram of example components of the A/V recording and communication security camera of FIG. 27.

FIGS. 27 and 28 illustrate an example A/V recording and communication security camera 2702 (also referred to as a "security camera 2702") according to various aspects of the present embodiments. In some embodiments, the A/V recording and communication security camera 2702 may be functionally be similar to, include one or more of the similar components of, the A/V recording and communication device 100, the first A/V recording and communication doorbell 1004, the second A/V recording and communication device 1014, and/or the third A/V recording and communication device 1022.

With reference to FIG. 27, the security camera 2702 includes a faceplate 2704 that is mounted to a back plate 2706 and an enclosure 2708 that engages the faceplate 2704. Collectively, the faceplate 2704, the back plate 2706, and the enclosure 2708 form a housing that contains and protects the inner components of the security camera 2702. However, unlike the video doorbell 130, the security camera 2702 does not include any front button 133 for activating the doorbell. The faceplate 2704 may comprise any suitable material, including, without limitation, metals, such as brushed aluminum or stainless steel, metal alloys, or plastics. The faceplate 2704 protects the internal contents of the security camera 2702 and serves as an exterior front surface of the security camera 2702.

With continued reference to FIG. 27, the enclosure 2708 engages the faceplate 2704 and abuts an upper edge 2710 of the faceplate 2704. Additionally, or alternatively, in some embodiments, one or more gaps between the enclosure 2708 and the faceplate 2704 may facilitate the passage of sound and/or light through the security camera 2702. The enclosure 2708 may comprise any suitable material, but in some embodiments the material of the enclosure 2708 preferably permits infrared light to pass through from inside the security camera 2702 to the environment and vice versa. The security camera 2702 further includes a lens 2712. Again, similar to the video doorbell 130, in some embodiments, the lens may comprise a Fresnel lens, which may be patterned to deflect incoming light into one or more infrared sensors located within the security camera 2702. The security camera 2702 further includes a camera 2714, which captures video data when activated, as described above and below.

With further reference to FIG. 27, the enclosure 2708 may extend from the front of the security camera 2702 around to the back thereof and may fit snugly around a lip (not shown) of the back plate 2706. The back plate 2706 may comprise any suitable material, including, without limitation, metals, such as brushed aluminum or stainless steel, metal alloys, or plastics. The back plate 2706 protects the internal contents of the security camera 2702 and serves as an exterior rear surface of the security camera 2702. The faceplate 2704 may extend from the front of the security camera 2702 and at least partially wrap around the back plate 2706, thereby allowing a coupled connection between the faceplate 2704 and the back plate 2706. The back plate 2706 may have indentations (not shown) in its structure to facilitate the coupling.

With continued reference to FIG. 27, the security camera 2702 further comprises a mounting apparatus 2716. The mounting apparatus 2716 facilitates mounting the security camera 2702 to a surface, such as an interior or exterior wall of a building, such as a home or office. The faceplate 2704 may extend from the bottom of the security camera 2702 up to just below the camera 2714, and connect to the back plate 2706 as described above. The lens 2712 may extend and curl partially around the side of the security camera 2702. The enclosure 2708 may extend and curl around the side and top of the security camera 2702, and may be coupled to the back plate 2706 as described above. The camera 2714 may protrude from the enclosure 2708, thereby giving it a wider field of view. The mounting apparatus 2716 may couple with the back plate 2706, thereby creating an assembly including the security camera 2702 and the mounting apparatus 2716. The couplings described in this paragraph, and elsewhere, may be secured by, for example and without limitation, screws, interference fittings, adhesives, or other fasteners. Interference fittings may refer to a type of connection where a material relies on pressure and/or gravity coupled with the material's physical strength to support a connection to a different element.

FIG. 28 is a functional block diagram of the components of the A/V recording and communication security camera of FIG. 27. With reference to FIG. 28, the interior of the wireless security camera 2702 comprises a plurality of printed circuit boards, including a front PCB 2802, a camera PCB 2804, and a power PCB 2806, each of which is described below. The camera PCB 2804 comprises various components that enable the functionality of the camera 2714 of the security camera 2702, as described below. Infrared light-emitting components, such as infrared LED's 2808, are coupled to the camera PCB 2804 and may be triggered to activate when a light sensor detects a low level of ambient light. When activated, the infrared LED's 2808 may emit infrared light through the enclosure 2708 and/or the camera 2714 out into the ambient environment. The camera 2714, which may be configured to detect infrared light, may then capture the light emitted by the infrared LED's 2808 as it reflects off objects within the camera's 2714 field of view, so that the security camera 2702 may clearly capture images at night (may be referred to as "night vision").

The front PCB 2802 comprises various components that enable the functionality of the audio and light components, including a light sensor 2810, LED's 2812, one or more speakers 2814, and a microphone 2816. The light sensor 2810 may be one or more sensors capable of detecting the level of ambient light of the surrounding environment in which the security camera 2702 may be located. The speakers 2814 may be any electromechanical device capable of producing sound in response to an electrical signal input. The microphone 2816 may be an acoustic-to-electric transducer or sensor capable of converting sound waves into an electrical signal. The front PCB 2802 and all components thereof may be electrically coupled to the power PCB 2806, thereby allowing data and/or power to be transferred to and from the power PCB 2806 and the front PCB 2802.

The speakers 2814 and the microphone 2816 may be coupled to a camera processor 2818 on the camera PCB 2804 through an audio CODEC 2820. For example, the transfer of digital audio from the user's client device 114 and the speakers 2814 and the microphone 2816 may be compressed and decompressed using the audio CODEC 2820, coupled to the camera processor 2818. Once compressed by audio CODEC 2820, digital audio data may be sent through the communication module 2822 to the network, routed by one or more servers, and delivered to the user's client device 1012, 1018, 1026. When the user speaks, after being transferred through the network, digital audio data is decompressed by audio CODEC 2820 and emitted to the visitor via the speakers 2814.

With continued reference to FIG. 28, the power PCB 2806 comprises various components that enable the functionality of the power and device-control components, including a power management module 2824, a processor 2826 a communication module 2822, and power PCB non-volatile memory 2828. In certain embodiments, the power management module 2824 may comprise an integrated circuit capable of arbitrating between multiple voltage rails, thereby selecting the source of power for the security camera 2702. The battery 2830 and/or the connector 2832 may each provide power to the power management module 2824. The power management module 2824 (which may be similar to connector 2832) may have separate power rails dedicated to the battery 2830 and the connector 2832. The power management module 2824 may control charging of the battery 2830 when the connector 2832 is connected to an external source of power, and may also serve as a conduit for data between the connector 2832 and the processor 2826.

With further reference to FIG. 28, in certain embodiments the processor 2826 may comprise an integrated circuit including a processor core, memory, and programmable input/output peripherals. The processor 2826 may receive input signals, such as data and/or power, from the PIR sensors 2834, the power management module 2824, the light sensor 2810, the microphone 2816, and/or the communication module 2822, and may perform various functions as further described below. When the processor 2826 is triggered by the PIR sensors 2834, the processor 2826 may be triggered to perform one or more functions, such as initiating recording of video images via the camera 2714. When the light sensor 2810 detects a low level of ambient light, the light sensor 2810 may trigger the processor 2826 to enable "night vision," as further described below. The processor 2826 may also act as a conduit for data communicated between various components and the communication module 2822.

With further reference to FIG. 28, the security camera 2702 further comprises a communication module 2822 coupled to the power PCB 2806. The communication module 2822 facilitates communication with devices in one or more remote locations, as further described below. The communication module 2822 may comprise an integrated circuit including a processor core, memory, and programmable input/output peripherals. The communication module 2822 may also be configured to transmit data wirelessly to a remote network device, such as the user's client device 1012, 1018, 1026, the remote storage device 1028, and/or the backend server 1032, and may include one or more transceivers (not shown). The wireless communication may comprise one or more wireless networks, such as, without limitation, Wi-Fi, cellular, Bluetooth, and/or satellite networks. The communication module 2822 may receive inputs, such as power and/or data, from the camera PCB 2804, the processor 2826, the reset button 2836 (which may be similar to the reset button 408), and/or the power PCB non-volatile memory 2828. When the reset button 2836 is pressed, the communication module 2822 may be triggered to erase any data stored at the power PCB non-volatile memory 2828 and/or at the camera PCB memory 2838. The communication module 2822 may also act as a conduit for data communicated between various components and the processor 2826. The power PCB non-volatile memory 2828 may comprise flash memory configured to store and/or transmit data. For example, in certain embodiments the power PCB non-volatile memory 2828 may comprise serial peripheral interface (SPI) flash memory.

With continued reference to FIG. 28, the power PCB 2806 further comprises the connector 2832 described above and a battery 2830. The connector 2832 may protrude outward from the power PCB 2806 and extend through a hole in the back plate 2706. The battery 2830, which may be a rechargeable battery, may provide power to the components of the security camera 2702.

With continued reference to FIG. 28, the power PCB 2806 further comprises passive infrared (PIR) sensors 2834, which may be secured on or within a PIR sensor holder (not shown) that resides behind the lens 2712 (FIG. 27). The PIR sensors 2834 may be any type of sensor capable of detecting and communicating the presence of a heat source within their field of view. Further, alternative embodiments may comprise one or more motion sensors either in place of or in addition to the PIR sensors 2834. The motion sensors may be configured to detect motion using any methodology, such as a methodology that does not rely on detecting the presence of a heat source within a field of view.

With further reference to FIG. 28, the camera PCB 2804 may comprise components that facilitate the operation of the camera 2714. For example, an imager 2840 may comprise a video recording sensor and/or a camera chip. In one aspect of the present disclosure, the imager 2840 may comprise a complementary metal-oxide semiconductor (CMOS) array, and may be capable of recording high definition (e.g., 720p or better) video files. A camera processor 2818 may comprise an encoding and compression chip. In some embodiments, the camera processor 2818 may comprise a bridge processor. The camera processor 2818 may process video recorded by the imager 2840 and audio recorded by the microphone 2816, and may transform this data into a form suitable for wireless transfer by the communication module 2822 to a network. The camera PCB memory 2838 may comprise volatile memory that may be used when data is being buffered or encoded by the camera processor 2818. For example, in certain embodiments the camera PCB memory 2838 may comprise synchronous dynamic random access memory (SD RAM). IR LED's 2808 may comprise light-emitting diodes capable of radiating infrared light. IR cut filter 2842 may comprise a system that, when triggered, configures the imager 2840 to see primarily infrared light as opposed to visible light. When the light sensor 2810 detects a low level of ambient light (which may comprise a level that impedes the performance of the imager 2840 in the visible spectrum), the IR LED's 2808 may shine infrared light through the security camera 2702 enclosure out to the environment, and the IR cut filter 2842 may enable the imager 2840 to see this infrared light as it is reflected or refracted off of objects within the field of view of the doorbell. This process may provide the security camera 2702 with the "night vision" function mentioned above.

Each of the processes described herein, including the processes 2900, 3000, 3100, 3200, 3300, 3400, 3500, and 3600, are illustrated as a collection of blocks in a logical flow graph, which represent a sequence of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks may be combined in any order and/or in parallel to implement the processes. Additionally, any number of the described blocks may be optional and eliminated to implement the processes.

Figure 29:
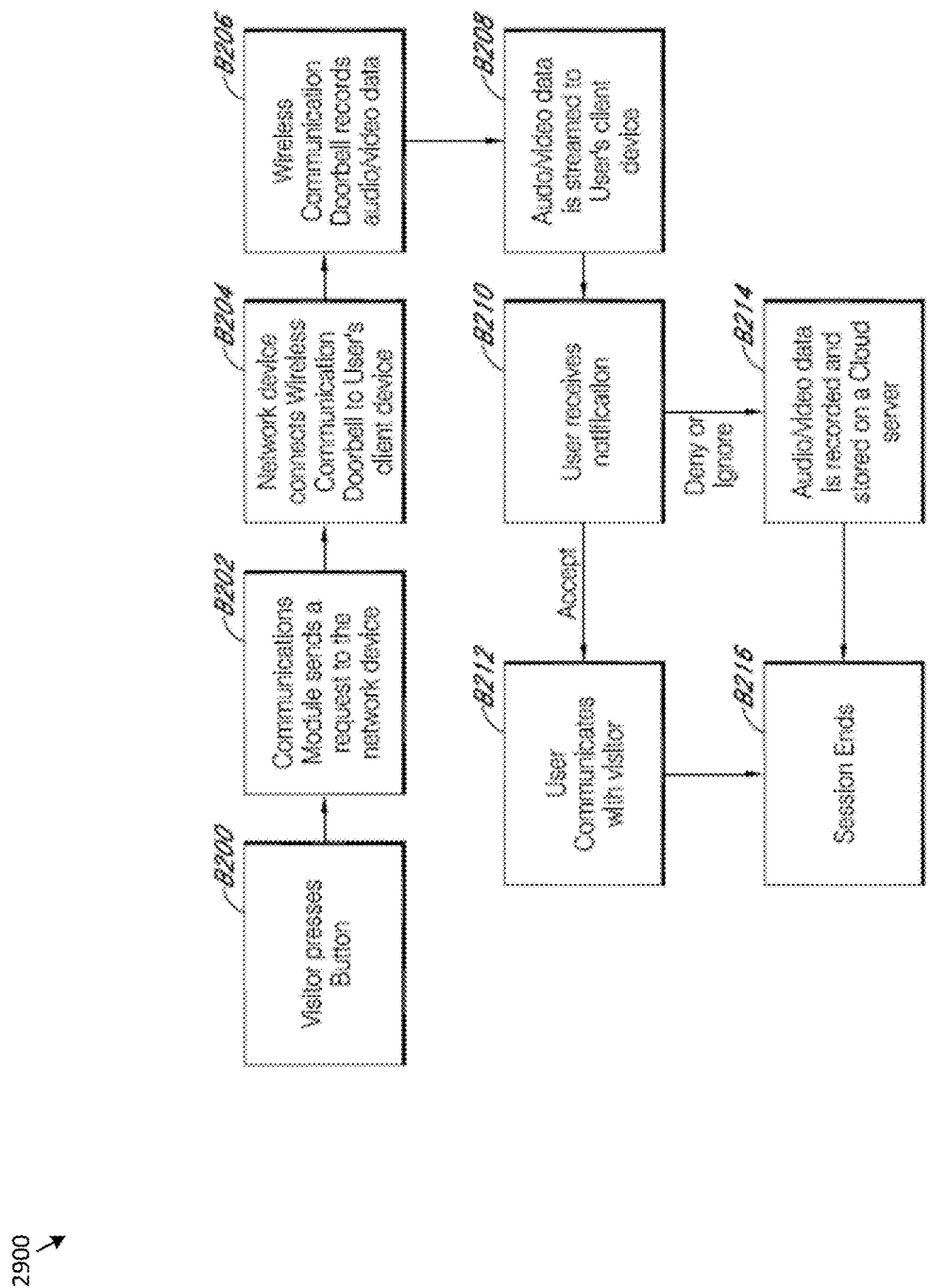
FIG. 29 is a flowchart illustrating a process for an A/V recording and communication doorbell according to an aspect of the present disclosure.

FIG. 29 is a flowchart illustrating one embodiment of a process 2900 according to an aspect of the present disclosure. At block B200, a visitor presses the button 133 on the doorbell 130. At block B202, the communication module 164 sends a request to a network device. Once the network device receives the request, at block B204 the network device may connect the doorbell 130 to the user's client device 114 through the user's network 110 and the network 112. In block B206, the doorbell 130 may record available audio and/or video data using the camera 134, the microphone 158, and/or any other sensor available. At block B208, the audio and/or video data is transmitted to the user's client device 114. At block B210, the user may receive a notification on his or her client device 114 prompting him or her to either accept or deny. If the user denies the notification, then the process advances to block B214, where the audio and/or video data is recorded and stored at a cloud server 118. The session then ends at block B216 and the connection between the doorbell 130 and the user's client device 114 is terminated. If, however, the user elects to accept the notification, then at block B212 the user communicates with the visitor through the user's client device 114 while being provided audio and/or video data captured by the camera 134, the microphone 158, and/or other sensors. At the end of the call, the user may terminate the connection between the user's client device 114 and the doorbell 130 and the session ends at block B216. In some embodiments, the audio and/or video data may be recorded and stored at a cloud server 118 (block B214) even if the user accepts the notification and communicates with the visitor through the user's client device 114.

Figure 30:
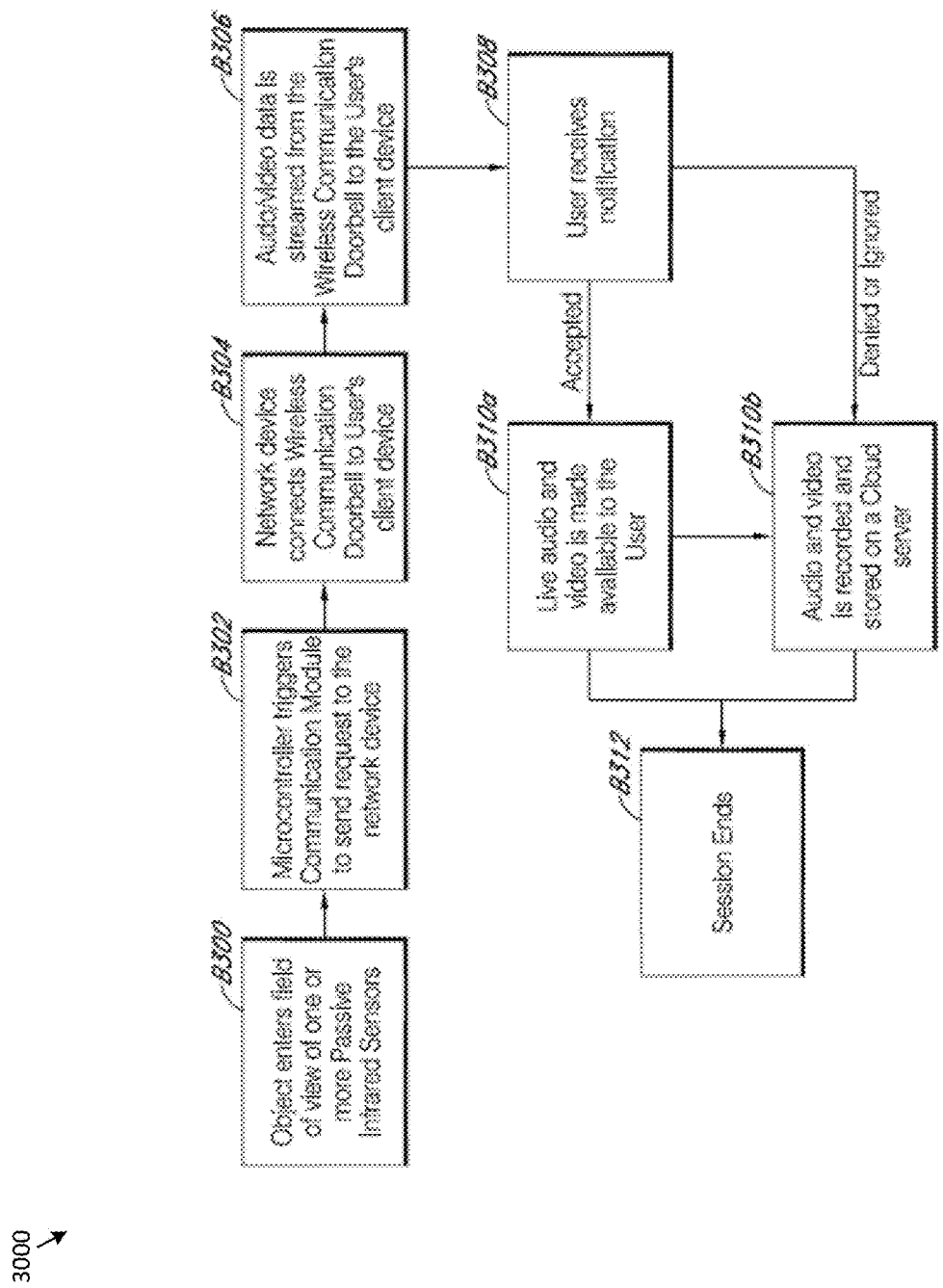
FIG. 30 is a flowchart illustrating another process for an A/V recording and communication doorbell according to an aspect of the present disclosure.

FIG. 30 is a flowchart illustrating another embodiment of a process 3000 according to an aspect of the present disclosure. At block B300, an object may move into the field of view of one or more of the PIR sensors 144. At block B302, the PIR sensors 144 may trigger the microcontroller 163, which may then trigger the communication module 164 to send a request to a network device. At block B304, the network device may connect the doorbell 130 to the user's client device 114 through the user's network 110 and the network 112. At block B306, the doorbell 130 may record available audio and/or video data using the camera 134, the microphone 158, and/or any other available sensor, and stream the data to the user's client device 114. At block B308, the user may receive a notification prompting the user to either accept or deny the notification. If the notification is accepted, then at block B310a the live audio/video data may be displayed on the user's client device 114, thereby allowing the user surveillance from the perspective of the doorbell 130. When the user is satisfied with this function, the user may sever the connection at block B312, whereby the session ends. If, however, at block B308 the user denies the notification, or ignores the notification and a specified time interval elapses, then the connection between the doorbell 130 and the user's client device 114 is terminated and the audio/video data is recorded and stored at a cloud server 118 at block B310b, such that the user may view the audio/video data later at their convenience. The doorbell 130 may be configured to record for a specified period of time in the event the notification in block B308 is denied or ignored. If such a time period is set, the doorbell 130 may record data for that period of time before ceasing operation at block B312 thereby ending the session. In some embodiments, the audio and/or video data may be recorded and stored at a cloud server 118 (block B310b) even if the user accepts the notification and communicates with the visitor through the user's client device 114.

Figure 31:
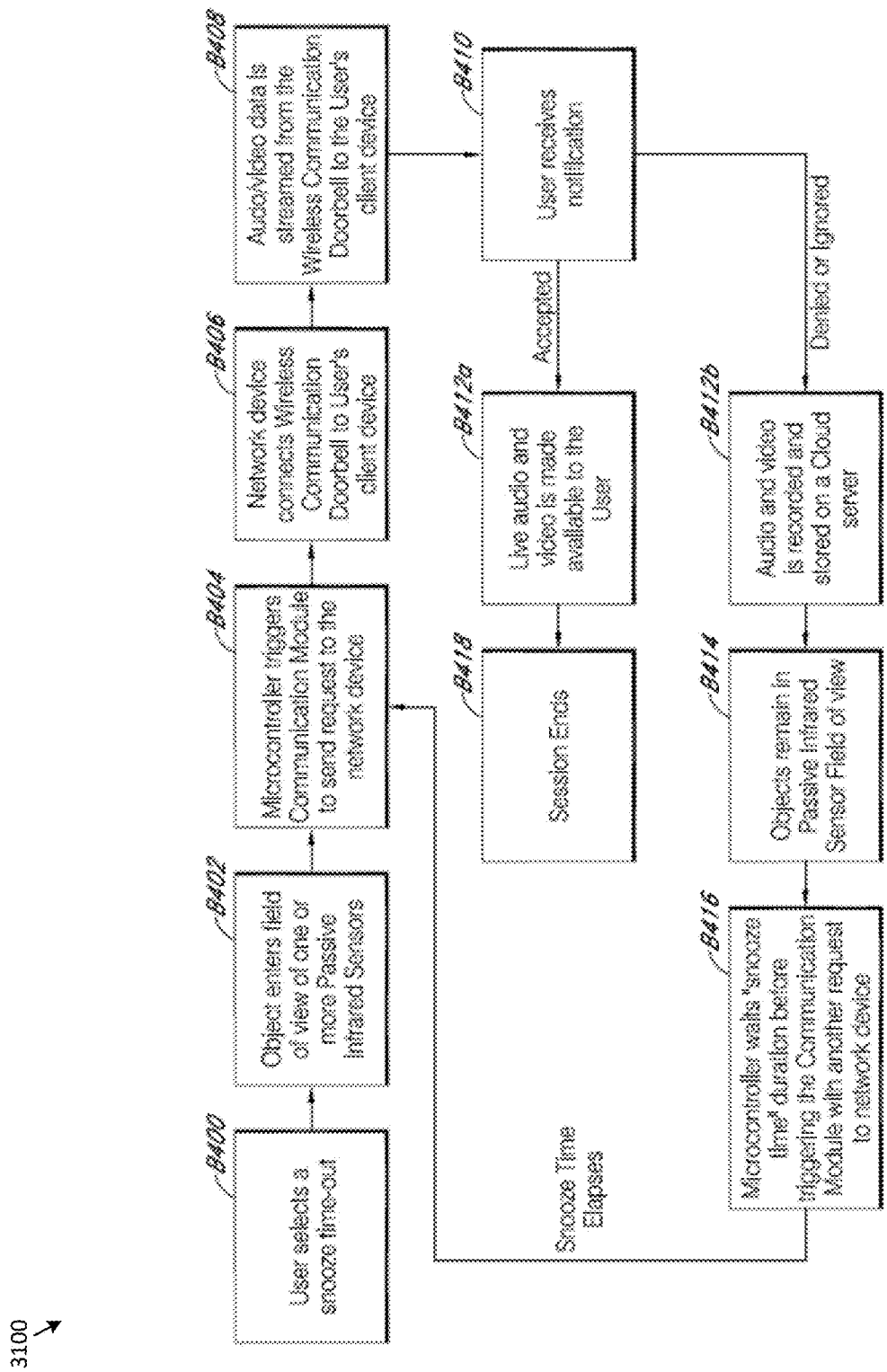
FIG. 31 is a flowchart illustrating another process for an A/V recording and communication doorbell according to an aspect of the present disclosure.

FIG. 31 is a flowchart illustrating another embodiment of a process 3100 according to an aspect of the present disclosure. At block B400, the user may select a "snooze time-out," which is a time period during which the doorbell 130 may deactivate or otherwise not respond to stimuli (such as light, sound, or heat signatures) after an operation is performed, e.g. a notification is either accepted or denied/ignored. For example, the user may set a snooze time-out of 15 minutes. At block B402, an object moves into the field of view of one or more of the PIR sensors 144. At block B404, the microcontroller 163 may trigger the communication module 164 to send a request to a network device. In block B406, the network device may connect the doorbell 130 to the user's client device 114 through the user's network 110 and the network 112. At block B408, audio/video data captured by the doorbell 130 may be streamed to the user's client device 114. At block B410, the user may receive a notification prompting the user to either accept or deny/ignore the request. If the request is denied or ignored, then at block B412b audio/video data may be recorded and stored at a cloud server 118. After the doorbell 130 finishes recording, the objects may remain in the PIR sensor 144 field of view at block B414. In block B416, the microcontroller 163 waits for the "snooze time" to elapse, e.g. 15 minutes, before triggering the communication module 164 to submit another request to the network device. After the snooze time, e.g. 15 minutes, elapses, the process moves back to block B404 and progresses as described above. The cycle may continue like this until the user accepts the notification request at block B410. The process then moves to block B412a, where live audio and/or video data is displayed on the user's client device 114, thereby allowing the user surveillance from the perspective of the doorbell 130. At the user's request, the connection may be severed and the session ends at block B418. At this point the user may elect for the process to revert back to block B416, whereby there may be no further response until the snooze time, e.g. 15 minutes, has elapsed from the end of the previous session, or the user may elect for the process to return to block B402 and receive a notification the next time an object is perceived by one or more of the PIR sensors 144.

In some embodiments, the audio and/or video data may be recorded and stored at a cloud server 118 (block B412*b*) even if the user accepts the notification and communicates with the visitor through the user's client device 114.

Although the processes 2900, 3000, and 3100 are described above with reference to the doorbell 130, in some embodiments, the processes 2900, 3000, and 3100 may be performed by other A/V recording and communication devices, such as the A/V recording and communication device 100, the A/V recording and communication device 1004, the A/V recording and communication device 1014, and/or the A/V recording and communication device 1022.

Figure 32:
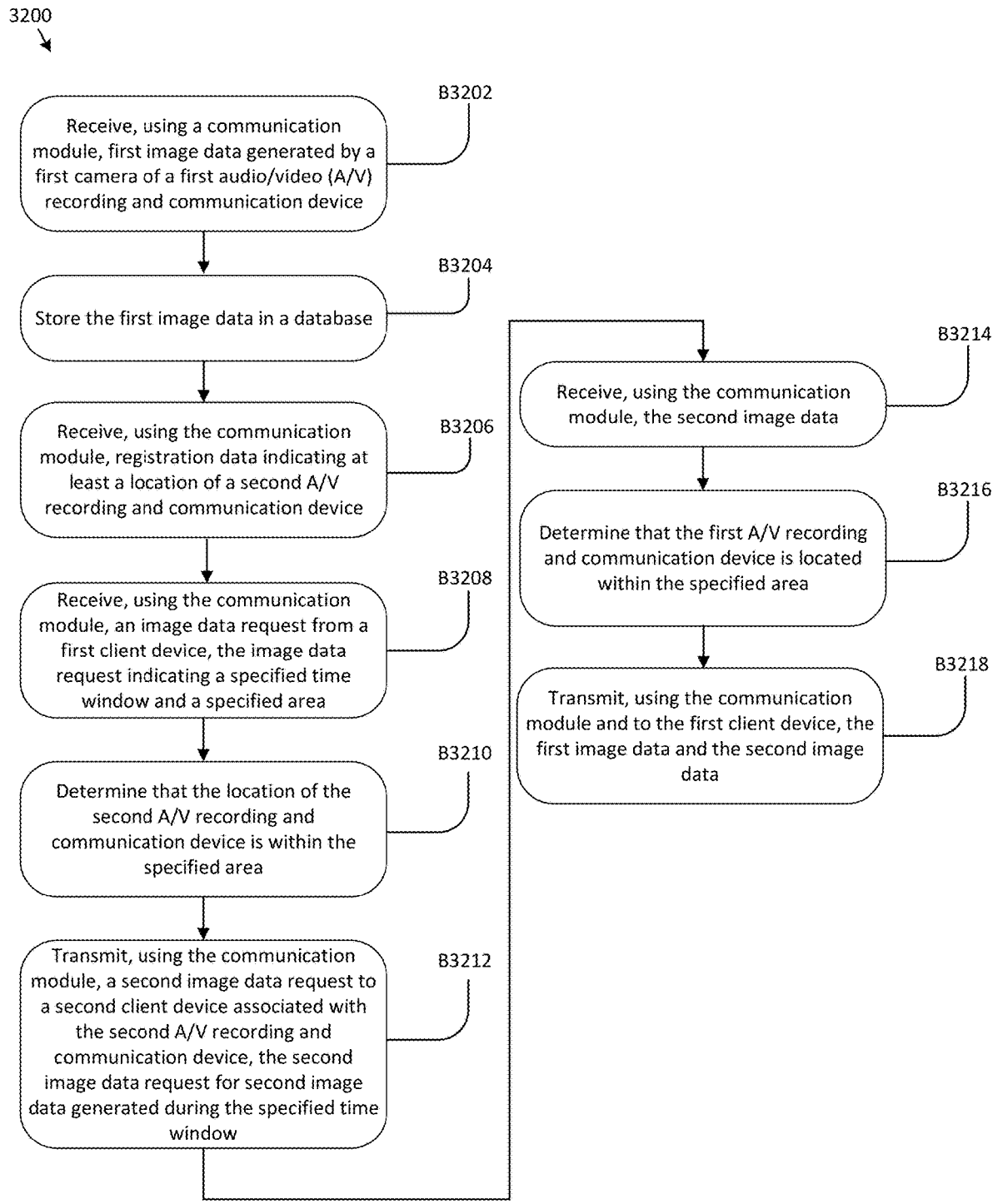
FIGS. 32-36 are flowcharts illustrating processes for sharing video footage using A/V recording and communication devices, according to various aspects of the present disclosure.

FIG. 32 is a flowchart illustrating a process 3200 for sharing video footage from A/V recording and communication devices according to various aspects of the present disclosure. The process 3200, at block B3202, receives, using a communication module, first image data generated by a first camera of a first A/V recording and communication device. For example, the processor 1306 of the backend server 1032 may receive, using the communication module 1302, the image data 1124 recorded by the camera 1104 of the first A/V recording and communication device 1004. In some embodiments, the backend server 1032 may receive the image data 1124 in response to the first A/V recording and communication device 1004 detecting motion in a field of view of the first A/V recording and communication device 1004. In some embodiments, the first A/V recording and communication device 1004 may include an authorized A/V recording and communication device.

The process 3200, at block B3204, stores the first image data in a database. For example, the processor 1306 of the backend server 1032 may store the image data 1124 in the storage databases 1028. In some examples, the processor 1306 of the backend server 1032 stores the image data 1124 in the first storage databases 1028(1) based on the first A/V recording and communication device 1004 being the authorized A/V recording and communication device 1004.

The process 3200, at block B3206, receives, using the communication module, registration data indicating at least a location of a second A/V recording and communication device. For example, the processor 1306 of the backend server 1032 may receive, using the communication module 1302, the registration data 1238 from at least one of the third A/V recording and communication device 1022 (which corresponds to the second A/V recording and communication device in the example process 3200) and the third client device 1026. The registration data 1238 may indicate the location of the third A/V recording and communication device 1022. In some examples, the third A/V recording and communication device 1022 may include a third-party, unauthorized A/V recording and communication device 1022. In such examples, the third A/V recording and communication device 1022 may not transmit image data 1224 to the backend server 1032 until the backend server 1032 transmits a data request 1318 for the image data 1224.

In some embodiments, the processor 1306 of the backend server 1032 may register the third A/V recording and communication device 1022 using the registration data 1238. For example, the processor 1306 of the backend server 1032 may generate a profile associated with the third A/V recording and communication device 1022. The profile may indicate the location of the third A/V recording and communication device 1022, contact information associated with the user of the third client device 1026 (e.g., phone number, email address, etc.), and/or the like. In some embodiments, the processor 1306 of the backend server 1032 further stores the registration data 1238 and/or the profile in the storage databases 1028, such as the third storage databases 1028(3).

The process 3200, at block B3208, receives, using the communication module, an image data request from a first client device, the image data request indicating a specified time window and a specified area. For example, the processor 1306 of the backend server 1032 may receive, using the communication module 1302, a first data request 1318 from the fourth client device 1038 (which may correspond to the first client device in the example process 3200), which may be associated with a law enforcement agency. The first data request 1318 may include a request for image data that is generated by A/V recording and communication devices that are within a specified area, such as the area 308 from FIG. 3. The first data request 1318 may further indicate the specified time window, which may include specified a range of dates and/or times for which the image data is requested.

The process 3200, at block B3210, determines that the location of the second A/V recording and communication device is within the specified area. For example, the processor 1306 of the backend server 1032 may analyze the registration data 1238 and/or the profile associated with the third A/V recording and communication device 1022 to determine that the location of the third A/V recording and communication device 1022 is within the specified area. Additionally, the processor 1306 of the backend server 1032 may determine that the third A/V recording and communication device 1022 is a third-party, unauthorized A/V recording and communication device. Based on the determination, the processor 1306 of the backend server 1032 may determine that a second data request 1318 needs to be sent to the third client device 1026 in order to receive the image data 1224 generated by the third A/V recording and communication device 1022.

The process 3200, at block B3212, transmits, using the communication module, a second image data request to a second client device associated with the second A/V recording and communication device, the second image data request for second image data generated during the specified time window. For example, the processor 1306 of the backend server 1032 may transmit, using the communication module 1302, the second data request 1318 to the third client device 1026 (which may correspond to the second client device in the example process 3200). The second data request 1318 may include a request for the image data 1224 generated by the third A/V recording and communication device 1022 as well as the specified time window. In some examples, a user of the third client device 1026 may receive the second data request 1318 and then use the third client device 1026 to retrieve a portion of the image data 1224 that corresponds to the specified time window (e.g., was generated by the third A/V recording and communication device 1022 during the specified time window).

In some embodiments, the device application 1518 of the third client device 1026 may retrieve a listing (or other visual display, such as in icon form) of the available image data 1224 from the third client device 1026 and present the listing to the user through the device application 1518 (e.g., as an ordered list, sorted chronologically). In such embodiments, the device application 1518 may be synced with and/or have access to a third-party device application on the third client device 1026 associated with the third A/V recording and communication device 1022. For example, the third-party device application may be the device application that the user of the third client device 1026 uses to access and/or control the third A/V recording and communication device 1022 (e.g., the third-party A/V recording and communication device 1022). As such, the device application 1518 may be provided by the manufacturer, seller, and/or provider of the first A/V recording and communication device 1104 and the third-party device application may be provided by the manufacturer, seller, and/or provider of the third-party A/V recording and communication device 1022. As such, when the user of the third client device 1026 receives the second data request 1318, and based on the syncing/access to the third-party device application by the device application 1518, the user may be presented with the image data 1224 generated by the third A/V recording and communication device 1022 in the device application 1518. In some embodiments, the image data 1224 may be ordered based on time (e.g., chronologically) and/or may be ordered based on utility (e.g., image data 1224 including the person and/or object of interest provided in the identification data by law enforcement may be prioritized). In some embodiments, only the image data 1224 that was recorded by the third A/V recording and communication device 1022 during the specified time window from the second data request 1318 may be retrieved and/or listed in the device application 1518. In any embodiments, the user of the third client device 1026 may be able to select the image data 1224 that the user desires to share.

The process 3200, at block B3214, receives, using the communication module, the second image data. For example, in response to transmitting the second data request 1318, the processor 1306 of the backend server 1032 may receive, using the communication module 1302, the second image data 1224 from at least one of the third client device 1026 and the third A/V recording and communication device 1022. In some examples, the received image data 1224 corresponds to a portion of the image data 1224 that is generated by the third A/V recording and communication device 1022 during the specified time window. In some examples, the processor 1306 of the backend server 1032 may store the image data 1224 in the storage databases 1028.

The process 3200, at block B3216, determines that the first A/V recording and communication device is located within the specified area. For example, the processor 1306 of the backend server 1032 may determine that the first A/V recording and communication device 1004 is located within the specified area. In some examples, the processor 1306 of the backend server 1032 may make the determination using location data 1138 that the backend server 1032 receives from the first A/V recording and communication device 1004 and/or the first client device 1012. For instance, the location data 1138 may indicate the location of the first A/V recording and communication device 1004.

The process 3200, at block B3218, transmits, using the communication module and to the first client device, the first image data and the second image data. For example, the processor 1306 of the backend server 1032 may transmit, using the communication module 1302, the image data 1124 (stored in the storage databases 1028) and the image data 1224 (received from the third client device 1026 and/or the third A/V recording and communication device 1022) to the fourth client device 1038.

Figure 33:
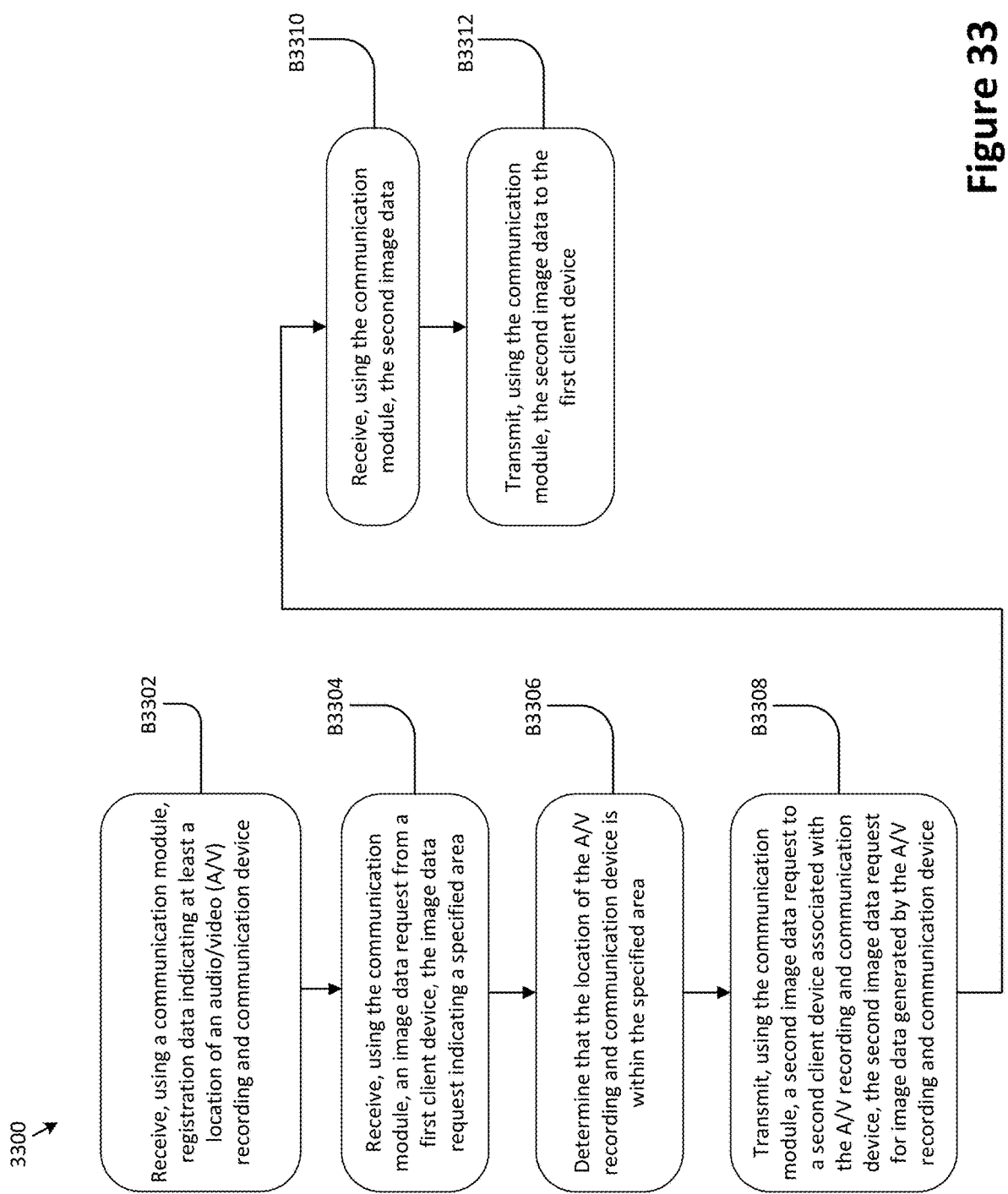

FIG. 33 is a flowchart illustrating a process 3300 for sharing video footage from A/V recording and communication devices according to various aspects of the present disclosure. In some examples, the process 3300 may correspond to the situation where the backend server 1032 only retrieves and/or transmits image data from a third-party, unauthorized A/V recording and communication device 1022 (e.g., an A/V recording and communication device not owned, operated, and/or associated with the same entity that manages the backend server 1032 and/or the cloud storage). The process 3300, at block B3302, receives, using a communication module, registration data indicating at least a location of an A/V recording and communication device. For example, the processor 1306 of the backend server 1032 may receive, using the communication module 1302, the registration data 1238 from at least one of the third A/V recording and communication device 1022 (which may correspond to the A/V recording and communication device described herein with reference to the process 3300) and the third client device 1026. The registration data 1238 may indicate the location of the third A/V recording and communication device 1022. In some examples, the third A/V recording and communication device 1022 may include a third-party, unauthorized A/V recording and communication device 1022. In such examples, the third A/V recording and communication device 1022 may not transmit image data 1224 to the backend server 1032 until the backend server 1032 transmits a request for the image data 1224.

The process 3300, at block B3304, receives, using the communication module, an image data request from a first client device, the image data request indicating a specified area. For example, the processor 1306 of the backend server 1032 may receive, using the communication module 1302, a first data request 1318 from the fourth client device 1038 (which may correspond to the first client device described herein with reference to the process 3300), which may be associated with a law enforcement agency (and/or other public safety agency, such as the fire department, emergency medical personnel, etc.). The first data request 1318 may include a request for image data that is generated by A/V recording and communication devices that are within a specified area, such as the area 308 from FIG. 3. In some examples, the first data request 1318 may further indicate a specified time window for receiving the image data, which may include a specified range of dates and/or times for which the image data is requested.

The process 3300, at block B3306, determines that the location of the A/V recording and communication device is within the specified area. For example, the processor 1306 of the backend server 1032 may analyze the registration data 1238 and/or a profile associated with the third A/V recording and communication device 1022 to determine that the location of the third A/V recording and communication device 1022 is within the specified area. Additionally, the processor 1306 of the backend server 1032 may determine that the third A/V recording and communication device 1022 is a third-party, unauthorized A/V recording and communication device.

The process 3300, at block B3308, transmits, using the communication module, a second image data request to a second client device associated with the A/V recording and communication device, the second image data request for image data generated by the A/V recording and communication device. For example, the processor 1306 of the backend server 1032 may transmit, using the communication module 1302, the second data request 1318 to the third client device 1026 (which may correspond to the second client device described herein with reference to the process 3300). The second data request 1318 may include a request for the image data 1224 generated by the third A/V recording and communication device 1022. In some examples, the second data request 1318 may further indicate the specified time window.

The process 3300, at block B3310, receives, using the communication module, the second image data. For example, in response to transmitting the second data request

1318, the processor 1306 of the backend server 1032 may receive, using the communication module 1302, the image data 1224 from at least one of the third client device 1026 and the third A/V recording and communication device 1022. In some examples, the received image data 1224 may correspond to a portion of the image data 1224 that is generated by the third A/V recording and communication device 1022 during the specified time window. In some examples, the processor 1306 of the backend server 1032 may store the image data 1224 in the storage databases 1028.

The process 3300, at block B3312, transmits, using the communication module, the first image data to the first client device. For example, the processor 1306 of the backend server 1032 may transmit, using the communication module 1302, the image data 1224 to the fourth client device 1038.

Figure 34:
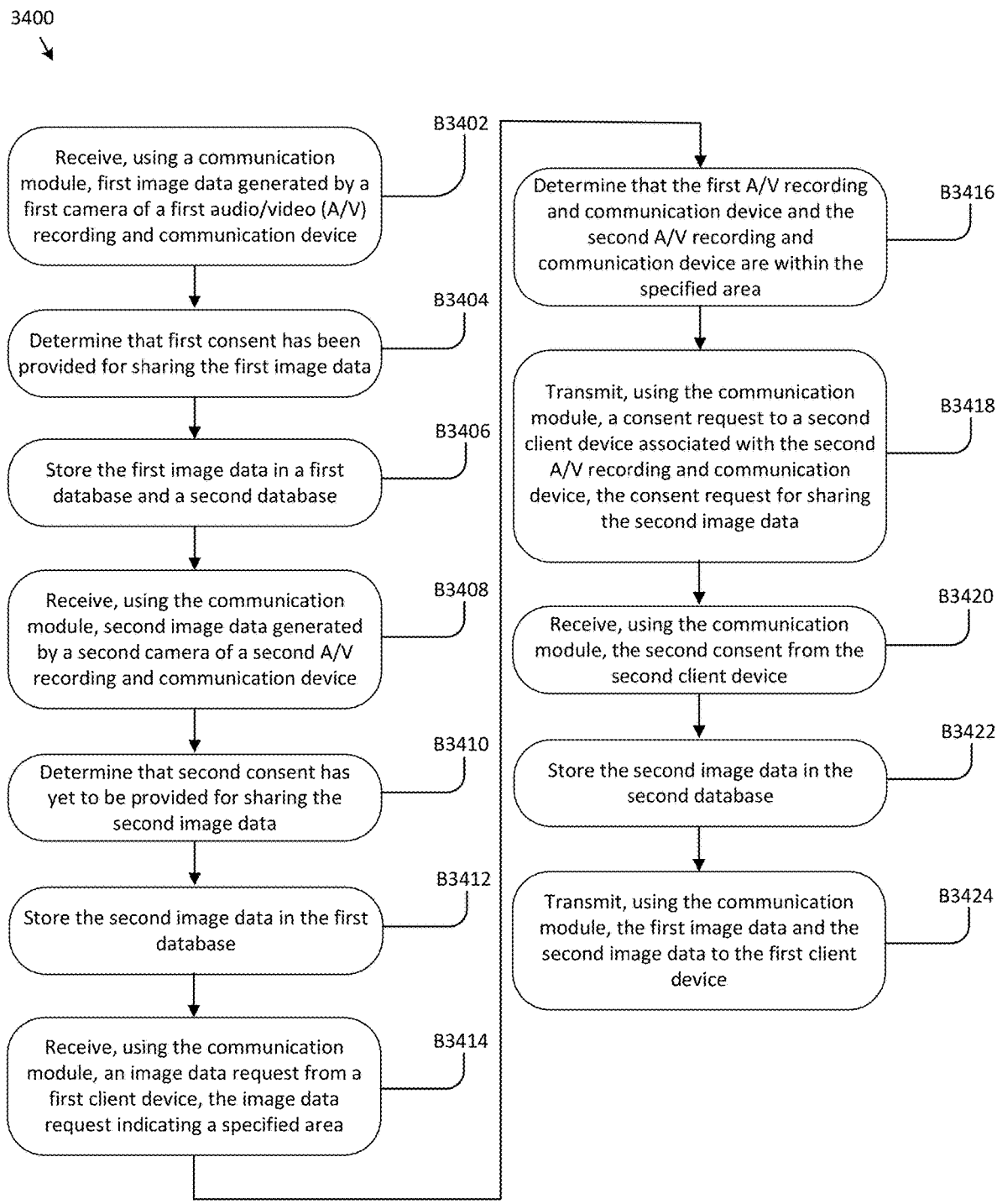

FIG. 34 is a flowchart illustrating a process 3400 for sharing video footage from A/V recording and communication devices according to various aspects of the present disclosure. The process 3400, at block B3402, receives, using a communication module, first image data generated by a first camera of a first A/V recording and communication device. For example, the processor 1306 of the backend server 1032 may receive, using the communication module 1302, the first image data 1124 recorded by the camera 1104 of the first A/V recording and communication device 1004. In some embodiments, the backend server 1032 may receive the first image data 1124 in response to the first A/V recording and communication device 1004 detecting motion in a field of view of the first A/V recording and communication device 1004. In some embodiments, the first A/V recording and communication device 1004 may include an authorized A/V recording and communication device.

The process 3400, at block B3404, determines that first consent has been provided for sharing the first image data. For example, the processor 1306 of the backend server 1032 may determine that a user associated with the first A/V recording and communication device 1004 has provided consent (which may be represented as a consent data 1322) to share the first image data 1124, such as with one or more law enforcement agencies (and/or other public safety agencies). In some examples, the processor 1306 of the backend server 1032 may receive the first consent from the first client device 1012 before the receiving of the first image data 1124. In some examples, the processor 1306 of the backend server 1032 may receive the first consent from the first client device 1012 after the receiving of the first image data 1124.

The process 3400, at block B3406, stores the first image data in a first database and a second database. For example, the processor 1306 of the backend server 1032 may store the first image data 1124 in the first storage databases 1028(1). The processor 1306 of the backend server 1032 may store all image data that is received from authorized A/V recording and communication devices in the first storage databases 1028(1). Additionally, based on the determination that the first consent has been provided, the processor 1306 of the backend server 1032 may store the first image data 1124 in the second storage databases 1028(2) (e.g., which may be owned by, accessible by, and/or controlled by a public safety agency). In any embodiment, the processor 1306 of the backend server 1032 may store image data (from authorized and/or unauthorized A/V recording and communication devices) in which consent to share has been provided (e.g., such as with law enforcement) in the second storage databases 1028(2).

The process 3400, at block B3408, receives, using a communication module, second image data generated by a second camera of a second A/V recording and communication device. For example, the processor 1306 of the backend server 1032 may receive, using the communication module 1302, the second image data (which, as discussed above, may also be represented by image data 1124) recorded by the camera of the second A/V recording and communication device 1014. In some embodiments, the backend server 1032 may receive the second image data in response to the second A/V recording and communication device 1014 detecting motion in a field of view of the second A/V recording and communication device 1014. In some embodiments, the second A/V recording and communication device 1014 may include an authorized A/V recording and communication device.

The process 3400, at block B3410, determines that second consent has yet to be provided for sharing the second image data. For example, the processor 1306 of the backend server 1032 may determine that a user associated with the second A/V recording and communication device 1014 has yet to provide content to share the second image data, such as with one or more law enforcement agencies (and/or other public safety agencies).

The process 3400, at block B3412, stores the second image data in the first database. For example, the processor 1306 of the backend server 1032 may store the second image data in the first storage databases 1028(1). As discussed above, the processor 1306 of the backend server 1032 may store all image data that is received from authorized A/V recording and communication devices in the first storage databases 1028(1). However, based on the determination that the second consent has yet to be provided, the processor 1306 of the backend server 1032 may refrain from storing the second image data in the second storage databases 1028(2). As discussed above, the processor 1306 of the backend server 1032 may store image data in which consent has been provided for sharing (e.g., such as with one or more law enforcement agencies) in the second storage databases 1028(2).

In some embodiments, all image data may be stored in the same storage database(s) (e.g., the backend server 1032 and/or the second storage databases 1028(2)) whether or not consent has been provided. However, the image data that is associated with a consent being provided may be tagged as such (e.g., tagged as "shareable", "consent provided", "authorized", etc.). As such, when a data request is received by the backend server 1032 (or other storage device/database), the database may be filtered to only include the tagged image data associated with consent being provided.

The process 3400, at block B3414, receives, using the communication module, a first image data request from a first client device, the first image data request indicating a specified area. For example, the processor 1306 of the backend server 1032 may receive, using the communication module 1302, a first data request 1318 from the fourth client device 1038 (which may correspond to the first client device described herein with respect to the process 3400), which may be associated with a law enforcement agency (or other public safety agency). For example, a member of the law enforcement community may be tasked with acquiring potential evidence of a crime, and as a result, may access the fourth client device 1038 to request the image data generated by the A/V recording and communication devices within the specified area and/or within the specified time window. As such, the first data request 1318 may include a request for image data that is generated by A/V recording and communication devices that are within the specified area, such as the area 308 from FIG. 3, and/or may further indicate the specified time window associated with the image data, which may include specified a range of dates and/or times for which the image data is requested.

The process 3400, at block B3416, determines that the first A/V recording and communication device and the second A/V recording and communication device are located within the specified area. For example, the processor 1306 of the backend server 1032 may determine that the first A/V recording and communication device 1004 and the second A/V recording and communication device 1014 are located within the specified area. In some examples, the processor 1306 of the backend server 1032 makes the determination using first location data 1138 that the processor 1306 of the backend server 1032 receives from the first A/V recording and communication device 1004 and/or the first client device 1012 and second location data 1138 that the processor 1306 of the backend server 1032 receives from the second A/V recording and communication device 1014 and/or the second client device 1018. For instance, the first location data 1138 may indicate the location of the first A/V recording and communication device 1004 and the second location data 1138 may indicate the location of the second A/V recording and communication device 1014.

The process 3400, at block B3418, transmits, using the communication module, a consent request to a second client device associated with the second A/V recording and communication device, the consent request for sharing the second image data. For example, based on determining that the second A/V recording and communication device 1014 is located within the specified area, and based on determining that the second consent has yet to be provided, the processor 1306 of the backend server 1032 may transmit, using the communication module 1302, a consent request 1320 to the second client device 1018. The consent request 1320 may indicate that the backend server 1032 wants to share the second image data with the fourth client device 1038.

The process 3400, at block B3420, receives, using the communication module, the second consent from the second client device. For example, the processor 1306 of the backend server 1032 may receive, using the communication module 1302, the second consent (which may be represented by a consent data 1322) from the second client device 1018.

The process 3400, at block B3422, stores the second image data in the second database. For example, based on receiving the second consent, the processor 1306 of the backend server 1032 may store the second image data in the second databases 1028(2). As described herein, in some embodiments, the processor 1306 of the backend server 1032 may store image data in which consent has been provided for sharing (e.g., such as with one or more law enforcement agencies) in the second storage databases 1028(2).

The process 3400, at block B3424, transmits, using the communication module, the first image data and the second image data to the first client device. For example, the processor 1306 of the backend server 1032 may transmit, using the communication module 1302, the first image data 1124 and the second image data to the fourth client device 1038.

Figure 35:
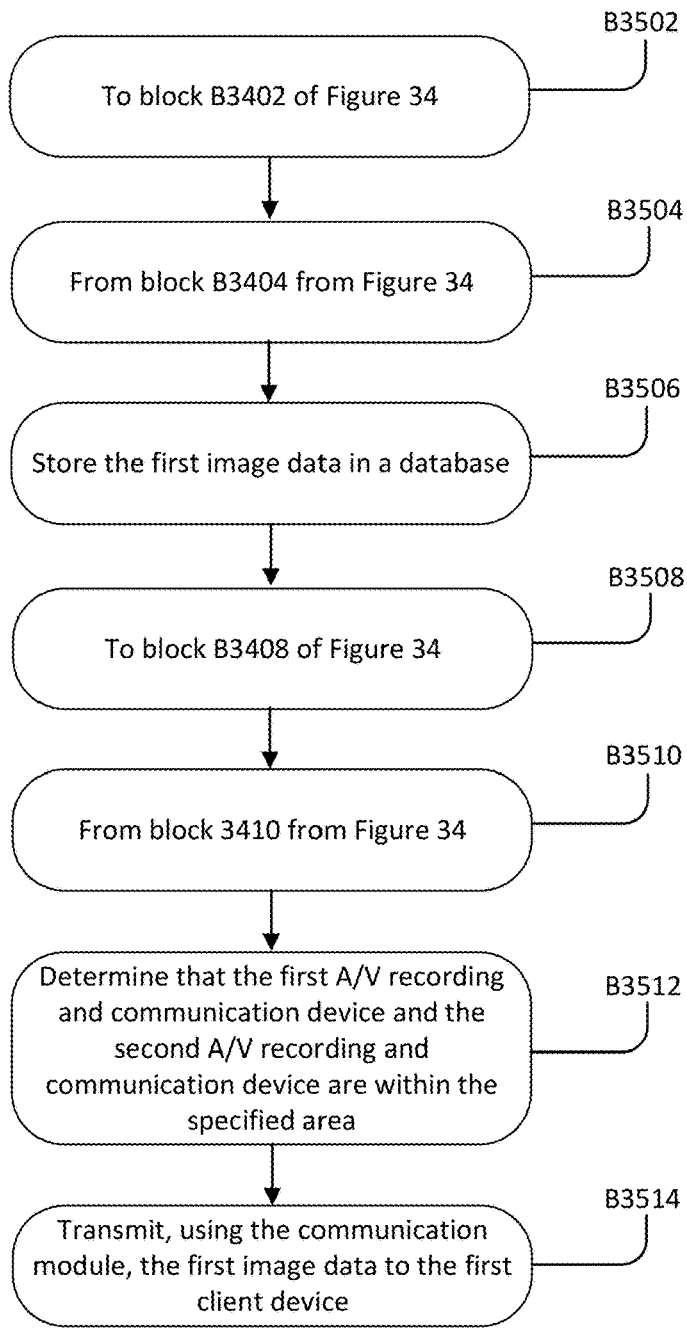

FIG. 35 is a flowchart illustrating a process 3500 for sharing video footage from A/V recording and communication devices according to various aspects of the present disclosure. The process 3500, at block B3502, proceeds to block B3402 of FIG. 34.

The process 3500, at block B3504, proceeds from block B3404 from FIG. 34.

The process 3500, at block B3506, stores the first image data in a database. For example, the processor 1306 of the backend server 1032 may store the first image data the storage databases 1028. Additionally, in some examples, and based on the determination that the first consent has been provided, the processor 1306 of the backend server 1032 may store, in association with the first image data 1124, and in the storage databases 1028, data (e.g., tags) that indicates that the first consent has been provided to share the first image data 1124 with third-party requesters, such as one or more law enforcement agencies.

The process 3500, at block B3508, proceeds to block B3408 of FIG. 34.

The process 3500, at block B3510, proceeds from block B3410 from FIG. 34.

The process 3500, at block B3512, determines that the first A/V recording and communication device and the second A/V recording and communication device are located within the specified area. For example, the processor 1306 of the backend server 1032 may determine that the first A/V recording and communication device 1004 and the second A/V recording and communication device 1014 are located within the specified area. In some examples, the processor 1306 of the backend server 1032 makes the determination using first location data 1138 that the processor 1306 of the backend server 1032 receives from the first A/V recording and communication device 1004 and/or the first client device 1012 and second location data 1138 that the processor 1306 of the backend server 1032 receives from the second A/V recording and communication device 1014 and/or the second client device 1018. For example, the first location data 1138 may indicate the location of the first A/V recording and communication device 1004 and the second location data 1138 may indicate the location of the second A/V recording and communication device 1014.

The process 3500, at block B3514, transmits, using the communication module, the first image data to the first client device. For example, the processor 1306 of the backend server 1032 may transmit, using the communication module 1302, the first image data 1124 to the fourth client device 1038. However, in some examples, based on determining that the second consent has yet to be provided for sharing the second image data, the processor 1306 of the backend server 1032 may refrain from transmitting the second image data to the fourth client device 1038. For example, based on determining that the second consent has yet to be provided, the processor 1306 of the backend server 1032 may not store the second image data in the same storage databases 1028 as the first image data 1124 and/or the processor 1306 of the backend server 1032 may not store second data, in association with the second image data, and in the storage databases 1028, that indicates that the second consent has been provided. Based on the second image data not being stored in the same storage databases 1028 as the first image data 1124, and/or based on the second data not being stored in the storage databases 1028, the processor 1306 of the backend server 1032 may refrain from transmitting the second image data.

Figure 36:
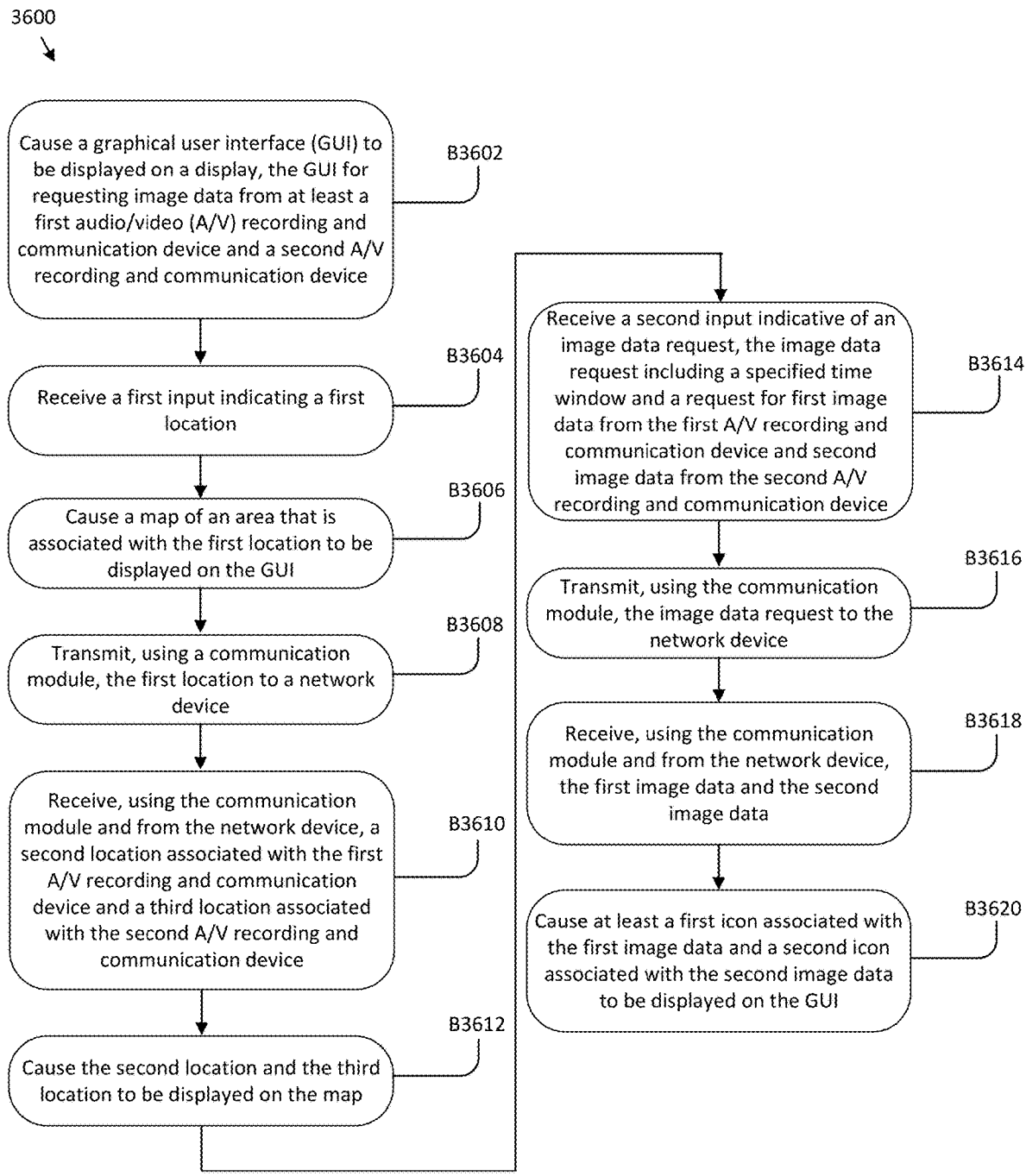

FIG. 36 is a flowchart illustrating a process 3600 for sharing video footage from A/V recording and communication devices according to various aspects of the present disclosure. The process 3600, at block B3602, causes a GUI to be displayed on a display, the GUI for requesting image data from at least a first A/V recording and communication device and a second A/V recording and communication device. For example, the processor 1412 of the fourth client device 1038 may cause the GUI 1422 to be displayed on the display 1420, where the GUI 1422 is for requesting at least the image data 1124 from the first A/V recording and communication device 1004 and the image data 1224 from the third A/V recording and communication device 1022 (which may correspond to the second A/V recording and communication device described herein with respect to the example process 3600). In some examples, the first A/V recording and communication device 1004 may be an authorized A/V recording and communication device and the third A/V recording and communication device 1022 may be an unauthorized A/V recording and communication device.

The process 3600, at block B3604, receives a first input indicating a first location. For example, the processor 1412 of the fourth client device 1038 may receive the first input indicating the first location. The first location may include, but is not limited to, an address, a neighborhood street, a zip code, a city, a state, GPS coordinates, and/or the like. In some instances, the first location may correspond to a location of where suspicious activity occurred, such as the scene of a crime. In any embodiment, the first location may be defined using the GUI, such as by drawing, placing a shape over (e.g., a square, a circle, etc.), or otherwise defining the location. For example, the user of the fourth client device 1038 may draw (e.g., using his or her fingers, a stylus, or another input device) over a map displayed on the display 1420, the location.

The process 3600, at block B3606, causes a map of an area that is associated with the first location to be displayed on the GUI. For example, based on receiving the first location, the processor 1412 of the fourth client device 1038 may cause the map 1424 of the area that is associated with the first location to be displayed on the GUI 1422. The area may include a geographical area that surrounds the first location. For example, and as illustrated in FIG. 3, the area 308 may include an area around the first location (e.g., 304) that is provided by the user.

The process 3600, at block B3608, transmits, using a communication module, the first location to a network device. For example, the processor 1412 of the fourth client device 1038 may transmit, using the communication module 1410, the first location to the backend server 1032. In response, the processor 1306 of the backend server 1032 may use the first location to identify A/V recording and communication devices that are proximate to the first location (e.g., within the geographic area defined by the location), as described herein. For example, the processor 1306 of the backend server 1032 may determine that the first A/V recording and communication device 1004 and the third A/V recording and communication device 1022 are located proximate to the first location.

The process 3600, at block B3610, receives, using the communication module and from the network device, a second location associated with the first A/V recording and communication device and a third location associated with the second A/V recording and communication device. For example, based on transmitting the first location, the processor 1412 of the fourth client device 1038 may receive, using the communication module 1410 and from the backend server 1032, the second location associated with the first A/V recording and communication device 1004 and the third location associated with the third A/V recording and communication device 1022.

The process 3600, at block B3612, causes the second location and the third location to be displayed on the map. For example, the processor 1412 of the fourth client device 1038 may cause the second location associated with the first A/V recording and communication device 1004 and the third location associated with the third A/V recording and communication device 1022 to be displayed on the map 1424. For example, and as illustrated in FIG. 3, the map 302 includes icons 306 that indicate the locations of A/V recording and communication devices that are located around the area 308.

The process 3600, at block B3614, receives a second input indicative of an image data request, the image data request including a specified time window and a request for first image data from the first A/V recording and communication device and second image data from the second A/V recording and communication device. For example, the processor 1412 of the fourth client device 1038 may receive the second input indicative of a data request 1318 (e.g., the image data request). The data request 1318 may include the specified time window and a request for the image data 1124 of the first A/V recording and communication device 1004 and/or the image data 1224 of the third A/V recording and communication device 1022.

The process 3600, at block B3616, transmits, using the communication module, the image data request to the network device. For example, the processor 1412 of the fourth client device 1038 may transmit, using the communication module 1410, the data request 1318 to the backend server 1032. In response, the processor 1306 of the backend server 1032 can perform one or more of the processes described above to retrieve the image data 1124 of the first A/V recording and communication device 1004 and the image data 1224 of the third A/V recording and communication device 1022.

The process 3600, at block B3618, receives, using the communication module, the first image data and the second image data. For example, based on transmitting the data request 1318, the processor 1412 of the fourth client device 1038 may receive, using the communication module 1410 and from the backend server 1032, the image data 1124 of the first A/V recording and communication device 1004 and the image data 1224 of the third A/V recording and communication device 1022.

The process 3600, at block B3620, causes at least a first icon associated with the first image data and a second icon associated with the second image data to be displayed on the GUI. For example, the processor 1412 of the fourth client device 1038 may cause the first icon associated with the image data 1124 and the second icon associated with the image data 1224 to be displayed on the GUI 1422. For example, and as at least partly illustrated in FIG. 4, the GUI 1422 may display a list of videos 432 where, in some examples, the list of videos may include the image data 1124 of the first A/V recording and communication device 1004 and the image data 1224 of the third A/V recording and communication device 1022.

The processes described herein may allow service providers to obtain video footage from third-party A/V recording and communication devices and pre-authorized A/V recording and communication device (e.g., A/V device associated with the service provider) and share the video footage with law enforcement. The video footage from these third-party A/V recording and communication devices, in addition to the video footage from the pre-authorized A/V recording and communication devices, may then be used by law enforcement in identifying and/or capturing perpetrator(s) and/or otherwise assisting law enforcement in making arrests. As a result of the increase in arrests, the safety of the community (e.g., the street, the neighborhood, the town, the city, etc.) in which the pre-authorized and third-party A/V recording and communication devices are located may be increased, in addition to the safety of the surrounding communities.

Figure 37:
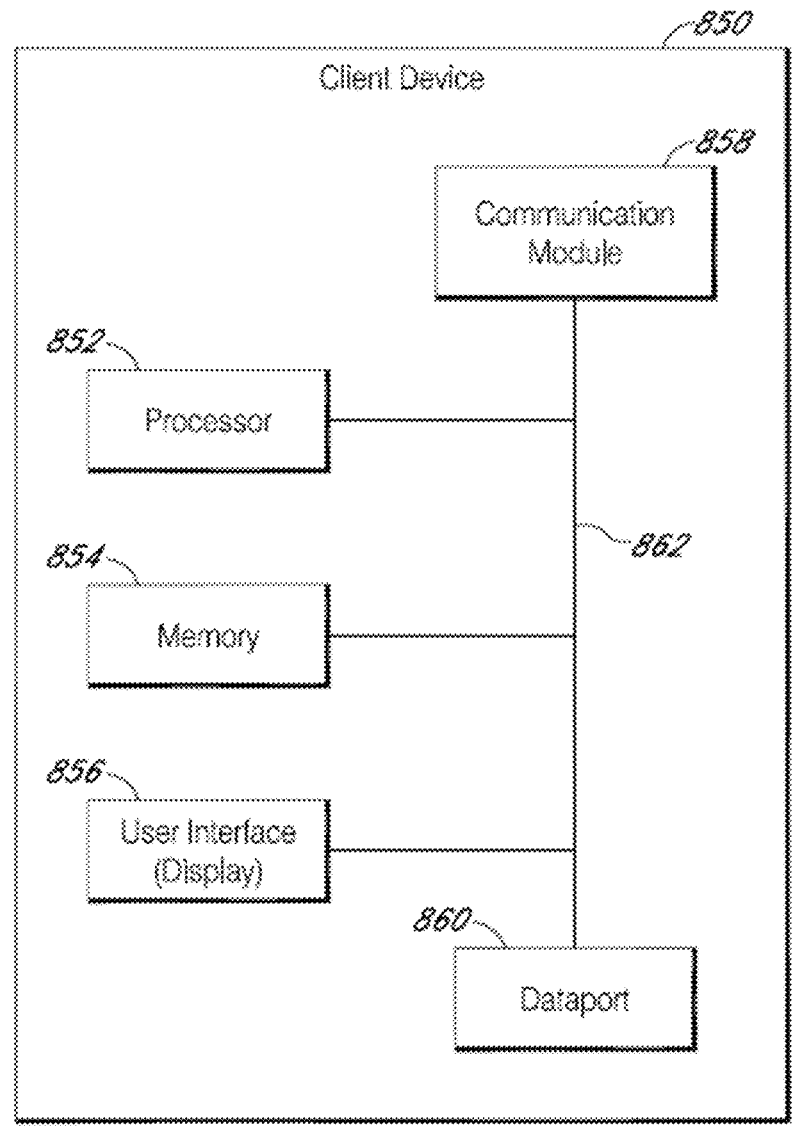
FIG. 37 is a functional block diagram of a client device on which the present embodiments may be implemented according to various aspects of the present disclosure.

FIG. 37 is a functional block diagram of a client device 850 on which the present embodiments may be implemented according to various aspects of the present disclosure. The user's client device 114, the first client device 1012, the second client device 1018, and/or the third client device 1026 described with reference to FIGS. 1 and 10 may include some or all of the components and/or functionality of the client device 850. The client device 850 may comprise, for example, a smartphone.

The present embodiments have been described with reference to the doorbell 130, the security camera 2702, the first A/V recording and communication device 1004, the second A/V recording and communication device 1014, and the third A/V recording and communication device 1022. It should be understood, however, that the present embodiments are equally applicable to any A/V recording and communication device that is capable of recording video footage and/or audio and transmitting the recorded video footage and/or audio via wired and/or wireless connection. In certain embodiments, for example, the A/V recording and communication device may not be a doorbell, but may be, for example, an A/V recording and communication security camera.

With reference to FIG. 37, the client device 850 includes a processor 852, a memory 854, a user interface 856, a communication module 858, and a dataport 860. These components are communicatively coupled together by an interconnect bus 862. The processor 852 may include any processor used in smartphones and/or portable computing devices, such as an ARM processor (a processor based on the RISC (reduced instruction set computer) architecture developed by Advanced RISC Machines (ARM)). In some embodiments, the processor 852 may include one or more other processors, such as one or more conventional microprocessors, and/or one or more supplementary co-processors, such as math co-processors.

The memory 854 may include both operating memory, such as random access memory (RAM), as well as data storage, such as read-only memory (ROM), hard drives, flash memory, or any other suitable memory/storage element. The memory 854 may include removable memory elements, such as a CompactFlash card, a MultiMediaCard (MMC), and/or a Secure Digital (SD) card. In some embodiments, the memory 854 may comprise a combination of magnetic, optical, and/or semiconductor memory, and may include, for example, RAM, ROM, flash drive, and/or a hard disk or drive. The processor 852 and the memory 854 each may be, for example, located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 852 may be connected to the memory 854 via the dataport 860.

The user interface 856 may include any user interface or presentation elements suitable for a smartphone and/or a portable computing device, such as a keypad, a display screen, a touchscreen, a microphone, and a speaker. The communication module 858 is configured to handle communication links between the client device 850 and other, external devices or receivers, and to route incoming/outgoing data appropriately. For example, inbound data from the dataport 860 may be routed through the communication module 858 before being directed to the processor 852, and outbound data from the processor 852 may be routed through the communication module 858 before being directed to the dataport 860. The communication module 858 may include one or more transceiver modules capable of transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology.

The dataport 860 may be any type of connector used for physically interfacing with a smartphone and/or a portable computing device, such as a mini-USB port or an IPHONE®/IPOD® 30-pin connector or LIGHTNING® connector. In other embodiments, the dataport 860 may include multiple communication channels for simultaneous communication with, for example, other processors, servers, and/or client terminals.

The memory 854 may store instructions for communicating with other systems, such as a computer. The memory 854 may store, for example, a program (e.g., computer program code) adapted to direct the processor 852 in accordance with the present embodiments. The instructions also may include program elements, such as an operating system. While execution of sequences of instructions in the program causes the processor 852 to perform the process steps described herein, hard-wired circuitry may be used in place of, or in combination with, software/firmware instructions for implementation of the processes of the present embodiments. Thus, the present embodiments are not limited to any specific combination of hardware and software.

Figure 38:
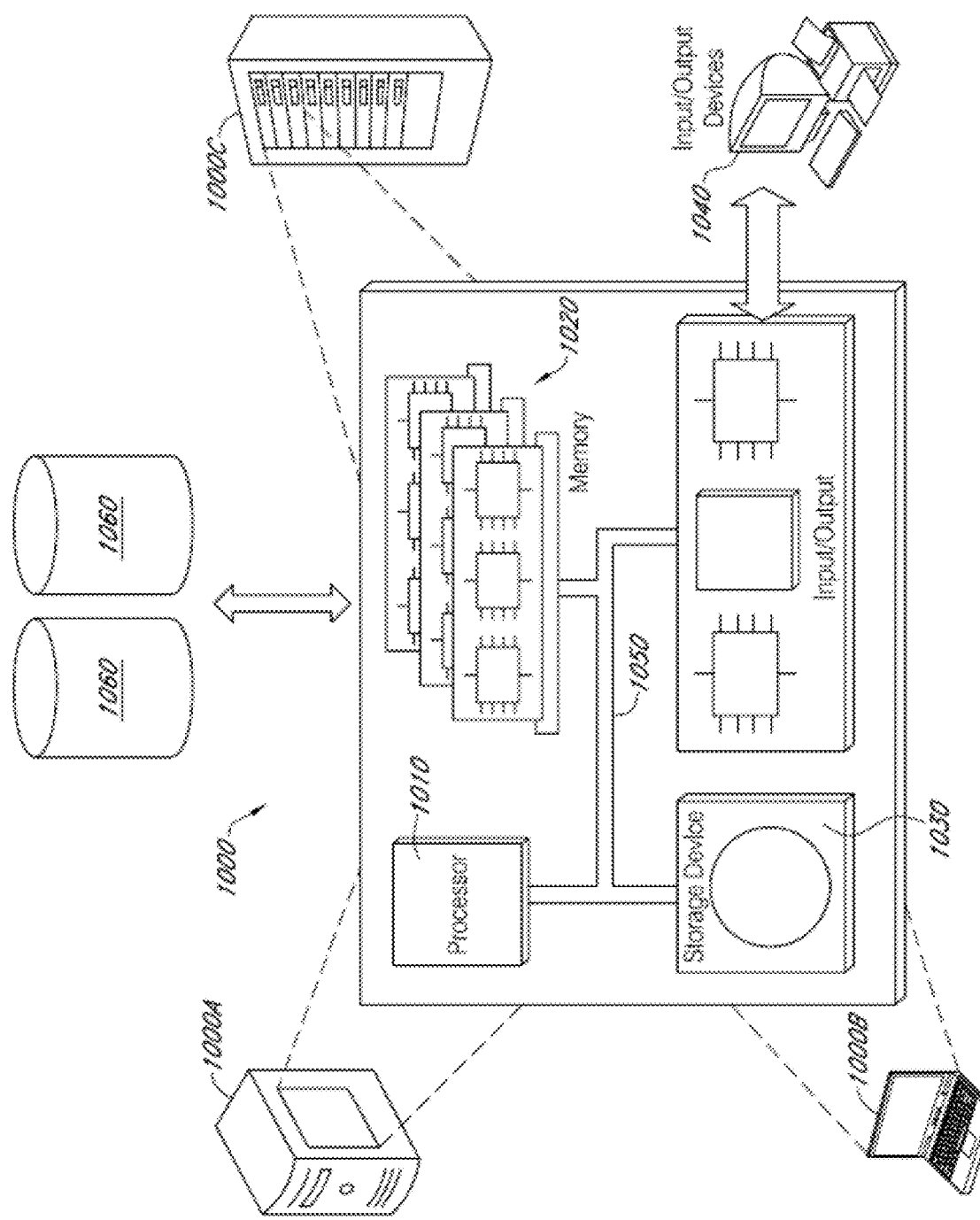
FIG. 38 is a functional block diagram of a general-purpose computing system on which the present embodiments may be implemented according to various aspects of present disclosure.

FIG. 38 is a functional block diagram of a general-purpose computing system on which the present embodiments may be implemented according to various aspects of present disclosure. The computer system 1000 may execute at least some of the operations described above. The computer system 1000 may be embodied in at least one of a personal computer (also referred to as a desktop computer) 1000A, a portable computer (also referred to as a laptop or notebook computer) 1000B, and/or a server 1000C. A server is a computer program and/or a machine that waits for requests from other machines or software (clients) and responds to them. A server typically processes data. The purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

The computer system 1000 may include at least one processor 1010, memory 1020, at least one storage device 1030, and input/output (I/O) devices 1040. Some or all of the components 1010, 1020, 1030, 1040 may be interconnected via a system bus 1050. The processor 1010 may be single- or multi-threaded and may have one or more cores. The processor 1010 may execute instructions, such as those stored in the memory 1020 and/or in the storage device 1030. Information may be received and output using one or more I/O devices 1040.

The memory 1020 may store information, and may be a computer-readable medium, such as volatile or non-volatile memory. The storage device(s) 1030 may provide storage for the system 1000, and may be a computer-readable medium. In various aspects, the storage device(s) 1030 may be a flash memory device, a hard disk device, an optical disk device, a tape device, or any other type of storage device.

The I/O devices 1040 may provide input/output operations for the system 1000. The I/O devices 1040 may include a keyboard, a pointing device, and/or a microphone. The I/O devices 1040 may further include a display unit for displaying graphical user interfaces, a speaker, and/or a printer. External data may be stored in one or more accessible external databases 1060.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a back-end component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s).

What is claimed is:

1. A method comprising:
   receiving, from a preauthorized audio/video recording and communication device (A/V device), first image data generated by a first camera of the preauthorized A/V device;
   storing the first image data in a database;
   receiving registration data from a third-party client device associated with a third-party A/V device that includes a second camera, the registration data indicating at least a location of the third-party A/V device;
   receiving, from a public safety client device, a first request, the first request indicating a specified area and a specified time window;
   based on receiving the first request, determining, based on the registration data, that the location of the third-party A/V device is within the specified area;
   based on determining that the location of the third-party A/V device is within the specified area, transmitting, to the third-party client device, a second request for second image data generated by the second camera during the specified time window;
   based on transmitting the second request, receiving the second image data;
   transmitting the second image data to the public safety client device;
   determining that the preauthorized A/V device is located within the specified area; and
   based on determining that the preauthorized A/V device is located within the specified area, transmitting the first image data to the public safety client device.

2. The method of claim 1, further comprising:
based on receiving the registration data, generating a user account associated with the third-party A/V device, the user account including at least the location of the third-party A/V device and contact information associated with the third-party client device.

3. The method of claim 1, further comprising:
based on receiving the registration data, registering the third-party A/V device with a public safety service,
wherein the preauthorized A/V device is also registered with the public safety service.

4. The method of claim 1, further comprising:
before storing the first image data, determining that a consent has been provided for sharing the first image data,
wherein transmitting the first image data is further based on the consent being provided.

5. The method of claim 1, further comprising:
receiving a consent for sharing the first image data,
wherein transmitting the first image data is further based on the consent being provided.

6. A method comprising:
receiving registration data from a client device, the registration data indicating at least a location of a video device that includes a camera;
storing the registration data in a database;
receiving a first request from a public safety client device, the first request indicating a specified area;
based on receiving the first request, determining, using the registration data, that the location of the video device is within the specified area;
based on determining that the location of the video device is within the specified area, transmitting a second request to the client device, the second image data request for image data generated by the camera of the video device;
based on transmitting the second request, receiving the image data generated by the camera of the video device; and
transmitting the image data to the public safety client device.

7. The method of claim 6, wherein the first request further indicates a specified time window, and wherein the second request is for the image data generated by the camera during at least the specified time window.

8. The method of claim 6, wherein the database is a first database, the camera is a first camera, and the image data is first image data, and wherein the method further comprises:
receiving second image data generated by a second camera of an audio/video recording and communication device (A/V device);
storing the second image data in at least one of the first database or a second database;
determining that the A/V device is located within the specified area; and
based on the first request and determining that the A/V device is located within the specified area, transmitting the second image data to the public safety client device.

9. The method of claim 8, further comprising:
receiving identification data from the public safety client device, wherein the identification data is associated with at least one of a person or an object;
analyzing the first image data and the second image data using the identification data;
based on analyzing the first image data and the second image data, determining that one of the first image data or the second image data represents the at least one of the person or the object; and
determining that the one of the first image data or the second image data that represents the at least one of the person or the object is to be displayed before the other of the first image data and the second image data in an ordered list of videos,
wherein transmitting the first image data and transmitting the second image data to the public safety client device causes the one of the first image data or the second image data that represents the at least one of the person or the object to be displayed before the other of the first image data or the second image data in the ordered list of videos.

10. The method of claim 8, further comprising:
before storing the second image data, determining that a consent has been provided for sharing the second image data,
wherein storing the second image data is based on the consent being provided.

11. The method of claim 8, further comprising:
receiving a consent for sharing the second image data,
wherein transmitting the second image data is further based on the consent being provided.

12. The method of claim 6, further comprising:
based on receiving the registration data, generating a user account associated with the video device, the user account including at least the location of the video device and contact information associated with the client device.

13. The method of claim 6, further comprising:
based on receiving the registration data, registering the video device with a public safety service,
wherein transmitting the second request is further based on the video device being registered with the public safety service.

14. A method comprising:
receiving first image data generated by a first camera of a first audio/video recording and communication device (A/V device);
determining that a first consent has been provided for sharing the first image data;
based on determining that the first consent has been provided, storing the first image data in a database;
receiving second image data generated by a second camera of a second A/V device;
determining that a second consent has not been provided for sharing the second image data;
receiving a request from a public safety client device, the request indicating a specified area;
determining that the first A/V device is located within the specified area;
determining that the second A/V device is located within the specified area; and
based on the first image data being stored in the database, transmitting the first image data to the public safety client device.

15. The method of claim 14, wherein the database comprises a public safety database, and wherein the method further comprises:
based on receiving the first image data, storing the first image data in an image data database; and
based on receiving the second image data, storing the second image data in the image data database.

16. The method of claim 14, further comprising:
based on determining that the first consent has been provided, storing in the database, data indicating that the first consent has been provided for sharing the first image data with the public safety client device; and based on receiving the second image data, storing the second image data in the database, wherein transmitting the first image data from the database to the public safety client device is further based on the data indicating that the first consent has been provided.

17. The method of claim 14, wherein the request is a first request, and wherein the method further comprises:

based on determining that the second consent has not been provided, transmitting a second request to a client device associated with the second A/V device, the second request for sharing the second image data;

based on transmitting the second request, receiving the second consent from the client device, the second consent for sharing the second image data; and based on receiving the second consent, transmitting the second image data to the public safety client device.

18. The method of claim 14, wherein the request further indicates a specified time window, and wherein the method further comprises:

determining that the first image data was generated by the first camera during the specified time window, wherein transmitting the first image data to the public safety client device is further based on determining that the first image data was generated by the first camera during the specified time window.

19. The method of claim 14, further comprising:

receiving registration data associated with the first A/V device, the registration data indicating that the image data generated by the first camera of the first A/V device may be shared with a public safety service, wherein determining that the first consent has been provided for sharing the first image data is based on receiving the registration data.

20. The method of claim 14, further comprising:

generating a list indicating A/V devices that have provided consent for sharing image data with a public safety service; and determining that the first A/V device is included in the list, wherein determining that the first consent has been provided for sharing the first image data is based on determining that the first A/V device is included in the list.

* * * * *

UNITED STATES PATENT AND TRADEMARK OFFICE
CERTIFICATE OF CORRECTION

PATENT NO. : 10,733,456 B2
APPLICATION NO. : 15/839269
DATED : August 4, 2020
INVENTOR(S) : Elliott Lemberger et al.

Page 1 of 1

It is certified that error appears in the above-identified patent and that said Letters Patent is hereby corrected as shown below:

In the Claims

Column 69, Line 35, Claim 6, change "second image data" to --second--.

Signed and Sealed this
Twenty-second Day of September, 2020

Andrei Iancu
*Director of the United States Patent and Trademark Office*